(12) United States Patent
Ueda et al.

(10) Patent No.: US 6,506,477 B1
(45) Date of Patent: Jan. 14, 2003

(54) APPARATUS AND METHOD FOR FORMING THREE-DIMENSIONAL OBJECT

(75) Inventors: Masahide Ueda, Kashihara (JP); Naoki Kubo, Nishinomiya (JP); Akiyoshi Kamisaki, Takarazuka (JP); Fumiya Yagi, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/461,034

(22) Filed: Dec. 15, 1999

(30) Foreign Application Priority Data

Dec. 17, 1998 (JP) ............................................ 10-359391
Dec. 17, 1998 (JP) ............................................ 10-359392
Mar. 1, 1999 (JP) ............................................ 11-052644

(51) Int. Cl.[7] .............................................. B32B 27/14
(52) U.S. Cl. ........................ 428/195; 428/190; 428/546; 156/62.2; 156/285; 156/148; 156/242; 156/244.1; 425/130; 425/190; 264/103; 264/129; 264/132; 264/280; 264/299; 264/510
(58) Field of Search ................................. 425/210, 215, 425/131.1, 130, 218, 190; 264/113, 109, 308, 64, 510, 517, 555, 103, 129, 136, 280, 299, 297.4; 156/62.2, 285, 148, 242, 244.11; 428/546, 190

(56) References Cited

U.S. PATENT DOCUMENTS 6,007,318 A   12/1999   Russell et al.

FOREIGN PATENT DOCUMENTS

| JP | 07088967 A | 4/1995 |
| JP | 07195533 A | 8/1995 |
| JP | 09324203 A | 12/1997 |
| JP | 10207194 A | 8/1998 |

Primary Examiner—Merrick Dixon
(74) Attorney, Agent, or Firm—Burns, Doane, Swecker & Mathis, LLP

(57) ABSTRACT

Data defining an outline shape of a section, color-region image data and adhesion-region image data are generated, color toners are transferred onto a color region and an adhesion region on a sheet in accordance with the respective image data, the sheet is aligned on processed sheets and laminated thereon. Next, a laminated body of the sheets is bonded by heating and pressurizing, and the laminated and bonded sheets are cut along the sectional outline shape. Further, sectional shape data of a solid model are generated and a transparent toner is transferred as an adhesive onto the adhesion region of the sheet. Then, after aligning and laminating the sheet on the processed sheets, the transparent toner is melted to bond the sheets. Color toners are transferred onto the color region of the sheet and the sheet is cut along the outline shape. Furthermore, the color region is defined on a transparent sheet in accordance with the sectional shape of the solid model. After entirely covering the color region with a white toner layer, a three-primary-color toner layer in which the three primary color toners are spatially tone-distributed is applied to the color region, to form a colored layer of double-layered structure. Alternatively, a colored layer is formed of one-layered structure in which the white toner fills clearances of dots of the three primary color toners.

53 Claims, 61 Drawing Sheets

F I G. 5
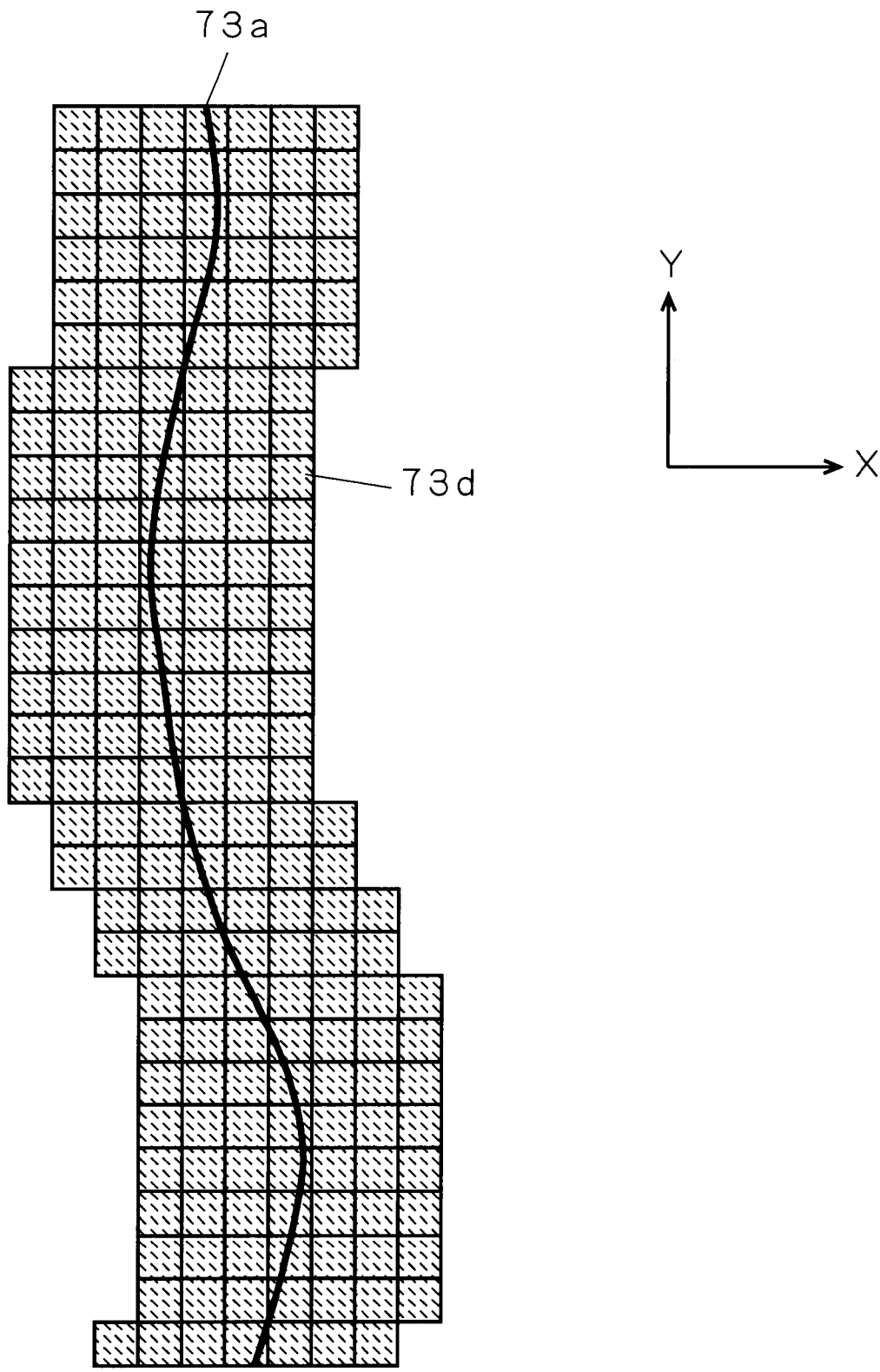

F/G. 6
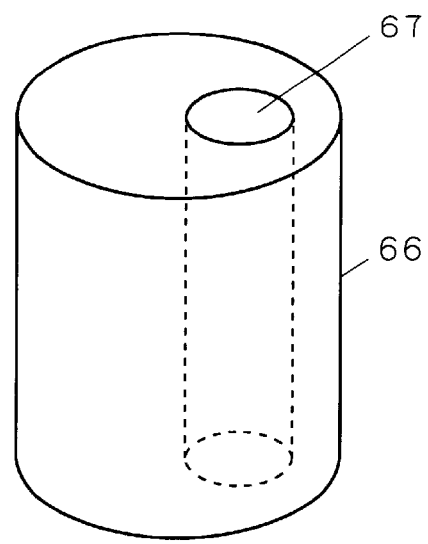
F/G. 7
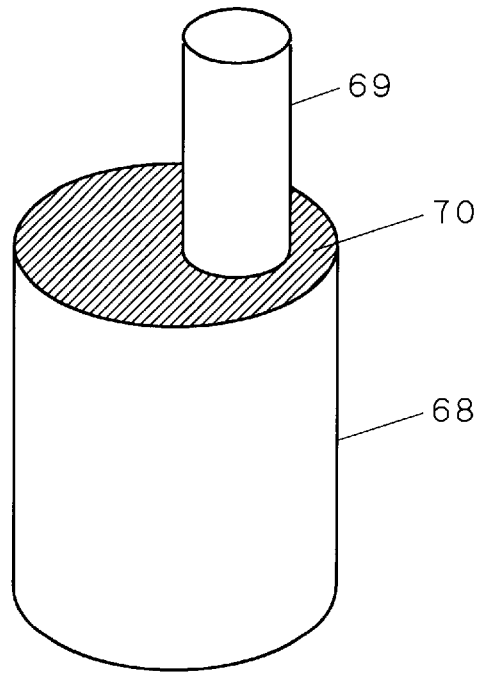

F/G. 10
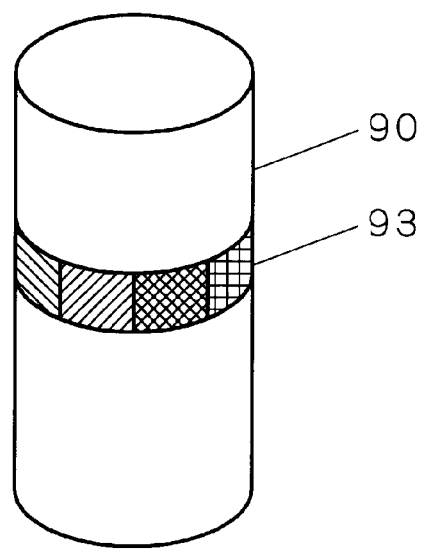
F/G. 11
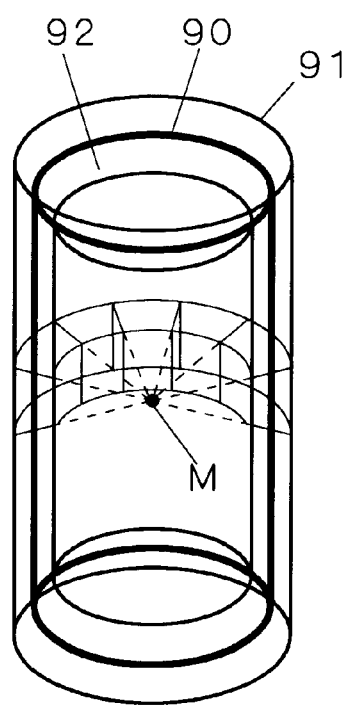

F I G. 14
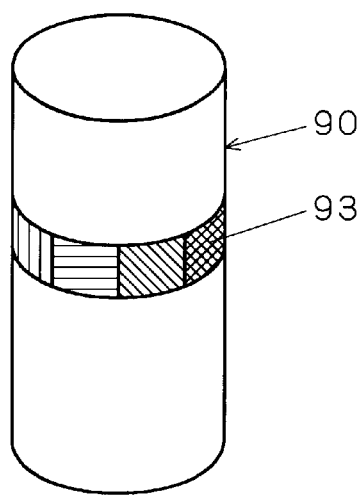
F I G. 15
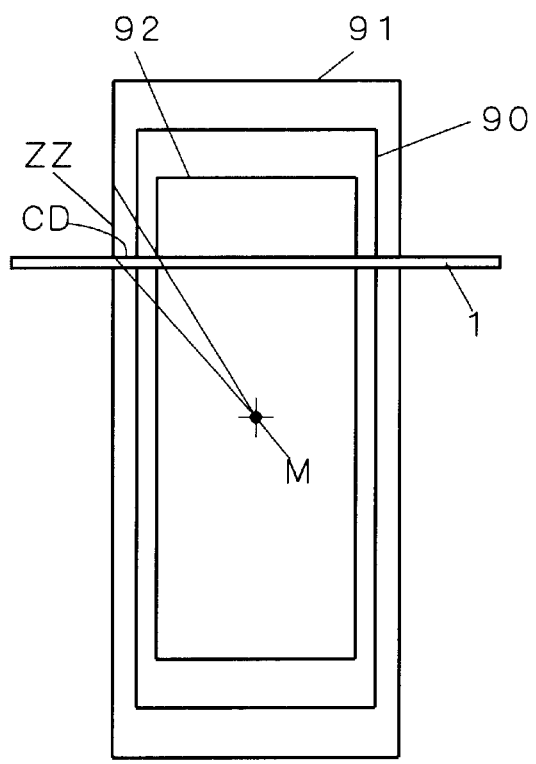

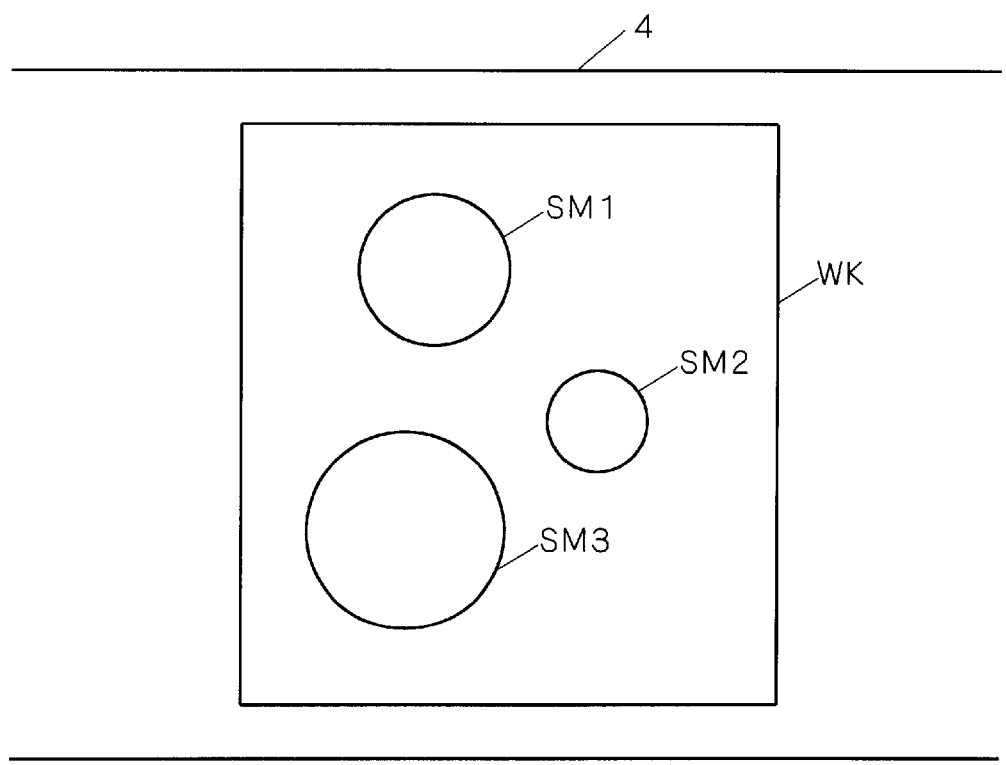
F I G. 28

F I G. 35
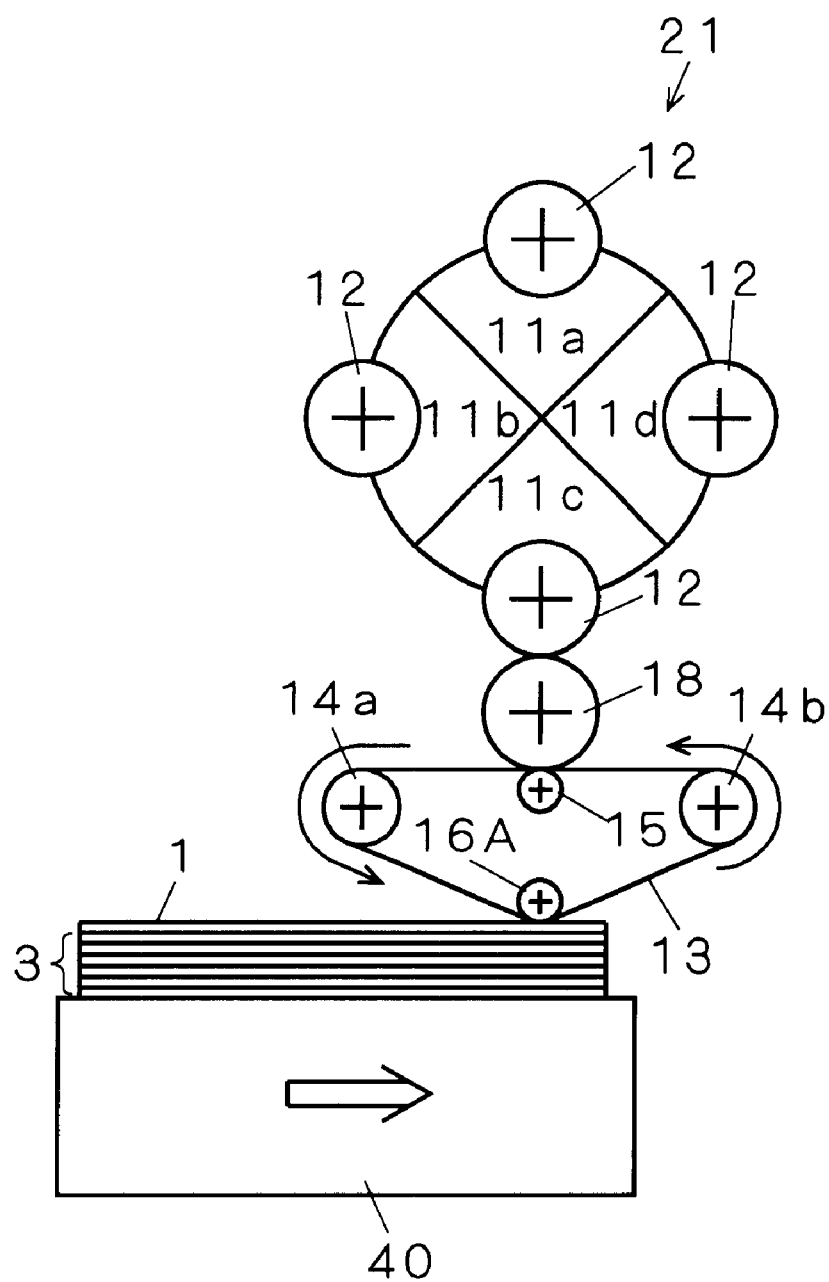

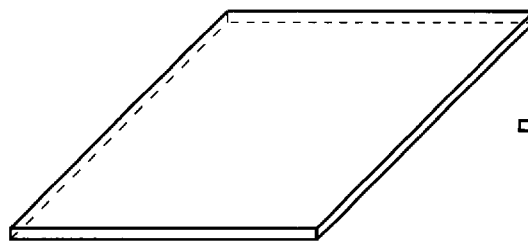
FIG. 47A    FIG. 47B
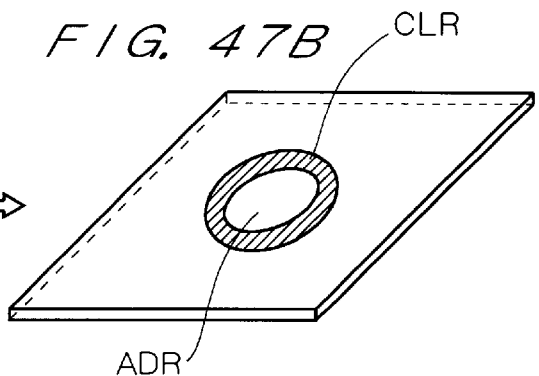
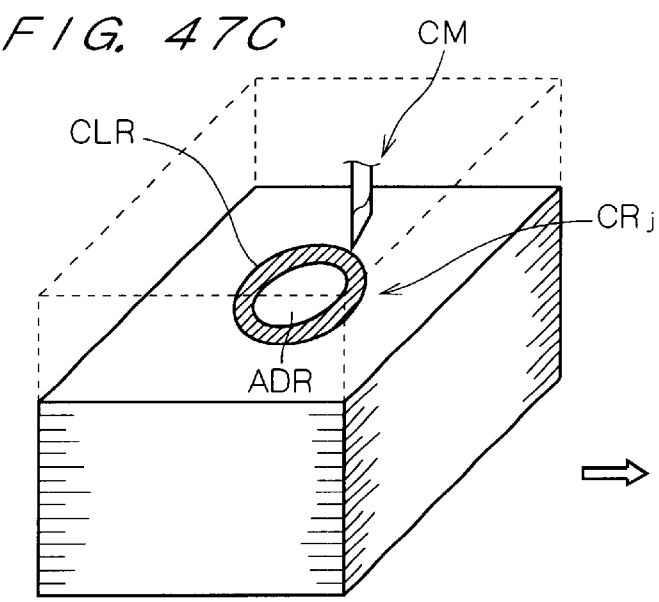
FIG. 47C
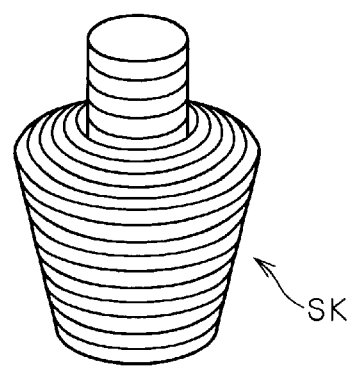
FIG. 47D

FIG. 52A

|   |   |   |   |   |   |   |   |
|---|---|---|---|---|---|---|---|
|   | C |   | C |   | C |   | C |
|   |   |   |   |   |   |   |   |
|   | C |   | C |   | C |   | C |
|   |   |   |   |   |   |   |   |
|   | C |   | C |   | C |   | C |
|   |   |   |   |   |   |   |   |
|   | C |   | C |   | C |   | C |

FIG. 52B

| M |   | M |   | M |   | M |   |
|---|---|---|---|---|---|---|---|
|   | C |   | C |   | C |   | C |
| M |   | M |   | M |   | M |   |
|   | C |   | C |   | C |   | C |
| M |   | M |   | M |   | M |   |
|   | C |   | C |   | C |   | C |
| M |   | M |   | M |   | M |   |
|   | C |   | C |   | C |   | C |

FIG. 52C

| M | Y | M | Y | M | Y | M | Y |
|---|---|---|---|---|---|---|---|
|   | C |   | C |   | C |   | C |
| M | Y | M | Y | M | Y | M | Y |
|   | C |   | C |   | C |   | C |
| M | Y | M | Y | M | Y | M | Y |
|   | C |   | C |   | C |   | C |
| M | Y | M | Y | M | Y | M | Y |
|   | C |   | C |   | C |   | C |

| M | Y | M | Y | M | Y | M | Y |
|---|---|---|---|---|---|---|---|
| W | C | W | C | W | C | W | C |
| M | Y | M | Y | M | Y | M | Y |
| W | C | W | C | W | C | W | C |
| M | Y | M | Y | M | Y | M | Y |
| W | C | W | C | W | C | W | C |
| M | Y | M | Y | M | Y | M | Y |
| W | C | W | C | W | C | W | C |

151

F/G. 53A
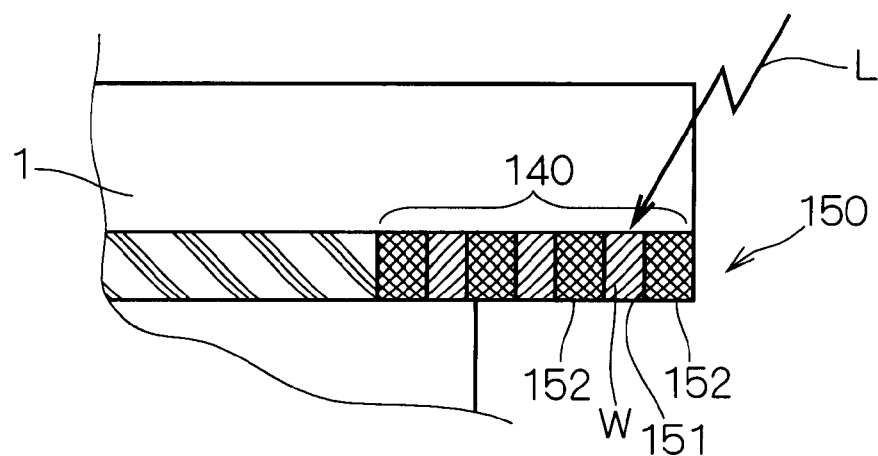
F/G. 53B
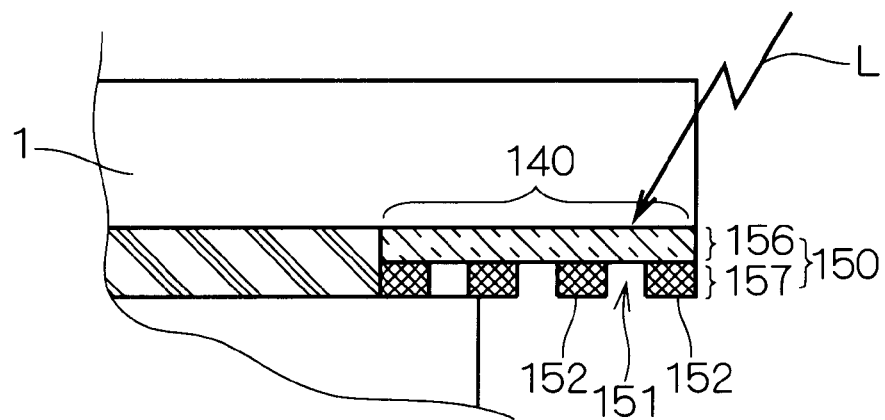

F I G. 55A
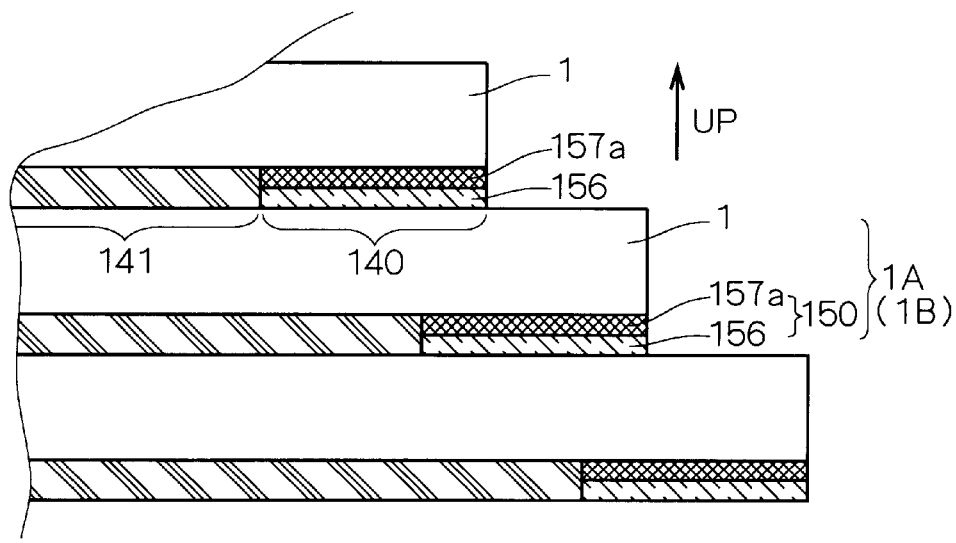
F I G. 55B
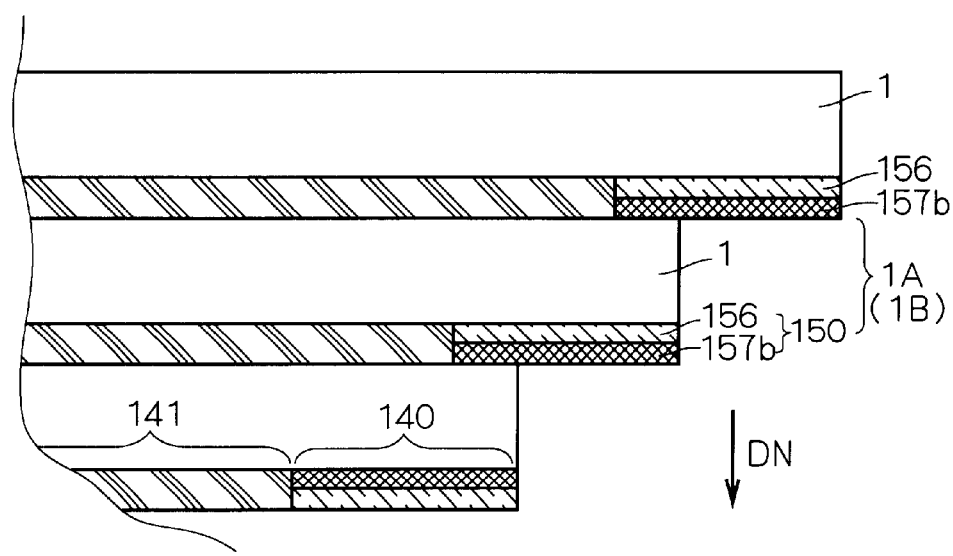

FIG. 56A

| Y | M | Y | M | Y | M | Y | M |
|---|---|---|---|---|---|---|---|
| C |   | C |   | C |   | C |   |
| Y | M | Y | M | Y | M | Y | M |
| C |   | C |   | C |   | C |   |
| Y | M | Y | M | Y | M | Y | M |
| C |   | C |   | C |   | C |   |
| Y | M | Y | M | Y | M | Y | M |
| C |   | C |   | C |   | C |   |

FIG. 56B

| W | W | W | W | W | W | W | W |
|---|---|---|---|---|---|---|---|
| W | W | W | W | W | W | W | W |
| W | W | W | W | W | W | W | W |
| W | W | W | W | W | W | W | W |
| W | W | W | W | W | W | W | W |
| W | W | W | W | W | W | W | W |
| W | W | W | W | W | W | W | W |
| W | W | W | W | W | W | W | W |

FIG. 57A

| W | W | W | W | W | W | W | W |
|---|---|---|---|---|---|---|---|
| W | W | W | W | W | W | W | W |
| W | W | W | W | W | W | W | W |
| W | W | W | W | W | W | W | W |
| W | W | W | W | W | W | W | W |
| W | W | W | W | W | W | W | W |
| W | W | W | W | W | W | W | W |
| W | W | W | W | W | W | W | W |

FIG. 57B

| Y | M | Y | M | Y | M | Y | M |
|---|---|---|---|---|---|---|---|
| C | W | C | W | C | W | C | W |
| Y | M | Y | M | Y | M | Y | M |
| C | W | C | W | C | W | C | W |
| Y | M | Y | M | Y | M | Y | M |
| C | W | C | W | C | W | C | W |
| Y | M | Y | M | Y | M | Y | M |
| C | W | C | W | C | W | C | W |

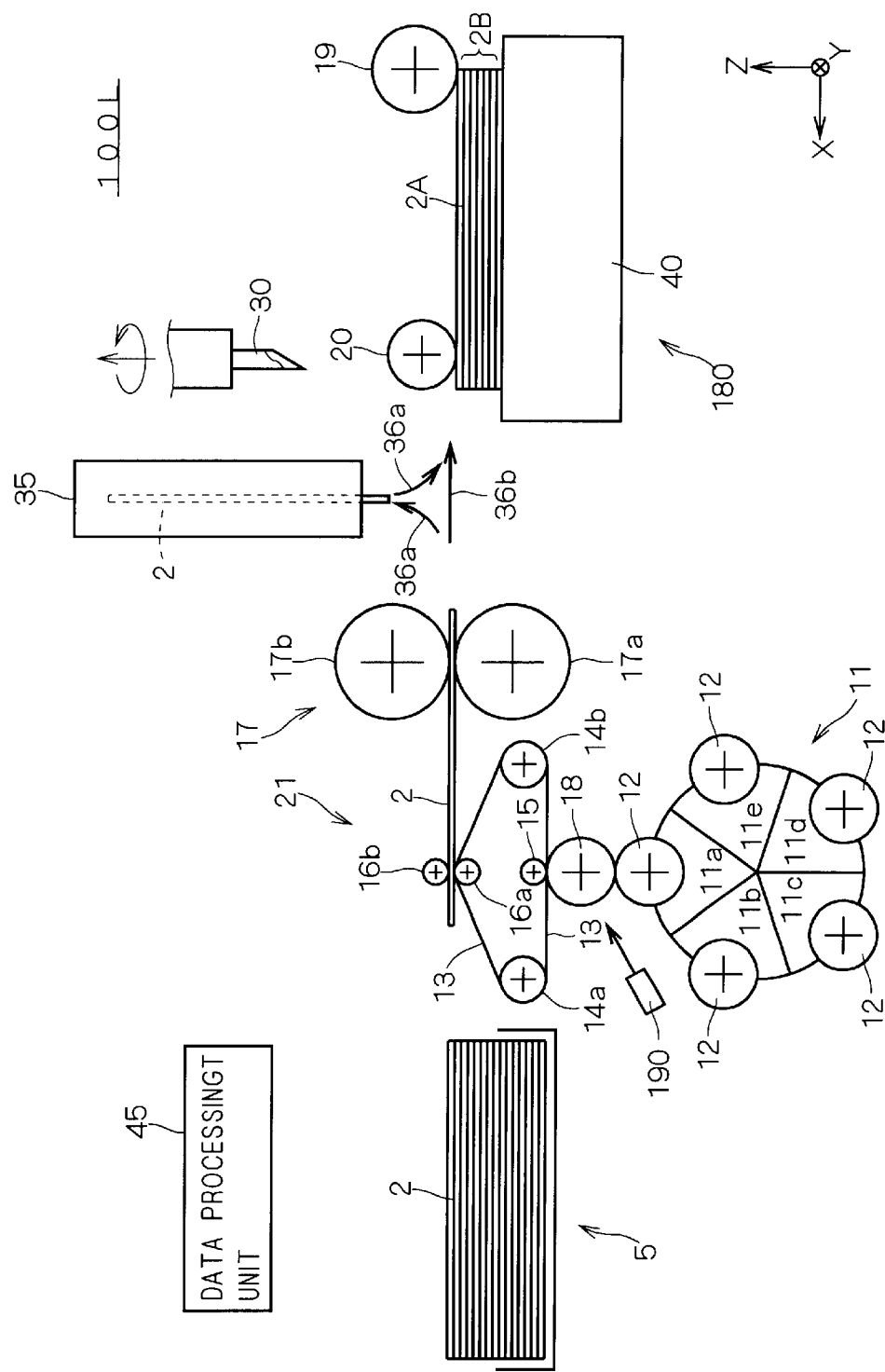

F/G. 60A
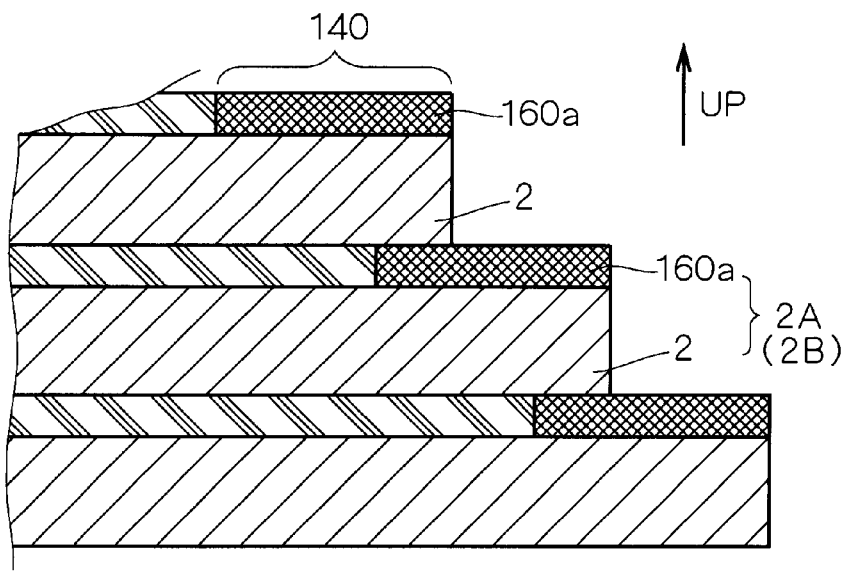
F/G. 60B
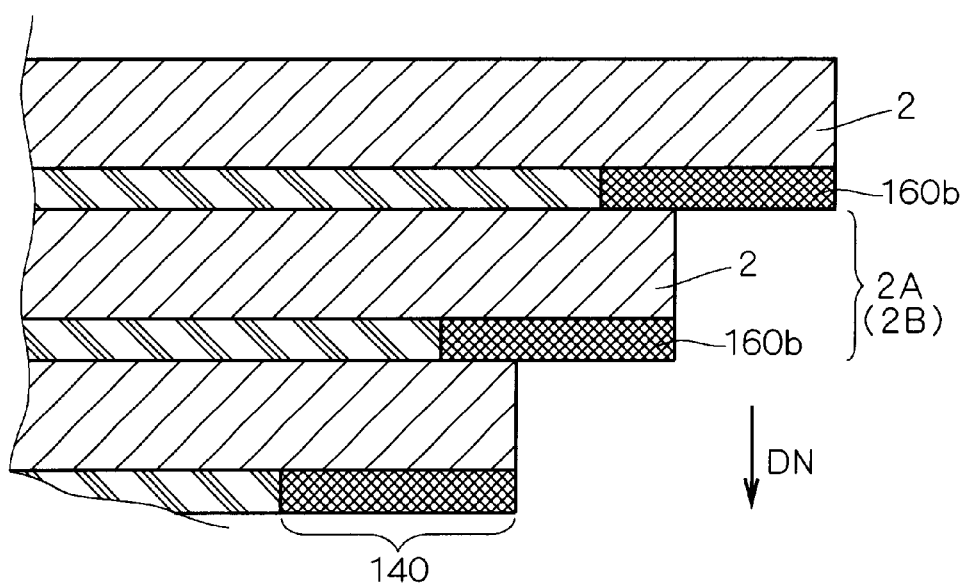

F/G. 63

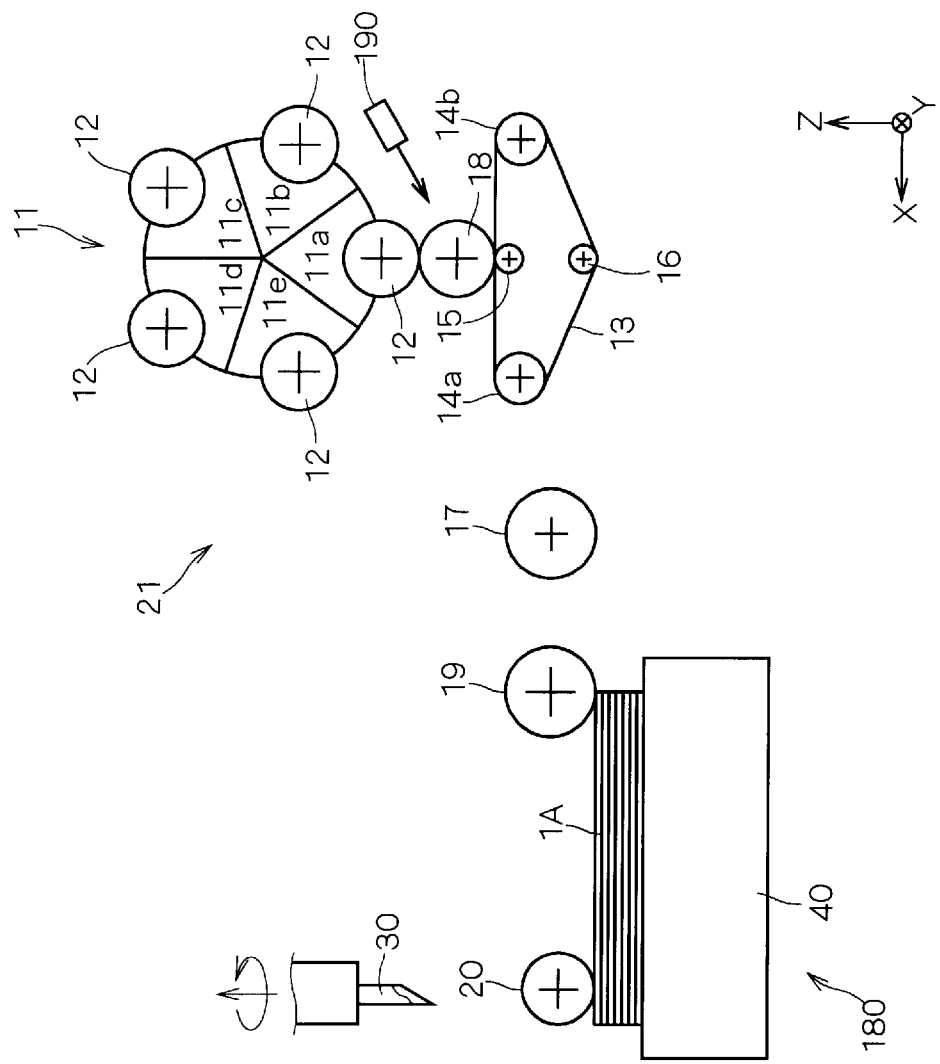
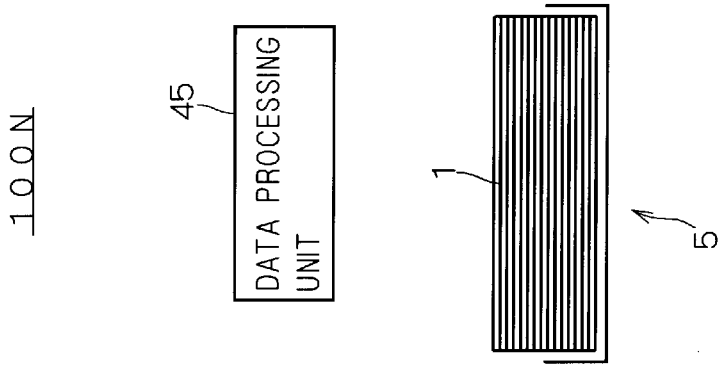
FIG. 66

APPARATUS AND METHOD FOR FORMING THREE-DIMENSIONAL OBJECT

This application is based on application Nos. 10-359391, 10-359392 and 11052644 filed in Japan, the contents of which are hereby incorporated by reference.

BACKGROUND OF THE INVENTION

1. Field of the Invention

The present invention relates to an apparatus and a method for forming a three-dimensional object, and more particularly to an apparatus and a method for forming a three-dimensional object by laminating sheet-like members.

2. Description of the Background Art

Japanese Patent Application Laid Open Gazette No. 7-195533 discloses an apparatus for forming a three-dimensional object. In the apparatus, data representing sectional shapes of solids are generated on the basis of data representing shapes of the solids, sheets are coated with an adhesive on the basis of the generated data and laminated and the laminated sheets are cut in accordance with the sectional shape, to form a three-dimensional object.

The Gazette, however, does not show a technical concept for coloring the three-dimensional object and hence only a three-dimensional object of achromatic color and no pattern can be obtained.

Further, in the Gazette, plain paper is used as the sheet. Instead of the plain paper, however, a transparent sheet may be used. Use of the transparent paper produces an advantage that the same visual effect is achieved whichever is colored, front surface or back surface.

Coloring the transparent sheet, however, raises a problem of change in color tone or gradation of colored portion due to transmission light.

SUMMARY OF THE INVENTION

The present invention is directed to an apparatus for forming a three-dimensional object by laminating sheet-like members.

According to a first aspect of the present invention, the apparatus comprises: a processor for generating outline-shape data including a sectional outline shape of a solid and color-region data including a region to be colored on each of the sheet-like members on the basis of data representing a shape of the solid and data representing a color of a surface of the solid; and a unit for coloring each of the sheet-like members on the basis of the color-region data, cutting each of the sheet-like members on the basis of the outline-shape data and laminating each of the sheet-like members.

Therefore, a three-dimensional colored object can be formed.

According to a second aspect of the present invention, the unit colors each of the sheet-like members before laminating.

According to a third aspect of the present invention, the unit colors each of the sheet-like members after laminating.

According to a fourth aspect of the present invention, the region to be colored is a predetermined region including a sectional contour line of the solid on each of the sheet-like members. That reduces the time for coloring and consumption in coloring material and the three-dimensional colored object can be formed faster at lower cost.

According to a fifth aspect of the present invention, the unit includes a mechanism for supplying a plurality of kinds of sheet-like members having different thicknesses.

According to a sixth aspect of the present invention, the processor slices the solid at different intervals on the basis of the data representing the shape of the solid to generate the outline-shape data and makes a selection from the plurality of kinds of sheet-like members in accordance with the intervals.

Since that allows accurate reproduction of shape, the three-dimensional object can be accurately formed.

According to a seventh aspect of the present invention, the sheet-like members are obtained by cutting a continuous sheet, and the unit colors the continuous sheet with a plurality of image forming units arranged in series correspondingly to a plurality of different colors.

That reduces any unnecessary portion of the sheet and cuts waste of the sheet. Further, by forming sectional shapes of a plurality of solid models at a time and coloring differently on sections of a sold model on the continuous sheet, differently-shaped objects can be formed at a time and equally-shaped objects with different colors and patterns can be formed at a time. Furthermore, by dividing a solid model to be two-dimensionally arranged on the continuous sheet, the object can be formed faster with lower height of laminated sheets.

According to an eighth aspect of the present invention, the unit includes a mounting pedestal on which the sheet-like members are laminated; and a detector for detecting the height of the sheet-like members laminated on the mounting pedestal.

That facilitates laminating of the sheets, and the three-dimensional object can be formed with high accuracy.

According to a ninth aspect of the present invention, the processor further generates adhesion-region data including a region to be coated with an adhesive on each of the sheet-like members, and the unit coats each of the sheet-like members with the adhesive on the basis of the adhesion-region data.

According to a tenth aspect of the present invention, the unit colors each of the sheet-like members with a predetermined base color as well as an inherent color corresponding to a color of a surface of the solid.

According to an eleventh aspect of the present invention, the unit includes a mechanism for reversing each of the sheet-like members before laminating.

The present invention is also directed to a method for forming a three-dimensional object by laminating sheet-like members.

The present invention is further directed to a three-dimensional object.

An object of the present invention is to provide an apparatus and a method for forming a three-dimensional object, which are improved and can solve the above problems.

Another object of the present invention is to provide an apparatus and a method for forming a three-dimensional colored object with higher accuracy at higher speed, simpler operation and lower cost.

A further object of the present invention is to provide an apparatus and a method for forming a three-dimensional object which is colored without color discrepancy.

Still another object of the present invention is to provide an apparatus and a method for forming a three-dimensional object, which can accurately reproduce colors of a solid.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3 to 5 are conceptual diagrams showing methods of defining a color region;

FIGS. 6 and 7 are perspective views showing exemplary solid models whose sectional outline shapes are each represented by a plurality of closed curves;

FIGS. 10 to 16 are conceptual diagrams showing methods of generating image data on a color region;

FIGS. 26 to 28 are conceptual diagrams showing operations in accordance with the variations of the first preferred embodiment;

FIG. 35 illustrates an apparatus for forming a three-dimensional object in accordance with a variation of the third preferred embodiment;

FIGS. 46A to 47D illustrate principles for forming a three-dimensional object by using a laminated body;

FIGS. 52A to 52D show coloring of a three-dimensional object;

FIGS. 53A and 53B are conceptual diagrams showing an influence of light in a transparent sheet;

FIGS. 54A to 57B show coloring of a three-dimensional object;

FIG. 59 is a schematic diagram showing an apparatus for forming a three-dimensional object in accordance with an eighth preferred embodiment;

FIGS. 60A to 61B show coloring of a three-dimensional object;

FIGS. 66 and 67 are schematic diagrams showing apparatuses for forming a three-dimensional object in accordance with another preferred embodiment.

DESCRIPTION OF THE PREFERRED EMBODIMENTS

Terms in this specification are defined as follows.

The term "color" includes both chromatic one and achromatic one unless otherwise defined. Therefore, black and white are also included in "color".

The term "coloring material" generally represents a solid coloring material (e.g., toner) and a liquid coloring material (e.g., ink). A pigment and a dye are also included in "coloring material".

The term "transparent sheet" generally represents a sheet having substantial transmittivity of light, including a translucent one with pastel color as well as a completely colorless and transparent sheet.

A. The First Preferred Embodiment

Figure 1:
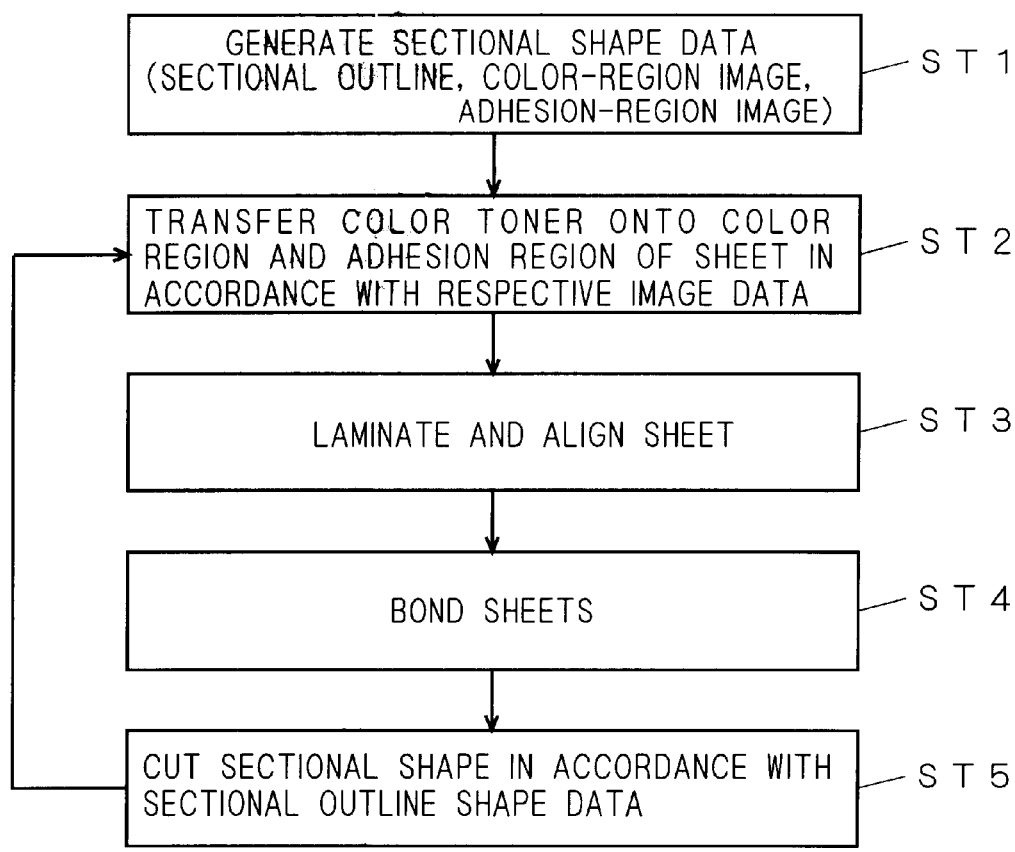
FIG. 1 is a flow chart showing a basic operation in accordance with a first preferred embodiment.
Figure 2:
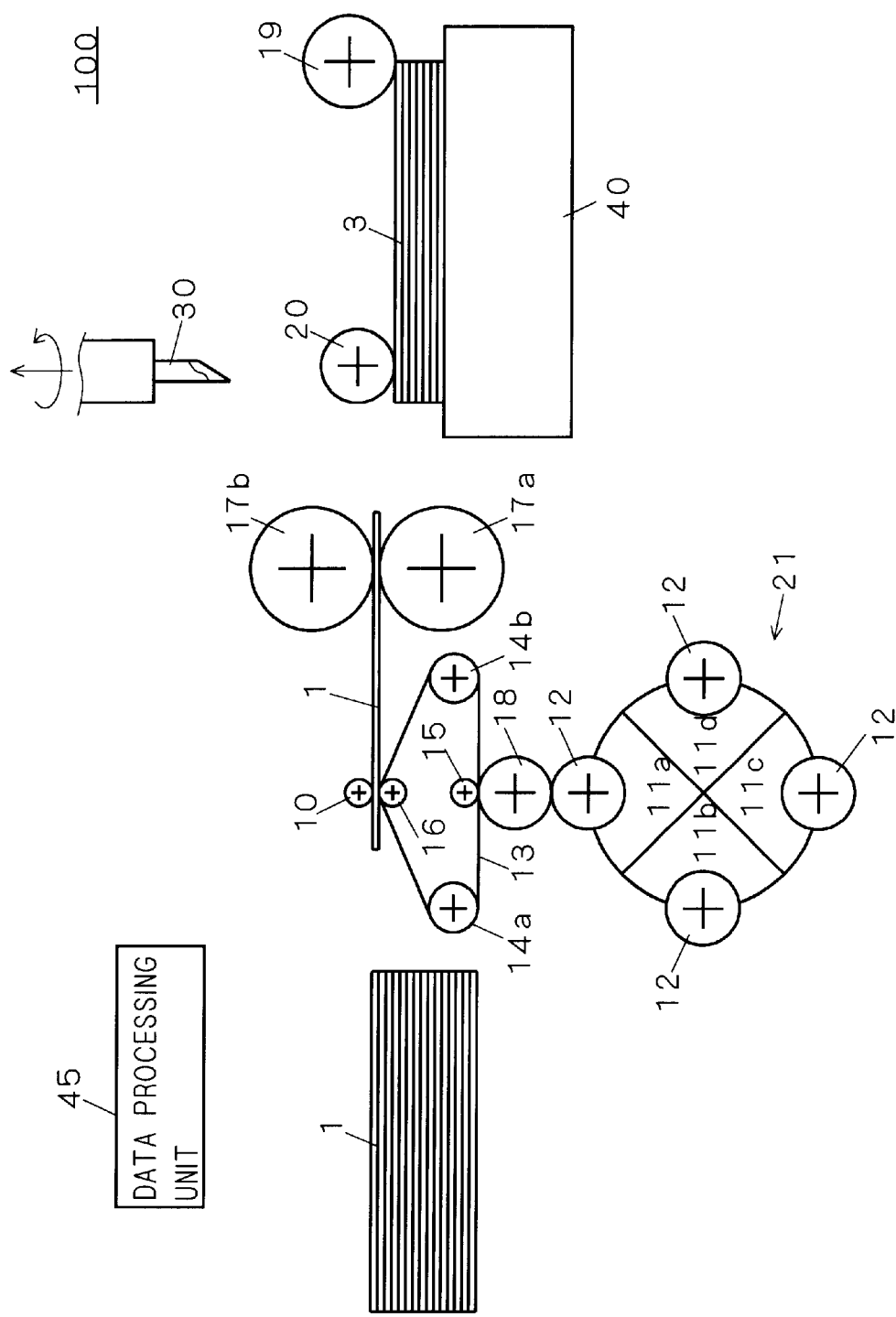
FIG. 2 illustrates an apparatus for forming a three-dimensional object in accordance with the first preferred embodiment.

FIG. 1 is a flow chart showing a basic operation in the first preferred embodiment of the method for forming a three-dimensional object in accordance with the present invention. FIG. 2 illustrates a constitution of a three-dimensional object forming apparatus 100. First of all, a general operation will be discussed, referring to FIGS. 1 and 2.

<A-1. Constitution and Operation>

<A-1-1. Process for Generating Sectional Shape Data>

From three-dimensional data and color data on a solid model which are obtained from three-dimensional CAD data or by three-dimensional shape measuring instrument, in the step ST1 of FIG. 1, sectional shape data of the solid model are generated. The data are obtained by slicing the solid model in a predetermined direction and includes outline-shape data defining an outline shape of a section, color-region image data used for coloring the section corresponding to the colored position and color of a surface of the solid model and adhesion-region image data of the section. The color region is a region of the object to be colored and the adhesion region is at least an overlapped portion (logical product portion) in sectional shapes of sheets to be bonded to each other. The step ST1 is executed by a data processing unit 45 of the forming apparatus 100 of FIG. 2. The input of the three-dimensional data is not limited to the three-dimensional CAD data or data from the three-dimensional shape measuring instrument.

The method of defining the color region and the adhesion region and the method of generating the color-region image data and the adhesion-region image data will be discussed later in detail.

<A-1-2. Sheet>

Now, a sheet used for printing the sectional shape of the solid model will be discussed. As the sheet, plain paper, resin sheet, a transparent sheet of e.g., PET (Polyethylene Terephthalate) or a transparent acrylic sheet may be used. Further, a sheet of photolytic material such as low-molecular acrylic resin may be used.

In a case of PET sheet, a transfer surface of the toner is coated with a matter of good adhesion to the toner, to enhance its adhesion strength. Further, to enhance the adhesion strength in laminating, both surfaces of the sheet may be coated. A coating material is selected among, e.g., styrene-acrylic copolymer and polyester resin, depending on the material of the toner.

Sheets 1 are fed by a paper cassette or a paper tray piece by piece in FIG. 2. A feeding mechanism which is used for an electrophotographic copy machine or printer may be used.

<A-1-3. Transferring Process>

Next, in the step ST2, a color toner is transferred to the color region and the adhesion region on the sheet by electrophotographically electrostatic transfer in accordance with the respective image data. The step ST2 is executed by a coloring unit 21 of the forming apparatus 100 of FIG. 2.

<A-1-4. Coloring Unit>

The coloring unit 21 mainly comprises a rotary developing device consisting of developing devices 11a, 11b, 11c and 11d having toners of e.g., C (cyan), M (magenta), Y (yellow) and Bk (black), respectively, developing sleeves 12 attached to the respective developing devices 11a to 11d, a photoreceptor drum 18 coming into contact with the developing sleeves 12 and an intermediate transfer belt 13 onto which the toners of respective colors are transferred from the photoreceptor drum 18. On the basis of the color-region image data, the toners of respective colors are sequentially developed on the photoreceptor drum 18 and further transferred to the intermediate transfer belt 13, and then by holding the sheet 1 and the intermediate transfer belt 13 onto which the toners are transferred between a secondary transfer roller 10 and a support roller 16, the toners are electrostatically transferred to the sheet 1.

The intermediate transfer belt 13 is driven in a loop by a driving roller 14a, a slave roller 14b, a primary roller 15 and the support roller 16.

The toners transferred to the sheet 1, which is held between the heat rollers 17a and 17b, are heated and fixed. As a method of fixing toner, besides the above heating by the heat roller, a flash fixing method, an oven fixing method and a laser-irradiation fixing method may be used.

Further, the transfer of toner is not limited to the electrostatic transfer, but the toner may be jetted out from a nozzle to be transferred onto the sheet 1. Alternatively, the toner may be melted and jetted onto the sheet for transfer. Further, the toner may be transferred onto both surfaces of the sheet.

<A-1-5. Laminating and Bonding Process>

The sheets 1 on which the color toners are transferred and fixed are conveyed to a laminating mount 40 piece by piece, aligned on processed sheets 3, and laminated by an align roller 20 (in the step ST3). Further, after fixing, static electricity charged on the sheets 1 may be removed before laminating.

Next, a heat roller 19 heats and pressurizes the sheet 1 on a laminated body consisting of the processed sheets 3, melting the toners of the processed sheet 3 or the sheet 1, to bond the sheet 1 onto the processed sheets 3 (in the step ST4).

Further, the sheet 1 may be effectively bonded through heating and pressurization by hot press as well as with heat roller. In heating and pressurization with heat roller and by hot press, at least one of heating temperature and applied pressure can be controlled and by changing it according to at least one of the kind of sheet, the amount of toner to be transferred, ambient temperature, humidity, the number of laminated sheets and laminating condition, an appropriate adhesion strength and an object of less distortion can be obtained.

Furthermore, by coating a surface of the heat roller or a hot press plate with a material resistant to deposit of the toner on the sheet, such as PFA (perfluoroalkoxyfluoro plastics) and PTFE (polytetrafluoroethylene), it is possible to prevent unnecessary toner from depositing to the heat roller and the hot press plate and the sheet is not contaminated.

<A-1-6. Cutting Process>

In the step ST5, the laminated and bonded sheet 1 is cut with a cutter 30 along the outline shape on the basis of the sectional outline shape data. Thus, unnecessary portion of the sheet is removed to achieve the processed sheet 3.

The cutter 3 can move on the sheet 1 at least in the direction of plane (X-Y direction). Further, the cutter 30 may be movable also in the direction of height (Z direction). Furthermore, it may be rotatable about the Z axis. In cutting, such an operational control as to move a cutting edge of the cutter 30 along the direction of the tangent to the outline shape allows a smooth cutting. Further, depending on the kind and thickness of sheet, by making a pressure of the cutter 30 against the sheet and a moving speed of the cutting edge variable allows a smooth cutting. Furthermore, the amount of cutting edge to extend off can be changed.

Though the above cutter 30 is a cutlery, an ultrasonic cutter using ultrasonic wave and a laser cutter using laser beam (e.g., $CO_2$ laser) may be used, instead of cutlery. When these cutters are used, it advantageously becomes possible to respond to various kinds of sheets and various thicknesses by changing an output of the ultrasonic wave or the laser beam or a scanning speed.

When the sheet of photolytic material is used, a light of predetermined wavelength region (corresponding to photolysis characteristics of photolytic material) is converged to radiate, to allow cutting.

Further, besides cutting along the sectional outline shape, notching in meshes or radially or perforating may be performed to remove the unnecessary portion of the sheet. This makes it easier to remove the unnecessary portions.

The end of the step ST5 completes a series of processing on a sheet and subsequently the processing of the steps ST2 to ST5 are executed on the next sheet 1. This operation is repeated on all the sectional data of the solid model to obtain a three-dimensional object.

Further, there may be a case in the step ST5, where a sheet is cut along the sectional outline shape, then without removing an unnecessary portion thereof, the next sheet is laminated and after laminating all the sheets, unnecessary portions are removed by an operation like punching.

<A-1-7. Method of Defining Color Region and Adhesion Region>

Next, a method of defining a color region and an adhesion region of the sectional shape will be discussed referring to FIGS. 3 to 9.

In the section of a three-dimensional object, the color region has only to be defined in an outline portion. Specifically, by coloring the outline portion, the color is reflected on a side surface of the laminated body when the sheets are laminated and the three-dimensional object looks as if its surface is colored. This effect is more pronounced when a transparent sheet is used, and is achieved even when plain paper is used.

Figure 3:
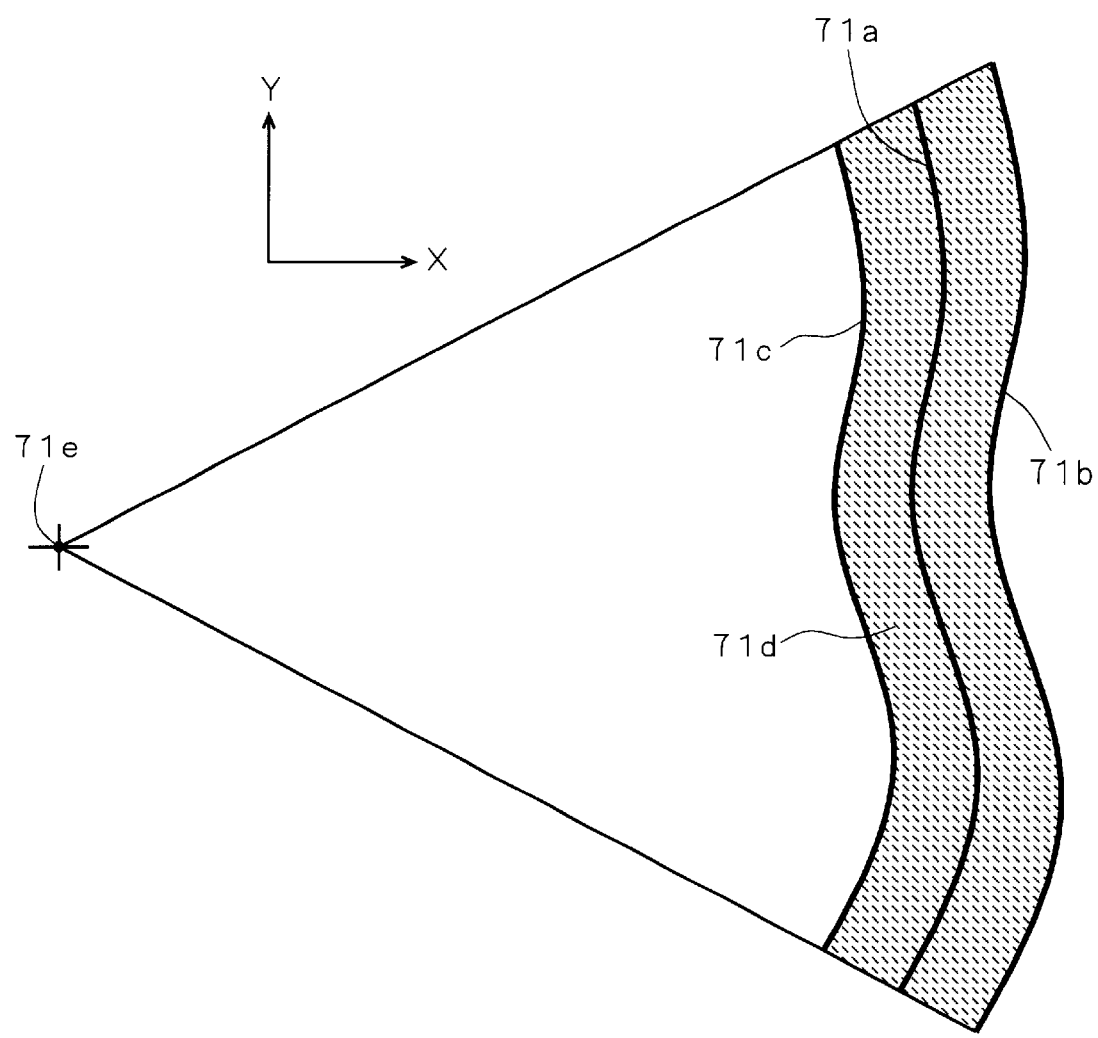
Figure 4:
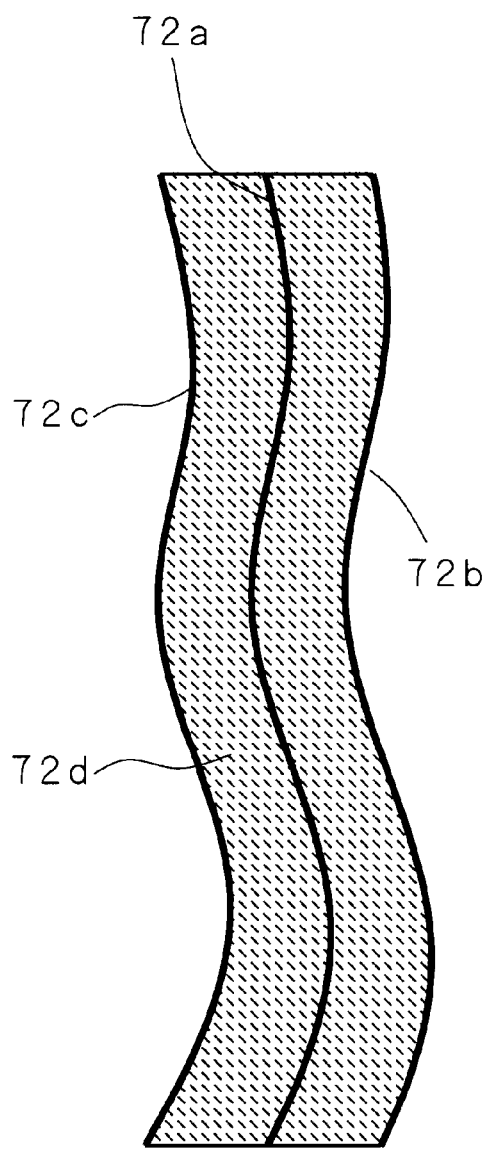

Therefore, the color region has only to center around the sectional outline shape. FIGS. 3 to 5 are conceptual diagrams showing a method of defining a color region.

In FIG. 3, part of the sectional outline shape is shown as a sectional boundary 71a and boundaries obtained by extending and reducing it with the center of the drawing, e.g., a centroid 71e of a plane region (XY plane) defined by the sectional outline shape as a reference point are shown as an extended boundary 71b and a reduced boundary 71c. A region surrounded by these two boundaries 71b and 71c is defined as a color region 71d.

In FIG. 4, part of the sectional outline shape is shown as a sectional boundary 72a and another boundaries are provided on positions at an interval of specified distance in a predetermined direction, e.g., rightwards and leftwards in the X direction, being shown as an offset boundaries 72b and 72c. A region surrounded by these two boundaries 72b and 72c is defined as a color region 72d.

In FIG. 5, part of the sectional outline shape is shown as a sectional boundary 73a and a region in the vicinity of the sectional boundary 73a is divided in meshes. Then, a region consisting of the meshes including the sectional boundary 73a and three meshes each on both right and left sides thereof is defined as a color region 73d.

The color regions defined as above are colored in the step ST2 as discussed with reference to FIG. 1. When the sheets are laminated, a portion outside the sectional outline drawing a closed curve is unnecessary and to be removed in the end. Thus, by widening the color region, cutting can be performed within the color region even if the sheets are mislaligned, out of the laminating position.

Though the above discussion has been made on the assumption that the sectional outline shape of the solid model is represented by one close curve, the sectional outline shape may be represented by a plurality of close curves. A method of defining the color region of the sectional shape in such a case will be discussed below, referring to FIGS. 6 to 9.

FIGS. 6 and 7 show exemplary solid models whose sectional outline shapes are each represented by a plurality of closed curves. FIG. 6 shows a cylinder 66 having an elliptic through hole 67 along an axis and FIG. 7 shows a cylinder 68 provided with an elliptic cylinder 69 on its upper surface 70.

Figure 8:
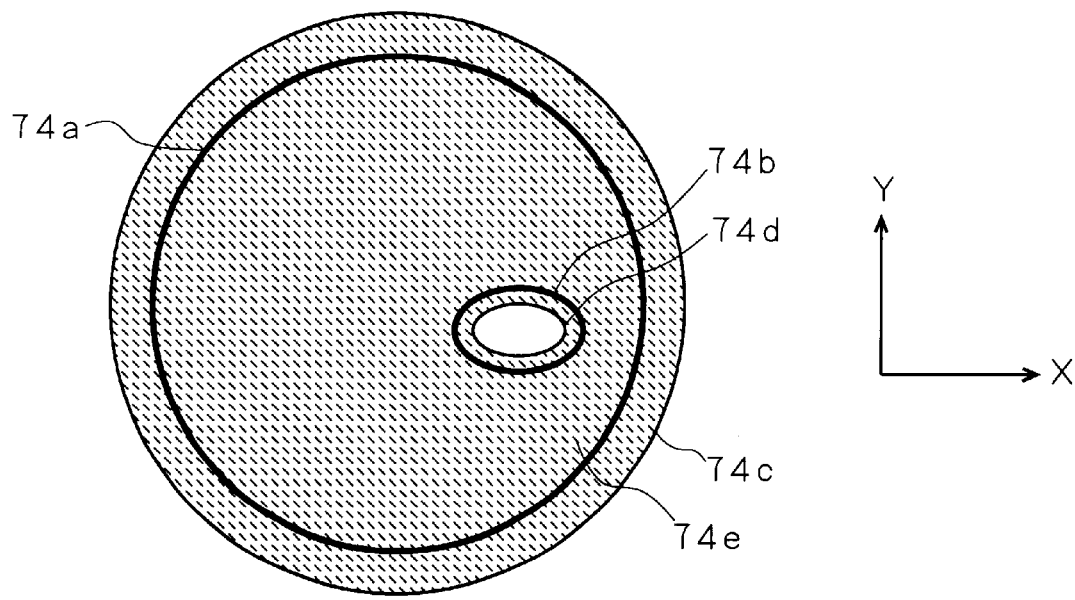
FIGS. 8 and 9 are conceptual diagrams showing methods of defining a color region.

FIG. 8 is a cross section showing the cylinder 66 of FIG. 6 taken at any position and showing the cylinder 68 of FIG. 7 taken at the upper surface 70. FIG. 8 shows a peripheral outline of the cylinders 66 and 68 as an outer boundary 74a, an outline of the through hole 67 and the elliptic cylinder 69 as an inner boundary 74b, a boundary provided externally away from the outer boundary 74a by a specified distance as an offset boundary 74c, a boundary provided internally away form the inner boundary 74b by a specified distance as an offset boundary 74d and a region between these two boundaries as a color region 74e.

Figure 9:
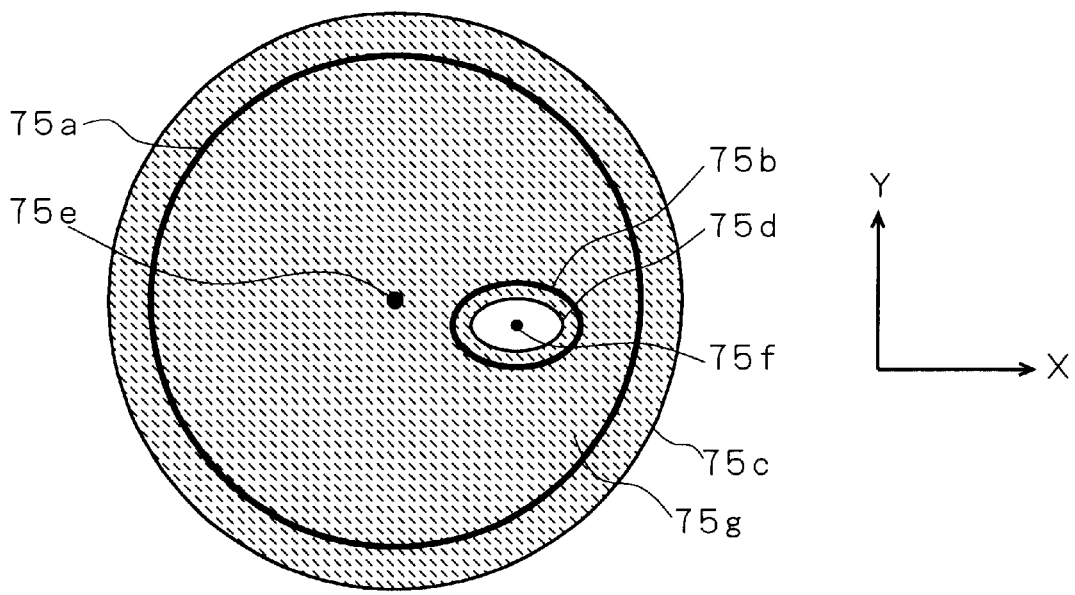

FIG. 9 is also a cross section showing the cylinder 66 of FIG. 6 taken at any position and showing the cylinder 68 of FIG. 7 taken at the upper surface 70. FIG. 9 shows a peripheral outline of the cylinders 66 and 68 as an outer boundary 75a, an outline of the through hole 67 and the elliptic cylinder 69 as an inner boundary 75b, an extended boundary 75c obtained by extending the outer boundary 75a with a center 75e of a plane region (XY plane) defined by the outer boundary 75a as a reference point, a reduced boundary 75d obtained by reducing the outer boundary 75a with a center 75f of a plane region (XY plane) defined by the inner boundary 75b as a reference point and a region between the extended boundary 75c and the reduced boundary 75d as a color region 75g.

As to the adhesion region of the sectional shape, at least an overlapped portion (logical product portion) of sectional shapes of the sheets to be bonded to each other is a possible adhesion region.

The adhesion region has only to be a region to which at least one colored toner can be transferred, and for example, in FIG. 3, a region on the side of the centroid 71e, surrounded by the reduced boundary 71c is an adhesion region. In other words, as a bonding toner and a coloring toner, substantially the same toner is used, and transfer of the bonding toner is carried out by using the coloring unit 21 described with reference to FIG. 2, like the transfer of the coloring toner. Therefore, when the logical product portion includes the color region, the bonding toner may not be transferred to that portion since the coloring toner has an adhesion strength.

Further, a region other than the logical product portion on the sheet may be used as an adhesion region. For example, in FIG. 3, a region outside the extended boundary 71b, i.e., a region on the side opposite to the centroid 71e may be used as an adhesion region. Since this region is to be removed in the end, however, in order to hold the shape of the three-dimensional object, it is necessary to define an adhesion region in the logical product portion.

In the adhesion region, changing the density, concentration, transfer pattern of the bonding toner allows control of the adhesion strength. In regions other than the logical product portion on the sheets bonded to each other, the transfer may be made with a bonding toner of lower density or lower concentration than in the logical product portion or in meshes.

<A-1-8. Method of Generating Image Data on Color Region>

Next, a method of generating the image data in the color region will be discussed, referring to FIGS. 10 to 17. FIG. 10 shows a cylinder model 90 as an example of solid model. The cylinder has a color band 93 in which a plurality of different color regions range along a surface of the cylinder.

Figure 12:
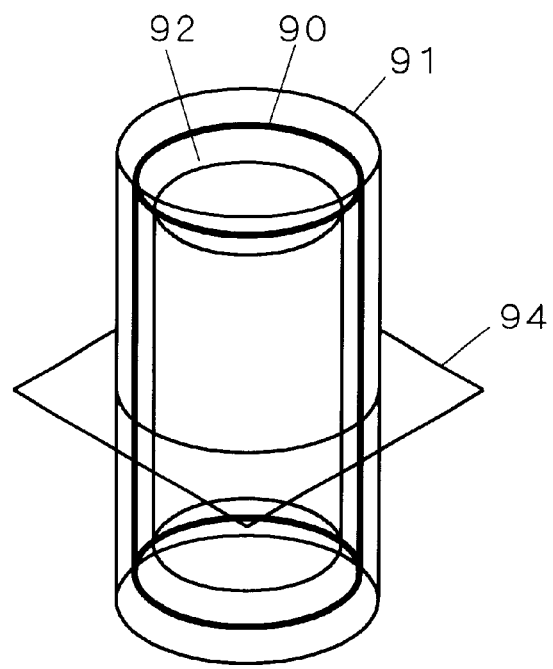

Among exemplary methods of generating the image data of color region is a method using an extended model and a reduced model of the cylinder model 90. Specifically, as shown in FIG. 11, an expanded model 91 and a reduced model 92 obtained by expanding and reducing the outline shape of the cylinder model 90, respectively, are overlapped so that respective centroids M may coincide. Then, in a region between the expanded model 91 and the reduced model 92, color data are set on regions radially divided around the centroid M on the basis of the color data on polygons of the surface of the cylinder model 90. Subsequently, as shown in FIG. 12, assuming that the cylinder model 90, the expanded model 91 and the reduced model 92 are cut by a rectangular region 94 assumed to be a sheet, image data of the color region on the sheet are generated from the color data in a portion crossing the rectangular region 94. The divided blocks shown in FIG. 11 correspond in size to the color regions of the color band 93, for convenience.

Figure 13:
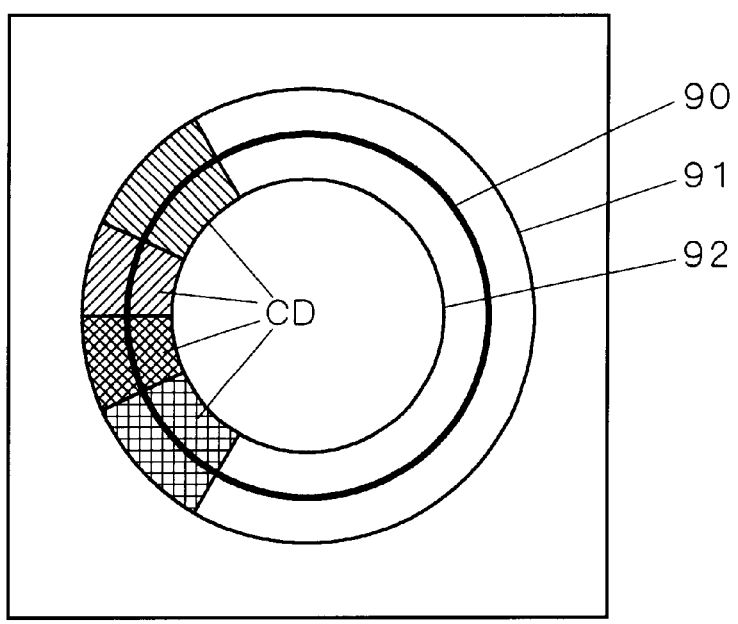

FIG. 13 schematically shows the image data in the section by the rectangular region 94. As shown in FIG. 13, in a region between the expanded model 91 and the reduced model 92, the color data CD are set correspondingly to an arrangement of the color regions of the color band 93.

Thus, the method of setting the color data CD in the region between the expanded model 91 and the reduced model 92 is in common with the method of defining the color region discussed with reference to FIG. 3, and combination of these methods is effective.

Another exemplary method of generating image data of the color region is a method of projecting a texture of a portion having color data of the expanded model of the cylinder model 90 in FIG. 14, i.e., of the color band 93 on the color region.

Specifically, in FIG. 15 showing the section of the model, a texture ZZ of a surface of the expanded model 91 of the cylinder model 90 is projected towards the centroid M of the models, to obtain the image data CD of the color region.

Figure 16:
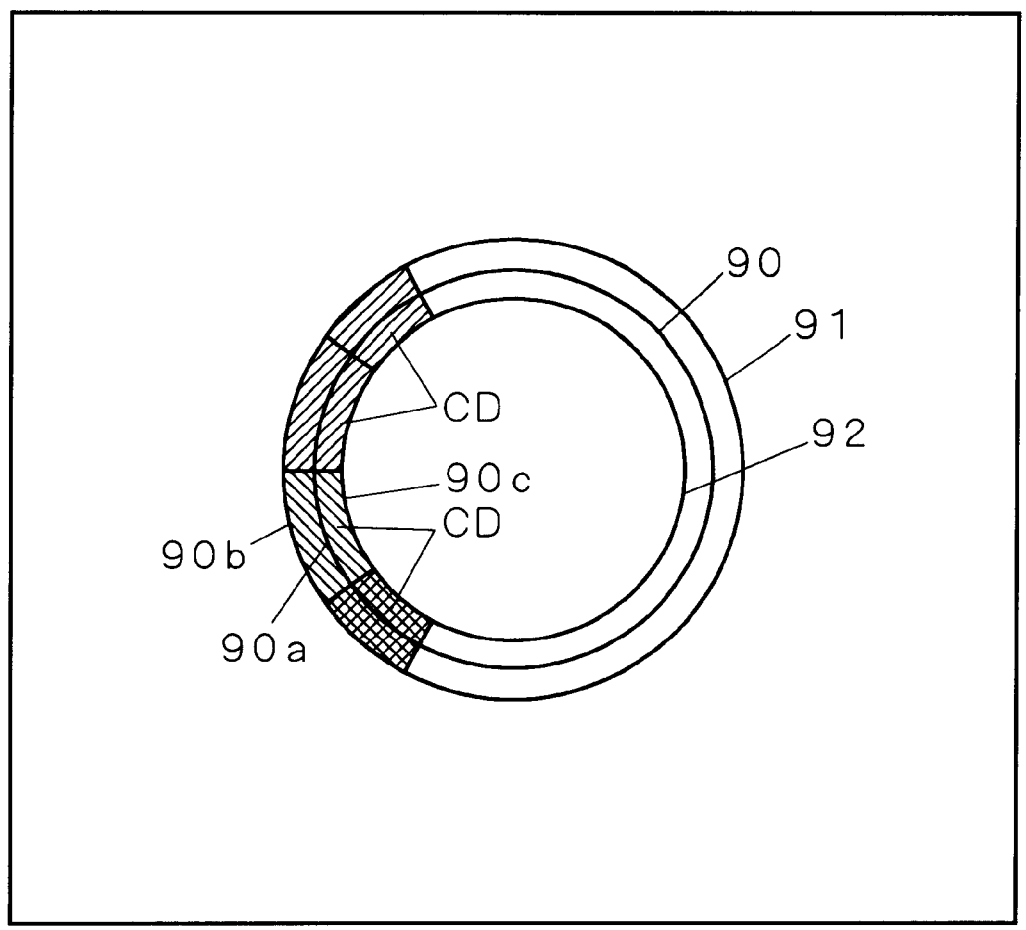

FIG. 16 shows part of the sectional outline shape of the cylinder model 90 as a sectional boundary 90a, and an expanded boundary 90b and a reduced boundary 90c obtained by expanding and reducing the sectional boundary 90a, respectively. A region between the expanded boundary 90b and the reduced boundary 90c is defined as a color region, and the texture of the surface of the expanded model 91 is projected, to obtain the image data CD of the color region. The direction of projecting the texture is not limited to the direction in this preferred embodiment, but may be determined appropriately in accordance with the shape of the model.

Further, when the color region is a region of the appearance of the sheet, a portion having the color data of the surface of the cylinder model 90, i.e., the texture of the surface of the cylinder model 90 is projected from the surface of the cylinder model 90 to the color region of the sheet, to obtain the image data of the color region.

Furthermore, image data of the adhesion region can be determined relatively easily only if the image data of the color region are determined. Specifically, it is necessary only to define all the regions other than the color region or a region other than the color region in the portion (logical product portion) in which the sheets to be bonded to each other are overlapped as the adhesion region and appropriately determine the color, density, concentration and transfer pattern of the toner to be transferred thereto. When sufficient adhesion strength can be obtained by the toner for the color region, no bonding toner is needed to transfer.

<A-2. Characteristic Function and Effect>

According to the method for forming a three-dimensional object of this preferred embodiment as discussed above, the color-region image data used for coloring the section with the colors on the surface of the solid model is prepared as the sectional shape data of the solid model and the outline portion on the sheet is colored on the basis of the image data, reflecting the colors on the side surface of the laminated body when the sheets are laminated, to obtain a three-dimensional object which looks as if its surface is colored. Since the color region is basically defined in the outline portion on the sheet, coloring is made in less time at lower cost for coloring material and a three-dimensional colored object can be formed faster at lower cost.

<A-3. The First Variation>

Though the coloring unit 21 including the intermediate transfer belt 13 is provided perpendicularly below the sheet surface in the three-dimensional object forming apparatus 100 described with reference to FIG. 2 since the toner is transferred to the lower surface of the sheet 1 taken out from the paper cassette or paper tray, if the sheet 1 taken out from the paper cassette or paper tray is reversed, the coloring unit 21 including the intermediate transfer belt 13 can be provided perpendicularly above the sheet surface.

Figure 17:
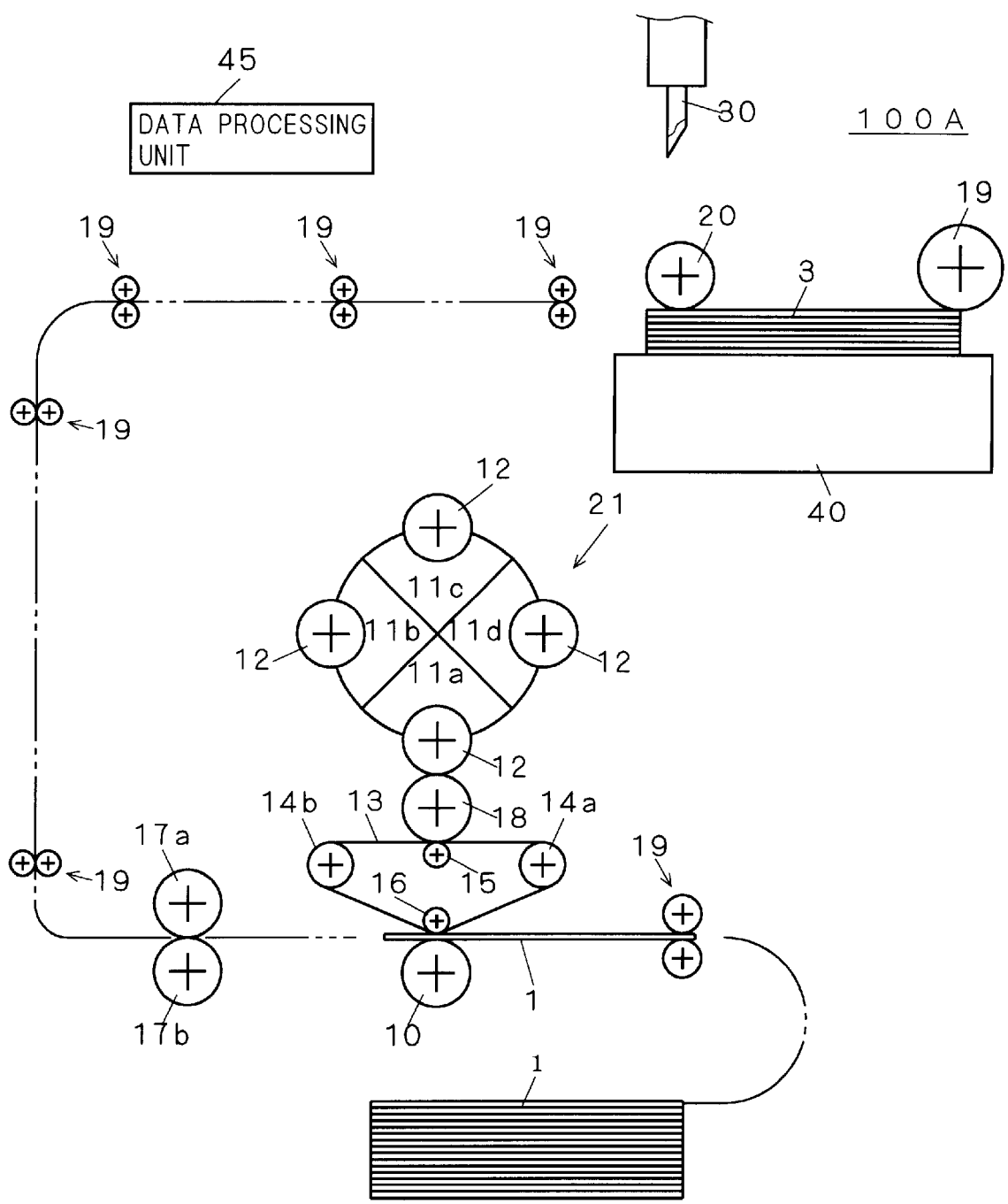
FIGS. 17 to 19 illustrate apparatuses for forming a three-dimensional object in accordance with variations of the first preferred embodiment.

A constitution to achieve this is shown in FIG. 17 as a three-dimensional object forming apparatus 100A. As shown in FIG. 17, the sheet 1 taken out from the paper cassette or paper tray (not shown) is reversed and then conveyed to the coloring unit 21. The coloring unit 21 is provided perpendicularly above the sheet surface, and the toner is transferred to the originally-back surface. After the toner transferred to the sheet 1 is heated between the heat rollers 17a and 17b and fixed, the sheet 1 is reversed again through a conveyance passage consisting of a plurality of pairs of conveyance rollers and laminated on the laminating mount 40 with the originally-back surface facing below. The steps of transferring the toner, cutting the sheet 1 and the like are executed like in the three-dimensional object forming apparatus 100.

Though the coloring unit 21 including the intermediate transfer belt 13 is provided perpendicularly below the sheet surface in the three-dimensional object forming apparatus 100 described with reference to FIG. 2 since the toner is transferred to the lower surface of the sheet 1 taken out from the paper cassette or paper tray, if the toner is transferred to the upper surface of the sheet 1, the coloring unit 21 including the intermediate transfer belt 13 can be provided perpendicularly above the sheet surface.

Figure 18:
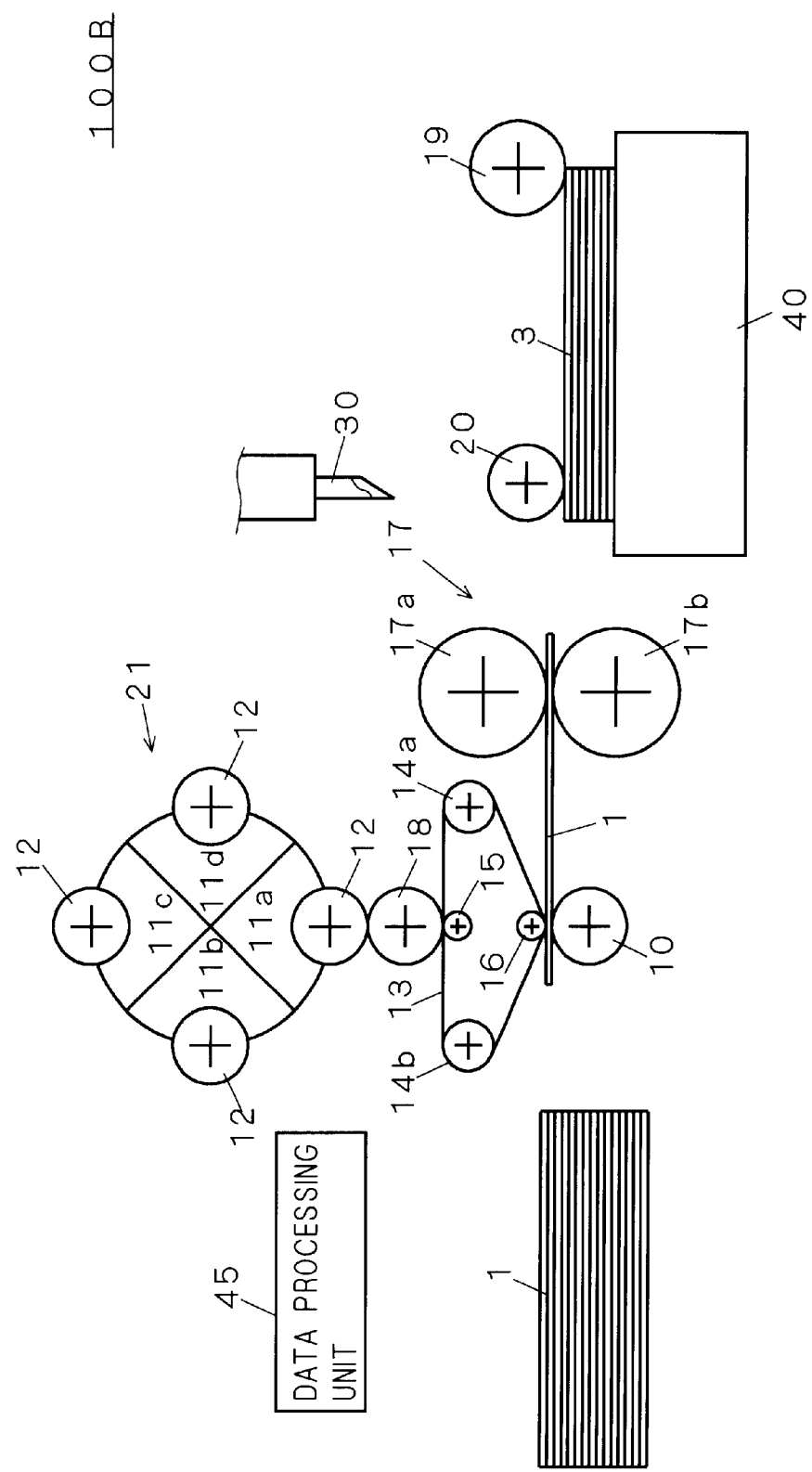

A constitution to achieve this is shown in FIG. 18 as a three-dimensional object forming apparatus 100B. As shown in FIG. 18, the sheet 1 taken out from the paper cassette or paper tray (not shown) is conveyed to the coloring unit 21. The coloring unit 21 is provided perpendicularly above the sheet surface, and the toner is transferred to the upper surface of the sheet 1. After the toner transferred to the sheet 1 is heated between the heat rollers 17a and 17b and fixed, the sheet 1 is laminated on the laminating mount 40. The steps of transferring the toner, cutting the sheet 1 and the like are executed like in the three-dimensional object forming apparatus 100.

<A-4. The Second Variation>

Though the movement of the laminating mount 40 in the vertical direction has not been particularly mentioned in the three-dimensional object forming apparatus 100 described with reference to FIG. 2, the laminating mount 40 which is movable in the vertical direction can produce the following function and effect.

Figure 19:
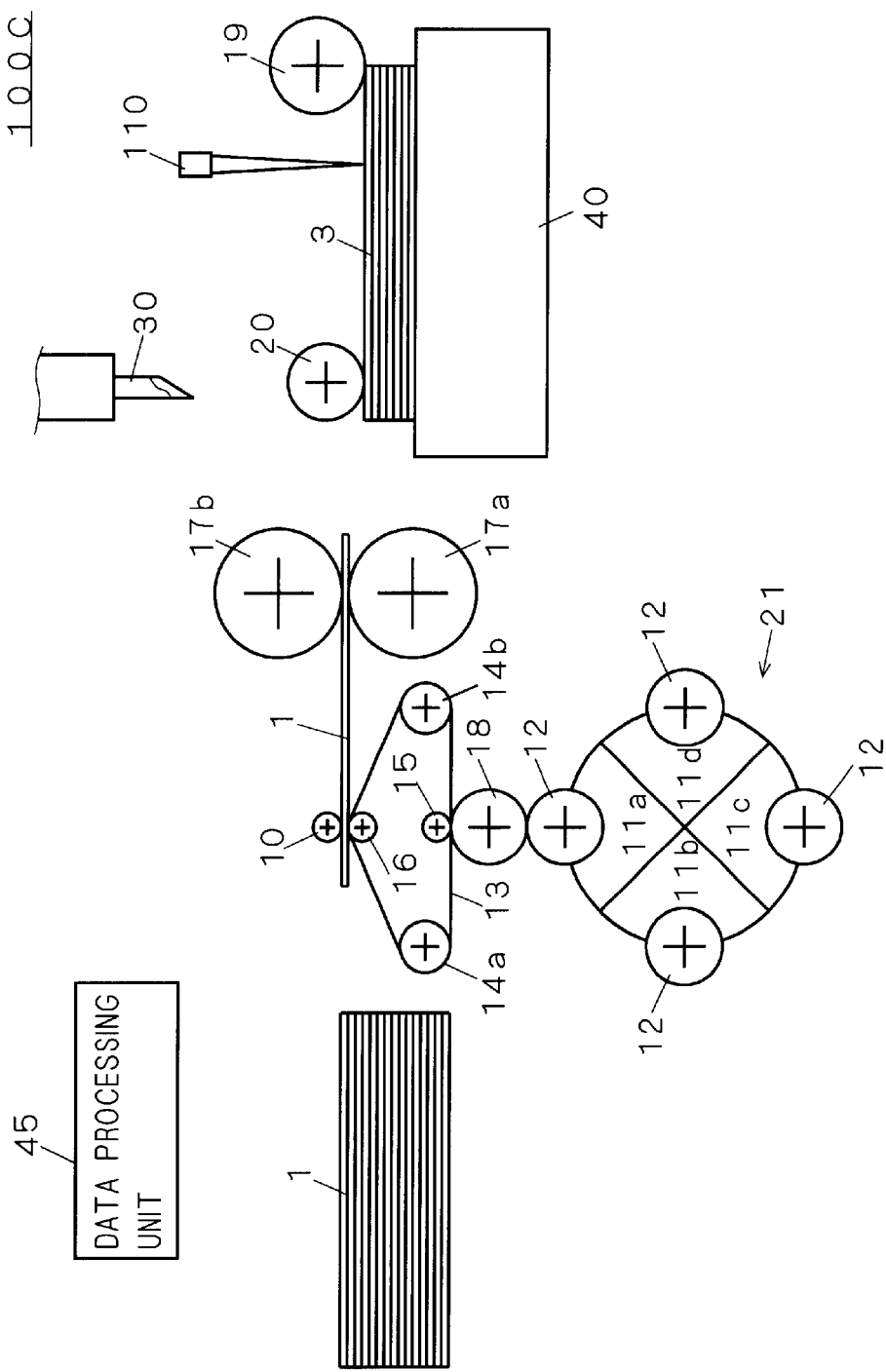
Figure 20:
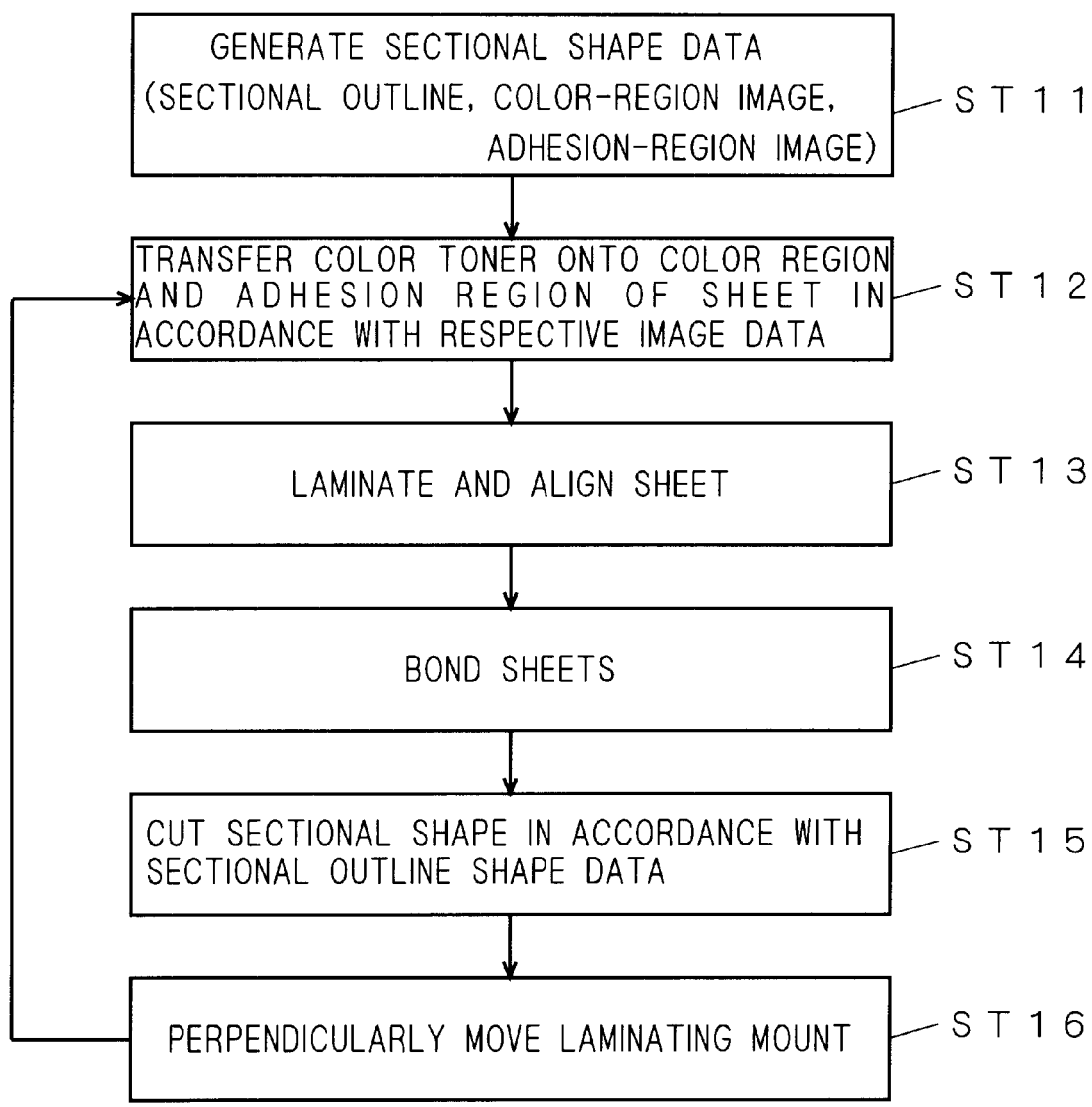
FIGS. 20 to 22 are flow charts showing operations in accordance with the variations of the first preferred embodiment.

FIG. 19 shows a three-dimensional object forming apparatus 100C having the laminating mount 40 which is movable in a vertical direction (Z direction) and a sensor 110 for measuring the height of the laminated body of the sheets on the laminating mount 40. Elements in this apparatus 100C identical to those of the three-dimensional object forming apparatus 100 of FIG. 2 are given the same reference signs and redundant discussion will be omitted. FIG. 20 shows a flow chart showing an operation of the forming apparatus 100C.

In the flow chart of FIG. 20, the operations of the steps ST11 to ST15 are the same as those of the steps ST1 to ST5, and no discussion will be made thereon. After the operation of the step ST15 is finished, by measuring the position of the top processed sheet 3 with the sensor 110 and moving the laminating mount 40 perpendicularly below, for example, until the surface position of the top sheet reaches a predetermined position (in the step ST16), the surface position of the top processed sheet 3 is kept at the position on the start of laminating and the sheet 1 conveyed from the coloring unit 21 can be smoothly put on the top of the processed sheets 3. After the sheet 1 is put on the top of the processed sheets 3, the operations of the step ST12 and the following steps are repeated.

The direction of movement of the laminating mount 40 is not limited to perpendicularly below, but the laminating mount 40 may move perpendicularly above or horizontally.

In the above discussion, the information on the position of the top sheet is used only for control on movement of the laminating mount 40, the information on the height of the laminated sheets may be fed back to the step of generating the sectional shape data of the solid model.

Specifically, though at least one sheet corresponds to one layer of section in the sectional shape data of the solid model, it is necessary to increase and decrease, e.g., the number of slices of the solid model depending on the thickness of the sheet. The sectional shape data of the solid model include data on the thickness of sheet and the thickness of the sheet is calculated from the information on the height of laminated sheets, to control the number of slices of the solid model.

Figure 21:
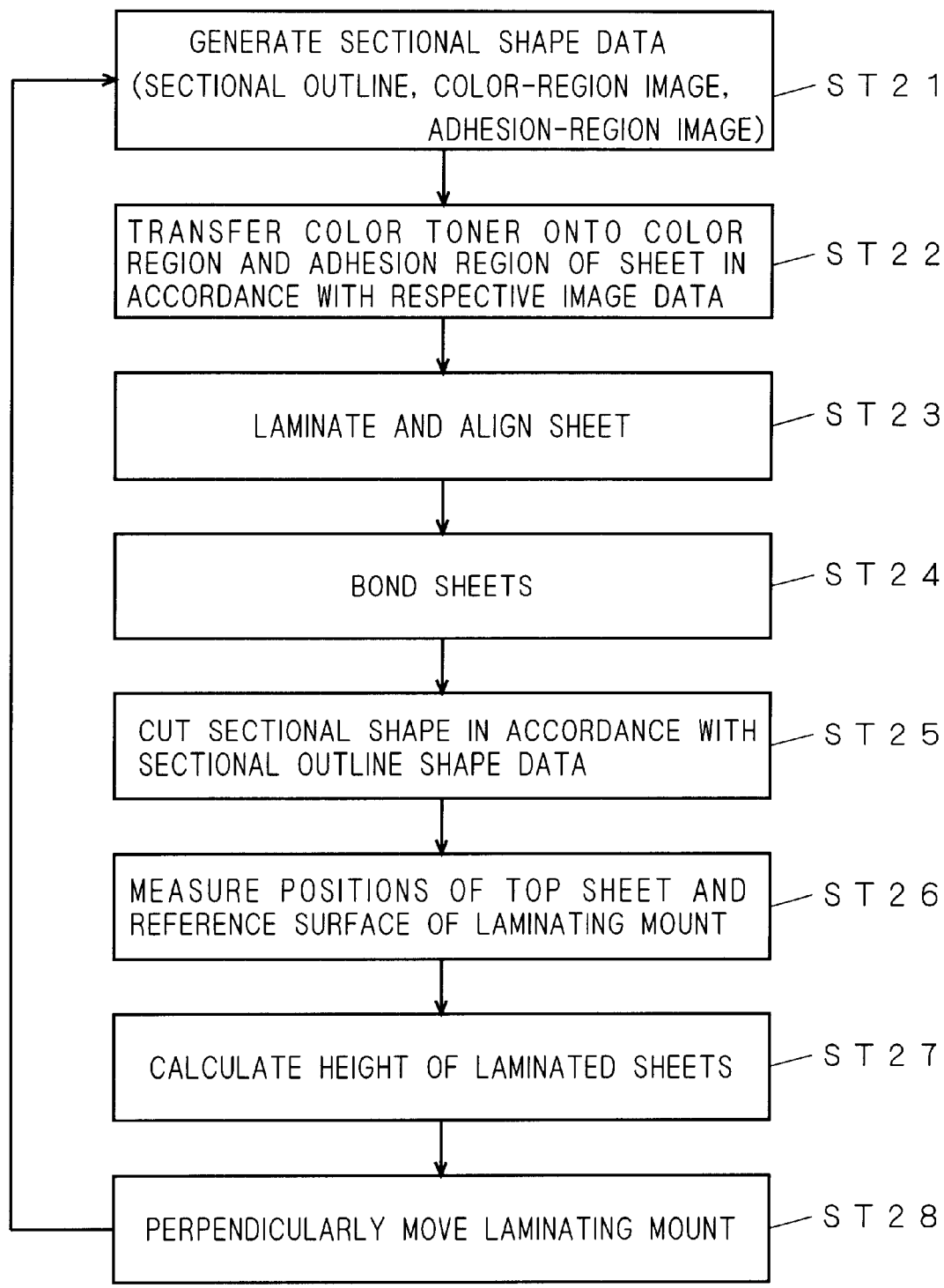
Figure 22:
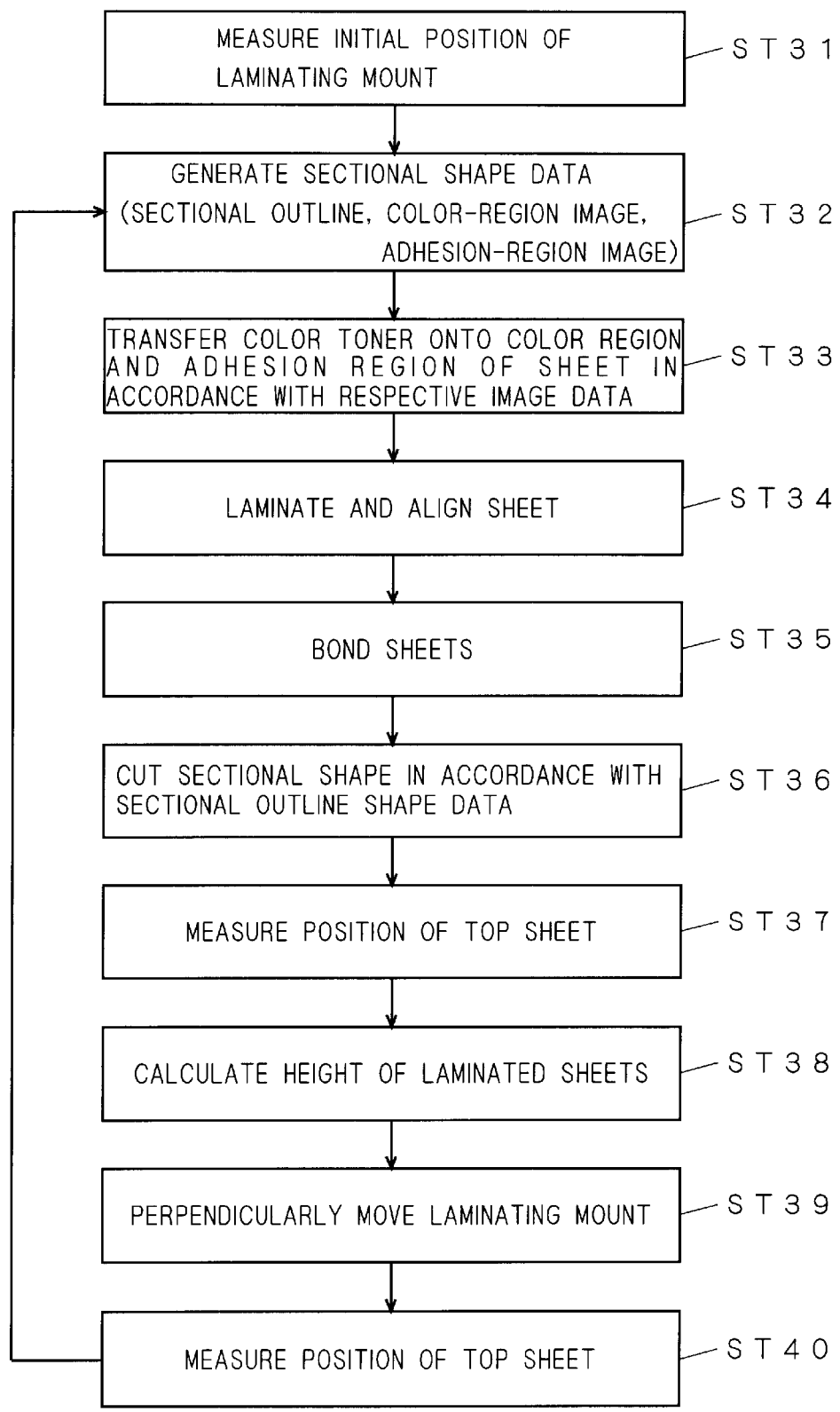

FIGS. 21 and 22 show exemplary methods for forming a three-dimensional object where the information on the height of laminated sheets is fed back to the step of generating the sectional shape data of the solid model.

First, an example of operation in the flow chart of FIG. 21 will be discussed. The operations of the steps ST21 to ST25 of FIG. 21 are the same as those of the steps ST1 to ST5 discussed with reference to FIG. 1, so no discussion will be made thereon. In FIG. 21, after the operation of the step ST25 is finished, the position of the top processed sheet 3 and the position of a reference surface of the laminating mount 40 are measured with the sensor 110 in the step ST26, and the height of laminated processed sheets 3 is calculated in the step ST27. In the step ST28, the laminating mount 40 is moved perpendicularly below, for example, until the surface position of the top sheet reaches a predetermined position while the thickness of the sheet is calculated, for example, in the step ST21 on the basis of the information on the height of laminated processed sheets 3 and the calculated thickness is fed back to generation of the sectional shape data. This allows control of the number of slices of the solid model in accordance with the thickness of sheet and a three-dimensional object of high accuracy can be obtained.

Next, an example of operation in the flow chart of FIG. 22 will be discussed. The operations of the steps ST32 to ST36 of FIG. 22 are the same as those of the steps ST1 to ST5 discussed with reference to FIG. 1, so no discussion will be made thereon. In FIG. 22, after the operation of the step ST36 is finished, the position of the top processed sheet 3 is measured with the sensor 110 in the step ST37, and the height of laminated processed sheets 3 is calculated from an initial position of the laminating mount 40 measured in the step ST31 in advance in the step ST38. In the step ST39, the laminating mount 40 is moved perpendicularly below, for example, until the surface position of the top sheet reaches a predetermined position and in the step ST40, by measuring the position of the top processed sheet 3 again, the thickness of the sheet is obtained from the amount of movement of the laminating mount 40 and the calculated thickness is fed back to generation of the sectional shape data. This allows control of the number of slices of the solid model in accordance with the thickness of sheet and a three-dimensional object of high accuracy can be obtained.

<A-5. The Third Variation>

Though the coloring unit 21 including the rotary developing device is used, in the step ST2, when the color toner is transferred to the color region and the adhesion region on the sheet by electrophotographically electrostatic transfer in the three-dimensional object forming apparatus 100 described with reference to FIG. 2, a coloring unit of tandem system in which photoreceptor drums are arranged in series, instead of the coloring unit 21, may be used to transfer the color toner onto a continuous sheet.

Figure 24:
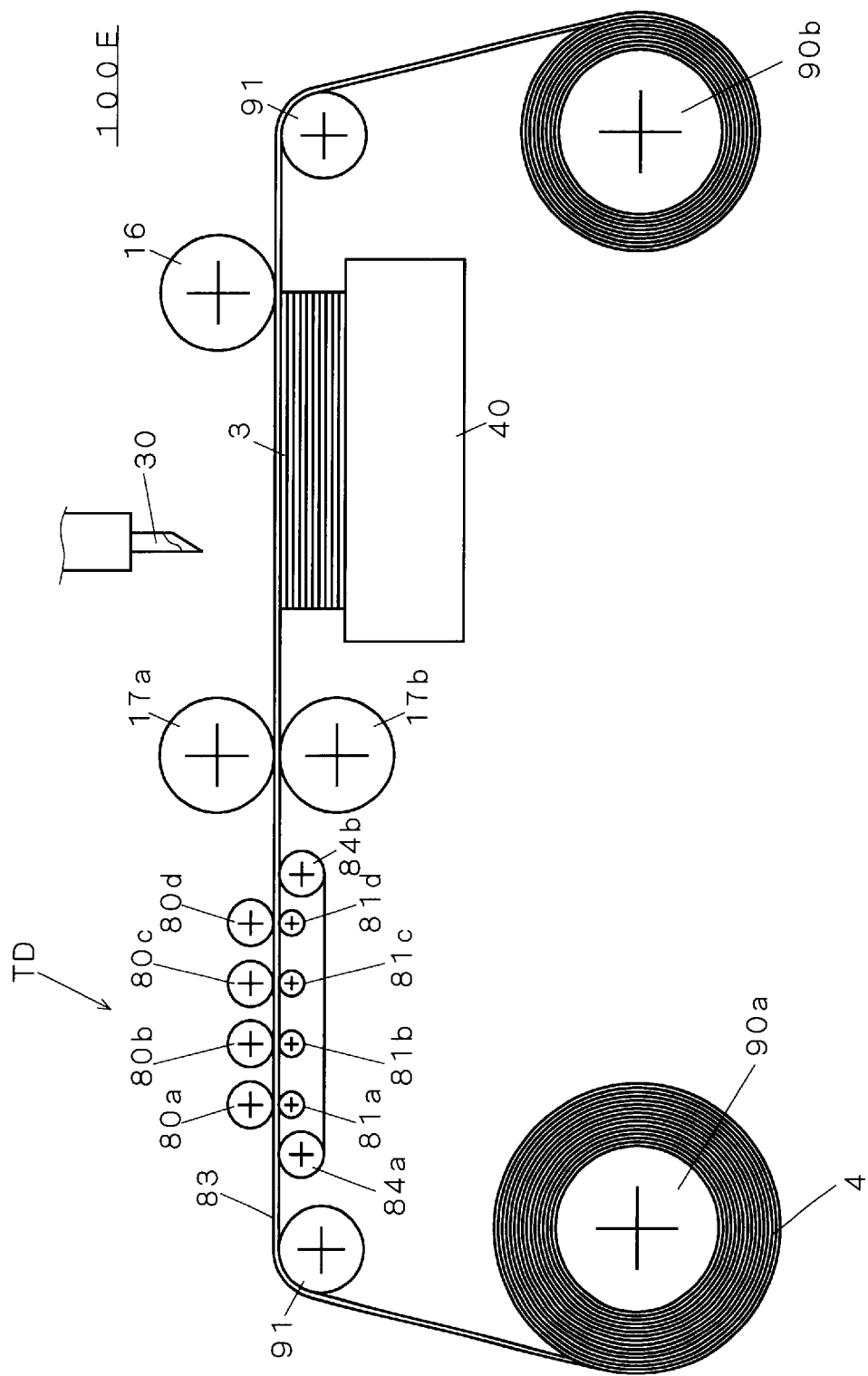
Figure 25:
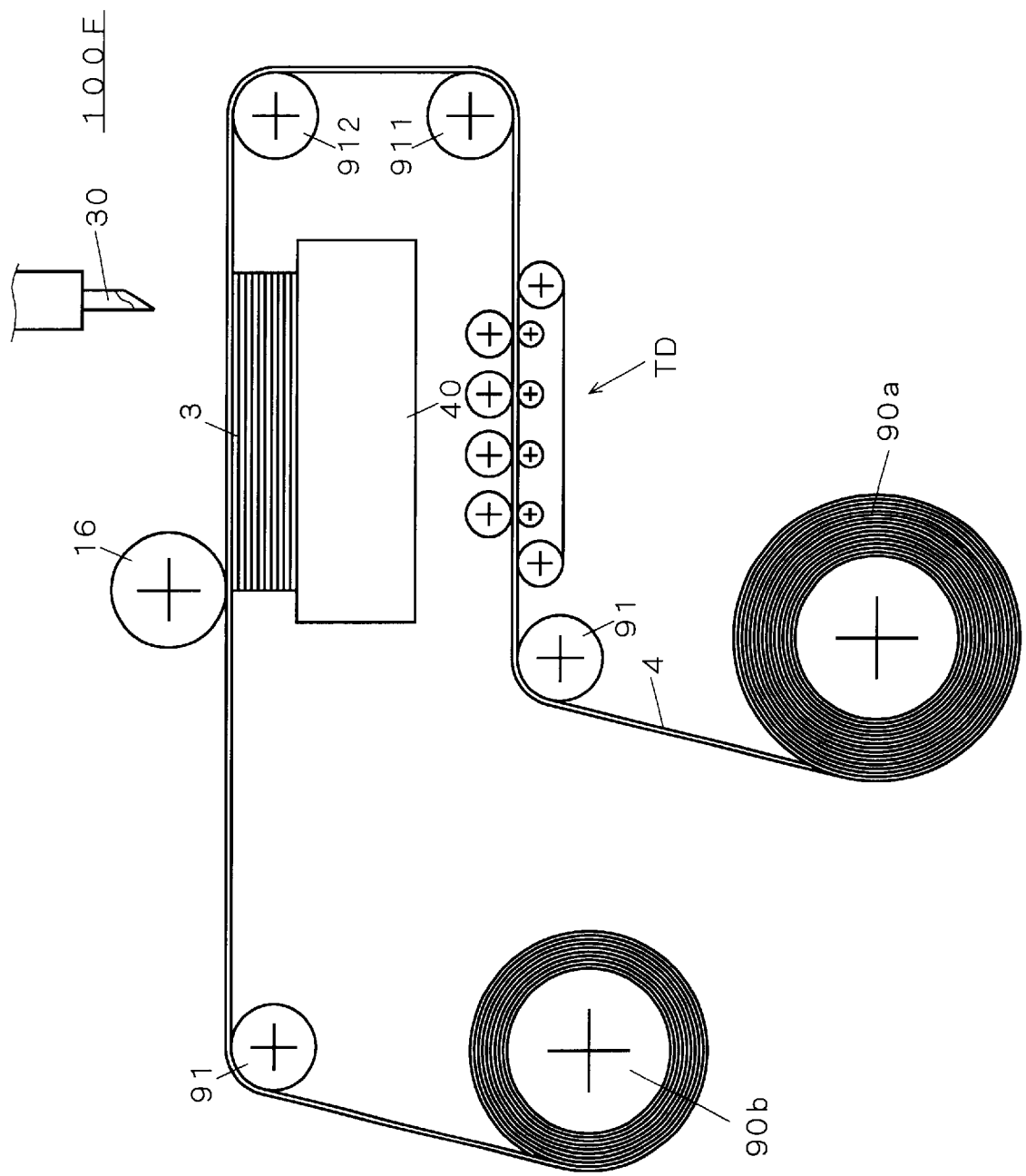

A constitution of the three-dimensional object forming apparatus using the coloring unit of tandem system will be discussed below, referring to FIGS. 23 to 25.

Figure 23:
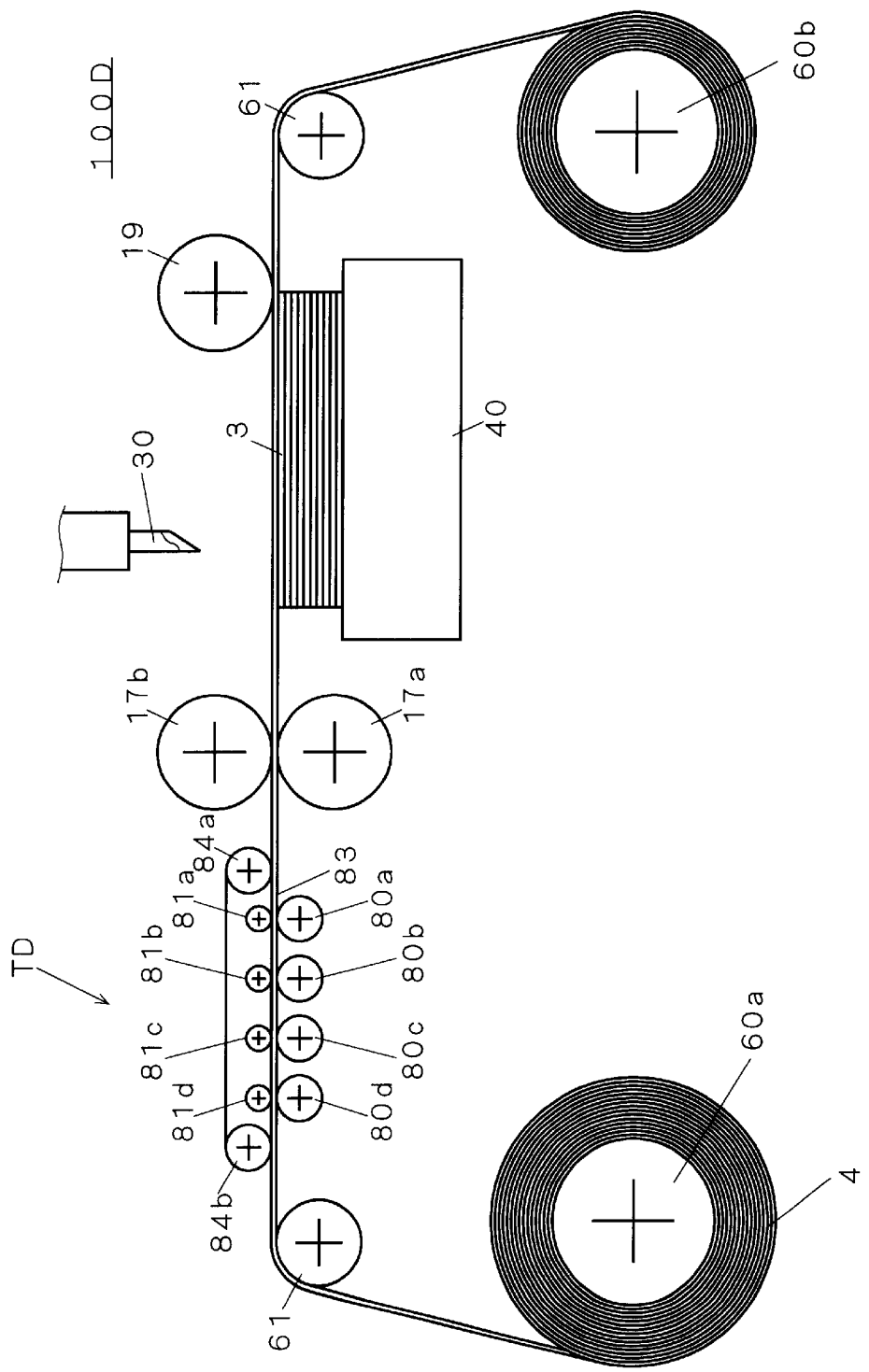
FIGS. 23 to 25 illustrate apparatuses for forming a three-dimensional object in accordance with another variations of the first preferred embodiment.

FIG. 23 shows a constitution of a three-dimensional object forming apparatus 100D using a coloring unit of tandem system to transfer the color toner onto the continuous sheet.

In FIG. 23, a coloring unit of tandem system TD mainly comprises photoreceptor drums 80a, 80b, 80c and 80d arranged in series, adsorbing color toners of e.g., C (cyan), M (magenta), Y (yellow) and Bk (black), respectively, to form an image, a transfer belt 83 and transfer rollers 81a, 81b, 81c and 81d opposed to the photoreceptor drums 80a to 80d, respectively, with the transfer belt 83 interposed therebetween. The transfer belt 83 is driven in a loop by a driving roller 84a and a slave roller 84b.

Around the photoreceptor drums 80a to 80d provided are an electrifier for electrifying the drums, a light source for removing electric charges on the drums on the basis of the image data and a developing device comprising a toner source for supplying a toner and the like, and these elements are not shown for simple illustration.

The image developed on the photoreceptor drums 80a to 80d by the respective color toners is transferred onto a continuous sheet 4 by sandwiching the continuous sheet 4 stretching between a feed roller 60a and a winding roller 60b between the transfer belt 83 and the photoreceptor drums 80a to 80d and sequentially performing electrostatic transfer in accordance with movement of the continuous sheet 4. The toner transferred onto the continuous sheet 4 is held between the heat rollers 17a and 17b, being heated and fixed.

The operations of the steps ST1 to ST5 discussed with reference to FIG. 1 are performed in common, and a toner-fixed portion of the continuous sheet 4 is conveyed onto the laminating mount 40 by conveyance operation of a conveyance roller 61, laminated, aligned and bonded, and then cut along the sectional outline shape with the cutter 30, with an unnecessary portion removed, to be the processed sheet 3. The unnecessary portion which is cut off, remaining on the continuous sheet 4, is taken up by the winding roller 60b.

Alternatively, when the continuous sheet 4 has frames each defining a transfer region like a photographic film, after bonding, the continuous sheet 4 is cut along the sectional outline shape and an outline of the frame including it and an unnecessary portion outside the frame, remaining on the continuous sheet 4, is taken up by the winding roller 60*b*. Since an unnecessary portion inside the frame is removed after laminating, notching in meshes or radially or perforating in cutting the sheet along the sectional outline shape makes it easier to remove the unnecessary portion.

Though the coloring unit TD of tandem system including the photoreceptor drums 80*a* to 80*d* is provided perpendicularly below the sheet surface in the above three-dimensional object forming apparatus 100D since the toner is transferred to the lower surface of the continuous sheet 4, if the toner is transferred to the upper surface of the continuous sheet 4, the coloring unit TD of tandem system including the photoreceptor drums 80*a* to 80*d* may be provided perpendicularly above the sheet surface. A constitution to achieve this is shown in FIG. 24 as a three-dimensional object forming apparatus 100E.

Alternatively, when the toner is transferred onto the upper surface of the continuous sheet 4 and the continuous sheet 4 is laminated with the surface facing below, as shown in a three-dimensional object forming apparatus 100F of FIG. 25, the coloring unit TD of tandem system including the photoreceptor drums 80*a* to 80*d* is provided perpendicularly above the sheet surface, and the feed roller 60*a* and the winding roller 60*b* are disposed so that the upper surface of the continuous sheet 4 may be superimposed on the processed sheets 3.

Use of the above three-dimensional object forming apparatuses 100D to 100F allows conveyance of the continuous sheet 4, being tensed, between the feed roller 60*a* and the winding roller 60*b* and quick and accurate alignment of the continuous sheet 4 on the laminating mount 40, thereby reducing color discrepancy of the color region. Further, since the intervals for arranging the sectional images on the continuous sheet 4 can be arbitrarily changed in accordance with the size of the object, the unnecessary portion on the sheet is reduced and in other words, waste of the sheet is cut.

Furthermore, simultaneous generation of sectional shapes of a plurality of solid models and giving different colors to sections of a solid model make it possible to form objects of different shapes at a time and form objects of the same shape and different colors and patterns at a time, respectively.

Figure 26:
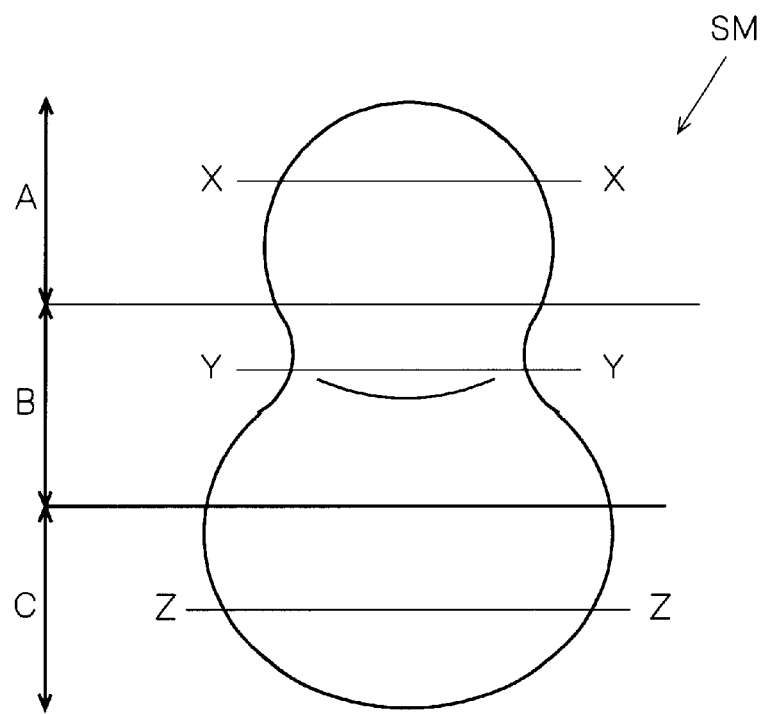
Figure 27:
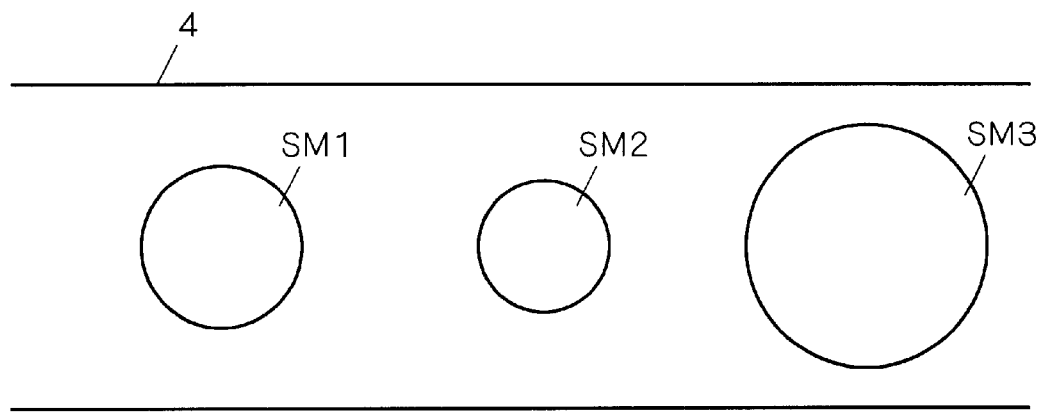

Further, by dividing a solid model to be two-dimensionally arranged on the continuous sheet, the height of laminated sheets becomes lower to form an object faster. For example, in a case of a solid model SM shown in FIG. 26, the solid model SM is divided into a portion A, a portion B and a portion C and respective sectional shape data are generated. As an example, a sectional shape SM1 taken along the line XX of the portion A of FIG. 26, a sectional shape SM2 taken along the line YY of the portion B and a sectional shape SM3 taken along the line ZZ of the portion C are arranged two-dimensionally on the continuous sheet 4 in FIGS. 27 and 28. FIG. 28 shows a constitution including a frame WK defining a transfer region.

Thus, by transferring the respective sectional shapes of the solid model SM at a time and aligning and cutting them on the laminating mount 40, a three-dimensional object of the solid model SM, being divided, can be formed at a time and the object can be obtained faster.

B. The Second Preferred Embodiment

Though the above discussion of the first preferred embodiment is made on a case where the sheets have one kind of thickness, the thickness may be changed depending on portions of the three-dimensional object. A method for forming a three-dimensional object in accordance with the second preferred embodiment of the present invention will be discussed below, referring to FIGS. 29 and 30.

<B-1. Constitution and Operation>

Figure 29:
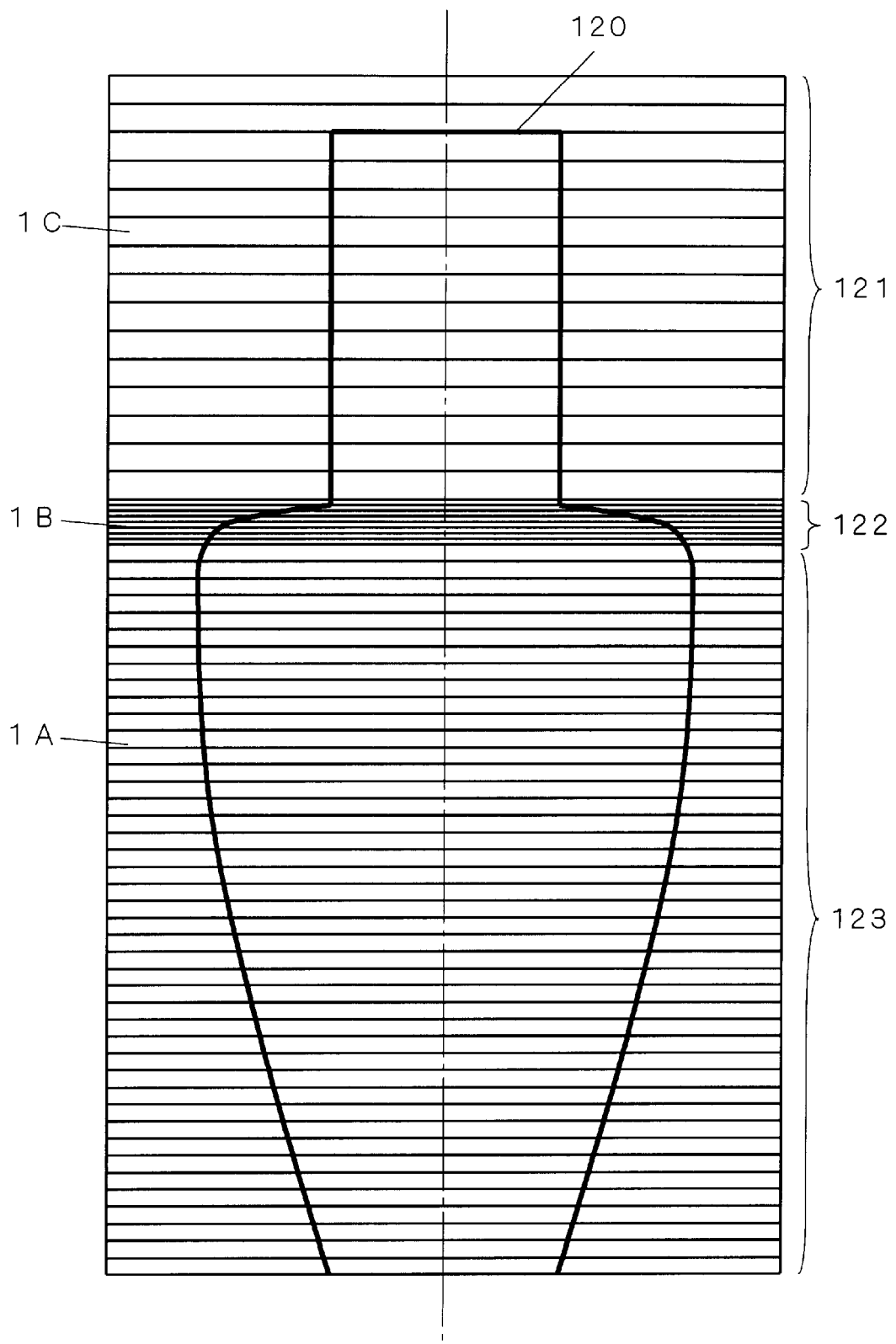
FIG. 29 is a conceptual diagram showing an operation in accordance with a second preferred embodiment.
Figure 30:
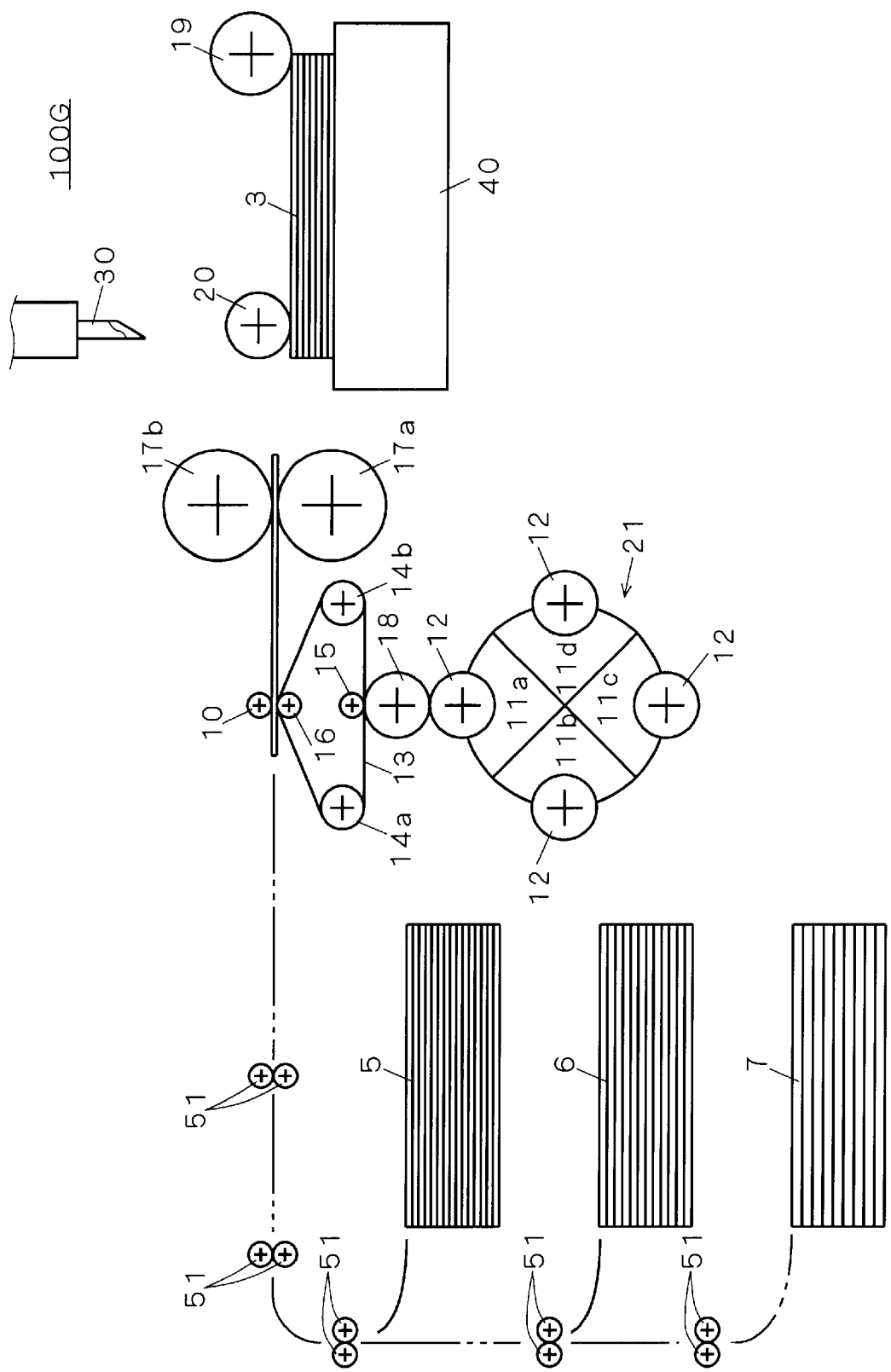
FIG. 30 illustrates an apparatus for forming a three-dimensional object in accordance with the second preferred embodiment.

FIG. 29 is a schematic diagram showing a three-dimensional object 120 which is formed so that sheets may have different thicknesses depending on portions, and FIG. 30 shows a constitution of a three-dimensional object forming apparatus 100G. FIG. 29 shows a state where processed sheets are laminated before removing the unnecessary portions from the processed sheets.

As shown in FIG. 29, the three-dimensional object 120 consists of three kinds of sheets having different thicknesses. Specifically, a sheet 1A having a first thickness is used in a lower portion 123 having a sectional shape with a relatively gentle curvature and a relatively large change in the X-Y direction, a sheet 1B having a second thickness is used in a middle portion 122 having a sectional shape with a sharp curvature and a large change in the X-Y direction and a sheet 1C having a third thickness is used in an upper portion 121 having a simple sectional shape with little change in the X-Y direction. As to the thicknesses, the sheet 1C is the thickest, the sheet 1A is the second thickest and the sheet 1B is the thinnest. The thickness of the sheets ranges from about 50 to 150 μm.

The three-dimensional object forming apparatus 100G of FIG. 30 comprises three kinds of feeders 5, 6 and 7 holding the respective sheets having different thicknesses. The sheets outputted from the feeders 5 to 7 are conveyed through a conveyance passages consisting of a plurality of conveyance rollers 51 to the coloring unit 21, where they are colored. The process for forming a three-dimensional object is basically the same as that of the first preferred embodiment except that the step of generating the sectional shape data of the solid model includes the steps of changing the slice interval of the solid model in accordance with the degree of variation in the sectional shape and selecting the thickness of the sheet in accordance with the slice interval. The constitution of the three-dimensional object forming apparatus 100G is basically the same as that of the three-dimensional object forming apparatus 100 of FIG. 1 except that three kinds of feeders 5, 6 and 7 are provided.

<B-2. Characteristic Function and Effect>

As discussed above, by using the sheets of different thicknesses in accordance with the degree of variation in the sectional shape, the number of used sheets can be reduced and the three-dimensional object can be obtained faster. Further, by using a thinner sheet in a portion with large degree of variation in the sectional shape, the shape cam be reproduced accurately and a three-dimensional object can be formed accurately.

C. The Third Preferred Embodiment

Figure 31:
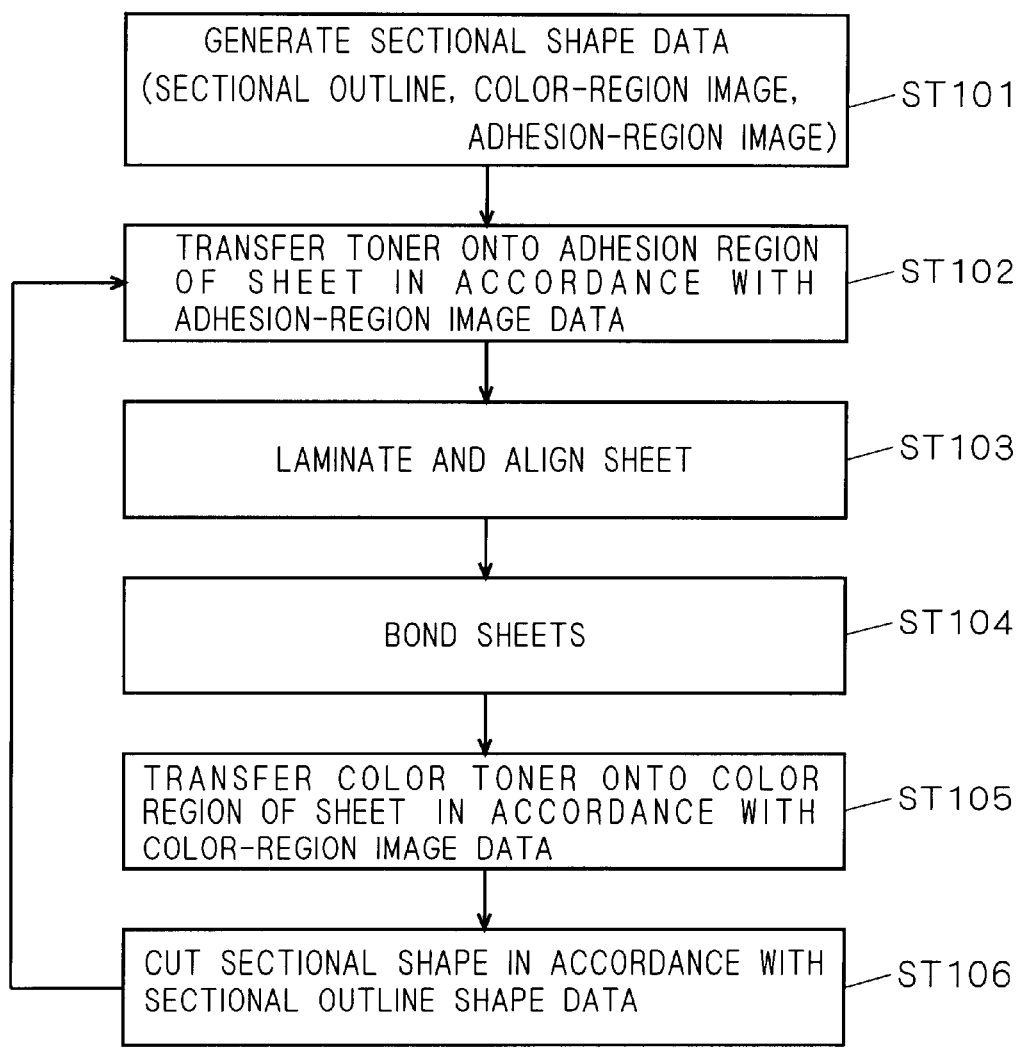
FIG. 31 is a flow chart showing a basic operation in accordance with a third preferred embodiment.
Figure 32:
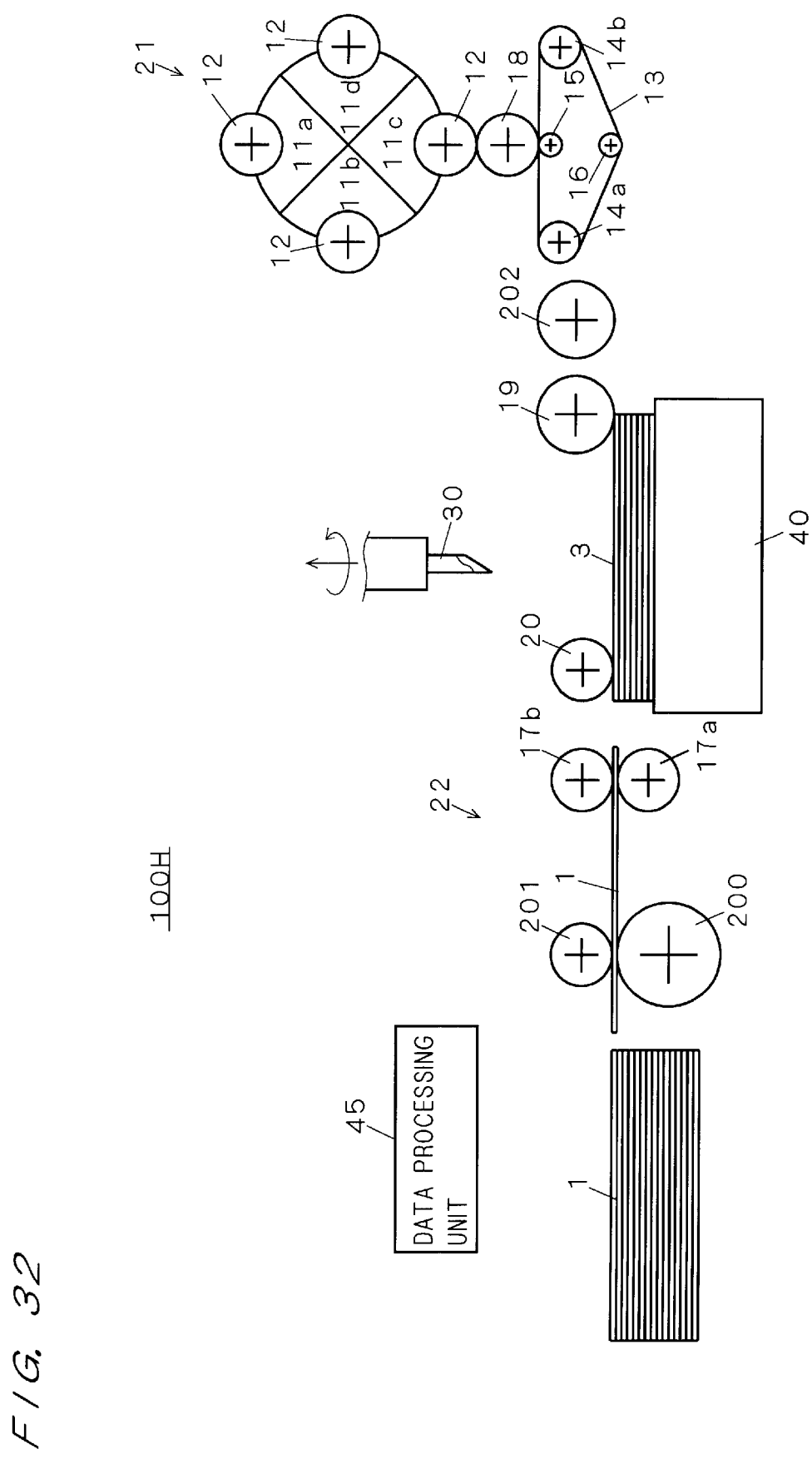
FIG. 32 illustrates an apparatus for forming a three-dimensional object in accordance with the third preferred embodiment.

FIG. 31 is a flow chart showing a basic operation of the third preferred embodiment of the method for forming a three-dimensional object in accordance with the present invention. FIG. 32 shows a constitution of a three-dimensional object forming apparatus 100H. Referring to FIGS. 31 and 32, the constitution and operation will be discussed.

<C-1. Constitution and Operation>

<C-1-1. Process for Generating Sectional Shape Data>

From three-dimensional data and color data on a solid model which are obtained from three-dimensional CAD data or by three-dimensional shape measuring instrument, in the step ST101 of FIG. 31, sectional shape data of the solid model are generated. The data are obtained by slicing the solid model in a predetermined direction and include outline-shape data defining an outline shape of a section, color-region image data used for coloring the section correspondingly to the colored position, colored range and color of a surface of the solid model and adhesion-region image data of the section. The step ST101 is executed by the data processing unit 45 of the forming apparatus 100H of FIG. 32. The input of the three-dimensional data is not limited to the three-dimensional CAD data or data from the three-dimensional shape measuring instrument.

The color region is determined as a region of an object to be colored, having a predetermined width at least in a sectional outline portion. Specifically, by coloring the outline portion, the color is reflected on a side of a laminated body when the sheets are laminated and it seems as if a surface of a three-dimensional object is colored. This effect is more pronounced when a transparent sheet is used, and is achieved even when plain paper is used.

Further, the image data of the color region can be generated by e.g., expanding a colored surface of the solid model and projecting the texture of the surface onto the above-determined color region.

The adhesion region is a region coated with an adhesive to fix the laminated sheets and a possible region therefor is at least an overlapped portion (logical product portion) in sectional shapes of the sheets to be bonded to each other. When the logical product portion includes the color region, a region in the logical product portion other than the color region may be used as the adhesion region. When the sectional outline shape is defined on the sheet, though a portion surrounding the sectional outline is unnecessary, the portion may be used as the adhesion region. Since the region is to be removed in the end, however, in order to hold the shape of the three-dimensional object, it is necessary to define an adhesion region in the logical product portion of the sectional shape. The adhesion region may be defined on both surfaces of a sheet.

Image data of the adhesion region can be determined relatively easily only if the image data of the color region are determined. Specifically, it is necessary only to define all the regions on a sheet other than the color region or a region other than the color region in the portion (logical product portion) in which sheets to be bonded to each other are overlapped as the adhesion region and appropriately determine the color, density, concentration and transfer pattern of the toner to be transferred thereto.

<C-1-2. Sheet>

The sheets mentioned in A-1-2 may be used as the sheets on which the sectional shape of the solid model is printed.

<C-1-3. Transfer of Bonding Toner>

Next, in the step ST102, a transparent toner is transferred as an adhesive by electrophotographically electrostatic transfer onto the adhesion region in accordance with the adhesion-region image data. This step ST102 is executed by a bonding toner transfer unit 22 shown in FIG. 32.

The bonding toner transfer unit 22 mainly comprises a photoreceptor drum 200 for transferring a bonding toner, e.g., a transparent toner onto a sheet, a transfer roller 201 opposed to the photoreceptor drum 200 and the heat rollers 17a and 17b.

Around the photoreceptor drum 200 provided are an electrifier for electrifying the drum, a light source for removing electric charges on the drums on the basis of the image data and a developing device comprising a toner source for supplying a toner and the like, and these elements are not shown for simple illustration.

In the bonding toner transfer unit 22 of FIG. 32, the bonding toner developed on the photoreceptor drum 200 on the basis of the adhesion-region image data, herein transparent toner, is transferred, as if adsorbed to a side of the electrified transfer roller 201, onto the adhesion region of the sheet 1 supplied from not-shown feeding means.

The reason why the transparent toner is transferred onto the adhesion region on the sheet is that, for example, even when the color region of a first sheet which is laminated on a second sheet is adjacent to the adhesion region of the second sheet, without reflecting the color of the adhesion region of the second sheet on the color region of the first sheet, the color of the color region of the first sheet is clearly reflected on the surface of the three-dimensional object.

Further, the adhesion region may be defined on both surfaces of the sheet 1 to transfer the transparent toner onto the both surfaces. In this case, it is necessary to provide another pair of the photoreceptor drum 200 and the transfer roller 201, or a sheet-reversing mechanism to reverse the sheet 1 after transferring the transparent toner onto one side, for transferring the transparent toner onto the other side.

The transparent toner transferred onto the sheet 1 is held between the heat rollers 17a and 17b, being heated and fixed. As a method of fixing toner, besides the above heating by the heat roller, a flash fixing method, an oven fixing method and a laser-irradiation fixing method may be used.

When a transparent sheet is used, by transferring a white toner as an adhesive onto the adhesion region on the sheet, a light entering the inside of the sheet is diffused and the color of the color toner transferred onto the color region can be clearly reflected on the surface of the three-dimensional object.

Further, a transfer of toner is not limited to the electrostatic transfer, but the toner may be jetted out from a nozzle to be transferred onto the sheet. Alternatively, the toner may be melted and jetted onto the sheet for transfer.

Furthermore, in the adhesion region, the adhesion strength can be controlled by changing density, concentration and transfer pattern of the bonding toner. In regions other than the logical product portion on the sheets bonded to each other, e.g., an unnecessary portion, the transfer may be made with a bonding toner of lower density or lower concentration than in the logical product portion or in meshes.

<C-1-4. Laminating and Bonding Process>

The sheet 1 to which the transparent toner is transferred and fixed is conveyed piece by piece onto the laminating mount 40, aligned by an align roller 20 on the processed sheets 3 with the surface to which the transparent toner is transferred facing below and laminated (in the step ST103). After fixing, static built up on the sheet 1 may be removed before laminating.

Next, a heat roller 19 heats and pressurizes the sheet 1 on the laminated body of the processed sheets 3, melting the transparent toner of the processed sheet 3 or the sheet 1, to bond the sheet 1 onto the processed sheets 3 (in the step ST104).

Further, the sheet 1 may be effectively bonded through heating and pressurization by hot press as well as with heat roller. In heating and pressurization with heat roller and by hot press, at least one of heating temperature arid applied pressure can be controlled and by changing it according to at least one of the kind of sheet, the amount of toner to be transferred, ambient temperature, humidity, the number of laminated sheets and laminating condition, an appropriate adhesion strength and an object of less distortion can be obtained.

Furthermore, by coating a surface of the heat roller or a hot press plate with a material resistant to deposit of the toner on the sheet, such as PFA (perflouro-alkkoxyfluoro plastics) and PTFE (polytetrafluoroethylene), it is possible to prevent unnecessary toner from depositing to the heat roller and the hot press plate and the sheet is not contaminated.

With a bonding toner whose fixing temperature is lower than that of a coloring toner, the sheet 1 may be conveyed onto the laminated body of the processed sheets 3 on the laminating mount 40, aligned, laminated and heated at a temperature to melt only the bonding toner, to bond the sheet 1 to the processed sheets 3.

On the other hand, when toners which are melted at the same temperature are used as the coloring toner and the bonding toner, the adhesion strength is reinforced by the coloring toner.

<C-1-5. Transfer of Color Toner>

Next, in the step ST105, the color toner is transferred onto the color region of the sheet 1 by electrophotographically electrostatic transfer in accordance with the color-region image data. This step ST105 is executed by the coloring unit 21 of FIG. 32.

<C-1-6. Coloring Unit>

The coloring unit 21 has the same constitution as that of FIG. 2. On the basis of the color-region image data, toners of respective colors are sequentially developed on the photoreceptor drum 18, and after the toners are further transferred on the intermediate transfer belt 13, the intermediate transfer belt 13 onto which the toners are transferred is interposed between the support roller 16 and the sheet 1, to electrostatically transfer the toner onto the sheet 1.

In FIG. 32, the coloring unit 21 is not in contact with the sheet 1. FIG. 32 shows the laminating and bonding process in the step ST104, and after the laminating and bonding process of the step ST104 is finished, the laminating mount 40 moves to below the coloring unit 21, so that the intermediate transfer belt 13 comes into contact with the sheet 1. This state is shown in FIG. 33.

Figure 33:
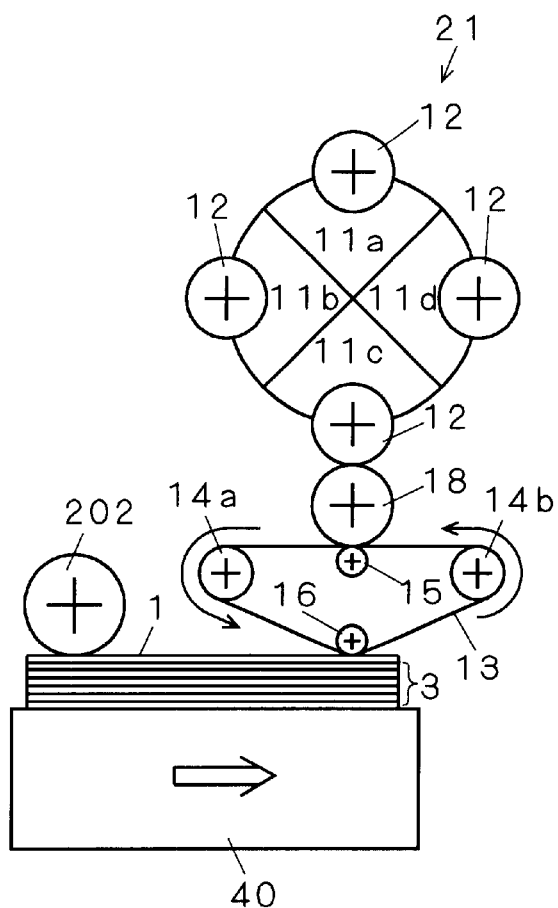
FIGS. 33 and 34 show operations in accordance with the third preferred embodiment.

Referring to FIG. 33, a transfer process of the color toner will be discussed below in detail. As shown in FIG. 33, when the laminating mount 40 moves from the position of FIG. 32 in the direction of the arrow (rightward), an electrifying roller 202 scans the sheet 1 from right hand to left hand to provide the sheet 1 with electric charges which adsorb the color toners. After that, the intermediate transfer belt 13 of the coloring unit 21 comes into contact with the sheet 1 and the color toners on the intermediate transfer belt 13 of the coloring unit 21 are drawn by the electric charges on the sheet 1, transferring (electrostatically transferring) to the color region.

Further, the sheet 1 may be electrified with an electrifying brush, instead of the electrifying roller 202. The transfer of toner is not limited to the electrostatic transfer, but the toner may be jetted out from a nozzle to be transferred onto the sheet. Alternatively, the toner may be melted and jetted onto the sheet for transfer.

Figure 34:
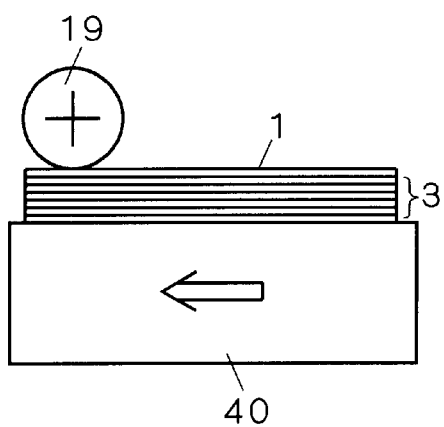

When the transfer of the color toner onto the sheet 1 is finished, as shown in FIG. 34, the laminating mount 40 moves again in the opposite direction (leftward) and the heat roller 19 disposed on the left side of the electrifying roller 202 scans the sheet 1 to heat and fix the color toner. As a method of fixing toner, besides the above heating by the heat roller, a flash fixing method, an oven fixing method and a laser-irradiation fixing method may be used.

Further, instead of the coloring unit 21 including the rotary developing device, the coloring unit of tandem system in which the photoreceptor drums are arranged in series may be used to transfer the color toner.

<C-1-7. Cutting Process>

After laminating and bonding steps and the transfer of the color toner onto the color region, the sheet 1, together with the laminating mount 40, moves to below the cutter 30, as shown in FIG. 32, and is cut in accordance with the outline shape on the basis of the sectional outline shape data, removing an unnecessary portion, to be the processed sheet 3.

The end of the step ST106 completed a series of processing on one sheet 1, and subsequently the steps ST102 to ST106 are executed on the next sheet 1. This operation is repeated on all the sectional data of the solid model, to obtain an objective three-dimensional object.

Further, there may be a case in the step ST106, where a sheet is cut along the sectional outline shape, then without removing an unnecessary portion thereof, the next sheet is laminated and after laminating all the sheets, unnecessary portions are removed by an operation like punching.

Furthermore, instead of moving the laminating mount 40, the coloring unit 21, the cutter 30 or the like may be moved onto the laminating mount 40, depending on the process.

<C-2. Characteristic Function and Effect>

According to the third preferred embodiment of the present invention as discussed above, the color-region image data used for coloring the section with the colors on the surface of the solid model and the adhesion-region image data used for laminating and bonding the sheet are prepared as the sectional shape data of the solid model, the transparent toner is transferred as an adhesive onto the adhesion region on the basis of the adhesion-region image data for laminating and bonding, then at least the outline portion on the sheet is colored on the basis of the color-region image data. Therefore, even if the sheet is misaligned to some degree, as the transfer position of the developing device is not shifted in coloring, the color toner can be transferred regardless of misalignment of the sheet and a three-dimensional object colored without color discrepancy can be obtained.

<C-3. The First Variation>

Though the sheet 1 is electrified in advance with the electrifying roller 202 and then the color toner on the intermediate transfer belt 13 of the coloring unit 21 is adsorbed to the electric charges on the sheet 1 in the three-dimensional object forming apparatus 100H described with reference to FIG. 32, by utilizing the support roller 16 of the coloring unit 21 as an electrifying roller in which electric charges repelling the color toner are built up, the color toner can be transferred without electrifying the sheet 1 in advance.

It goes without saying that combination of the above constitution and the constitution where the electrifying roller 202 provides the sheet 1 with electric charges adsorbing the color toner may be used.

Further, instead of the support roller 16 of the coloring unit 21, a heating roller 16A capable of heating may be used to melt the color toner on the intermediate transfer belt 13 to be transferred onto the sheet 1. This constitution is shown in FIG. 35. In this constitution, the electrifying roller is unnecessary and not provided.

In this case, a condition that the affinity between the sheet 1 and the color toner is stronger than that between the intermediate transfer belt 13 and the color toner must be satisfied. To satisfy this condition, the surface of the intermediate transfer belt 13 is coated with a material resistant to deposit of toner, such as PFA (perfluoro-alkoxyfluoro plastics) and PTFE (polytetrafluoroethylene).

<C-4. The Second Variation>

Though the movement of the laminating mount 40 in the vertical direction has not been particularly mentioned in the three-dimensional object forming apparatus 100H described with reference to FIG. 32, the laminating mount 40 which is movable in the vertical direction can produce the following function and effect.

Figure 36:
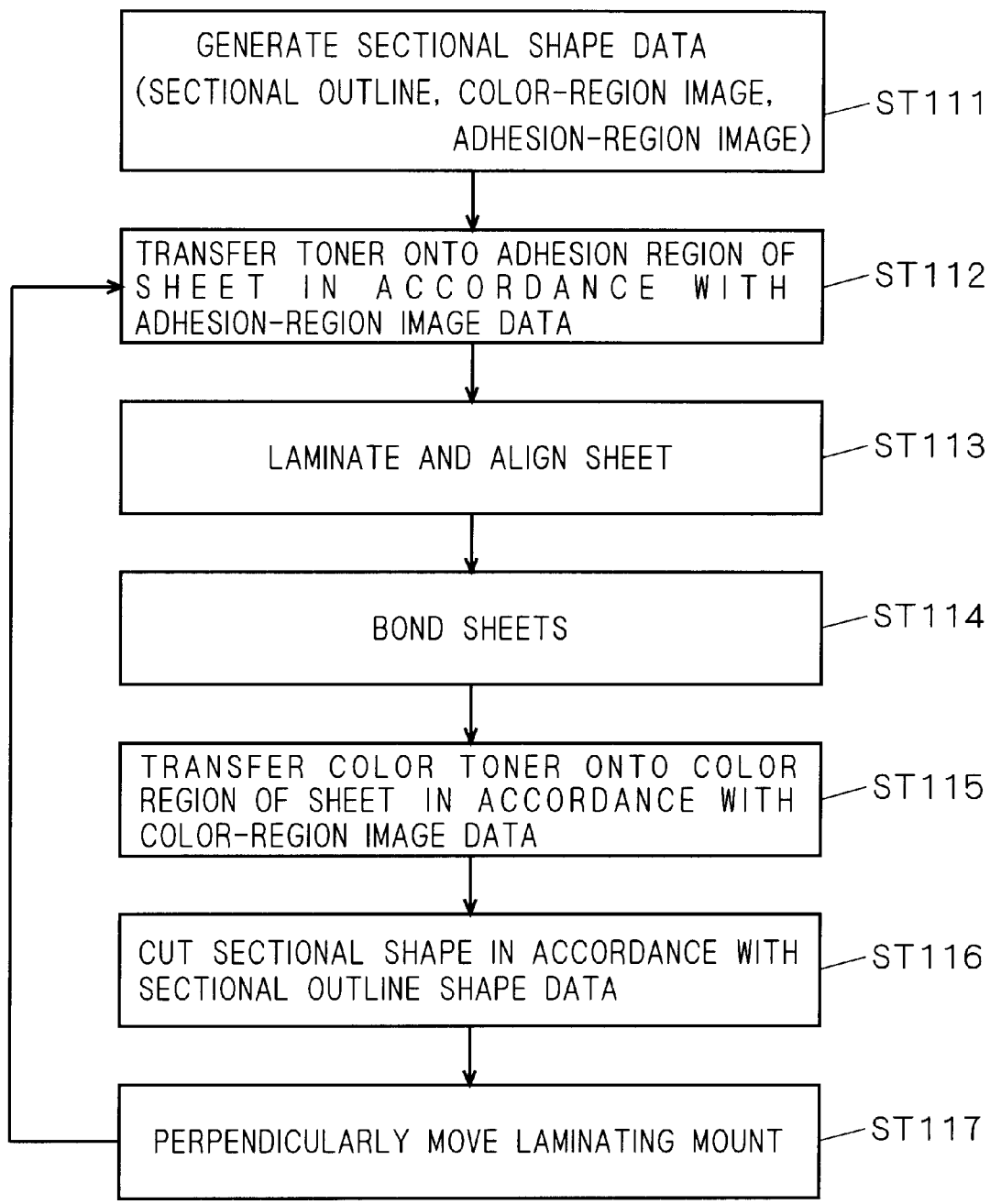
FIG. 36 is a flow chart showing an operation in accordance with the variation of the third preferred embodiment.

FIG. 36 is a flow chart showing an operation when the laminating mount 40 is movable in the vertical direction.

In the flow chart of FIG. 36, the operations of the steps ST111 to ST116 are the same as those of the steps ST101 to ST106 of FIG. 31, and no discussion will be made thereon. After the operation of the step ST116 is finished, by measuring the position of the top processed sheet 3 with, e.g., a sensor which measures the height of the laminated body of sheets and moving the laminating mount 40 perpendicularly below, for example, until the surface position of the top sheet reaches a predetermined position (in the step ST117), the surface position of the top processed sheet 3 is kept at the position on the start of laminating and the sheet 1 conveyed from the coloring unit 21 can be smoothly put on the top of the processed sheets 3. After the sheet 1 is put on the top of the processed sheets 3, the operations of the step ST112 and the following steps are repeated.

In the above discussion, the information on the position of the top sheet is used only for control on movement of the laminating mount 40, the information on the height of the laminated sheets may be fed back to the step of generating the sectional shape data of the solid model.

Specifically, though at least one sheet corresponds to one layer of section in the sectional shape data of the solid model, it is necessary to increase and decrease, e.g., the number of slices of the solid model depending on the thickness of the sheet. The sectional shape data of the solid model include data on the thickness of sheet and the thickness of the sheet is calculated from the information on the height of laminated sheets, to control the number of slices of the solid model.

Figure 37:
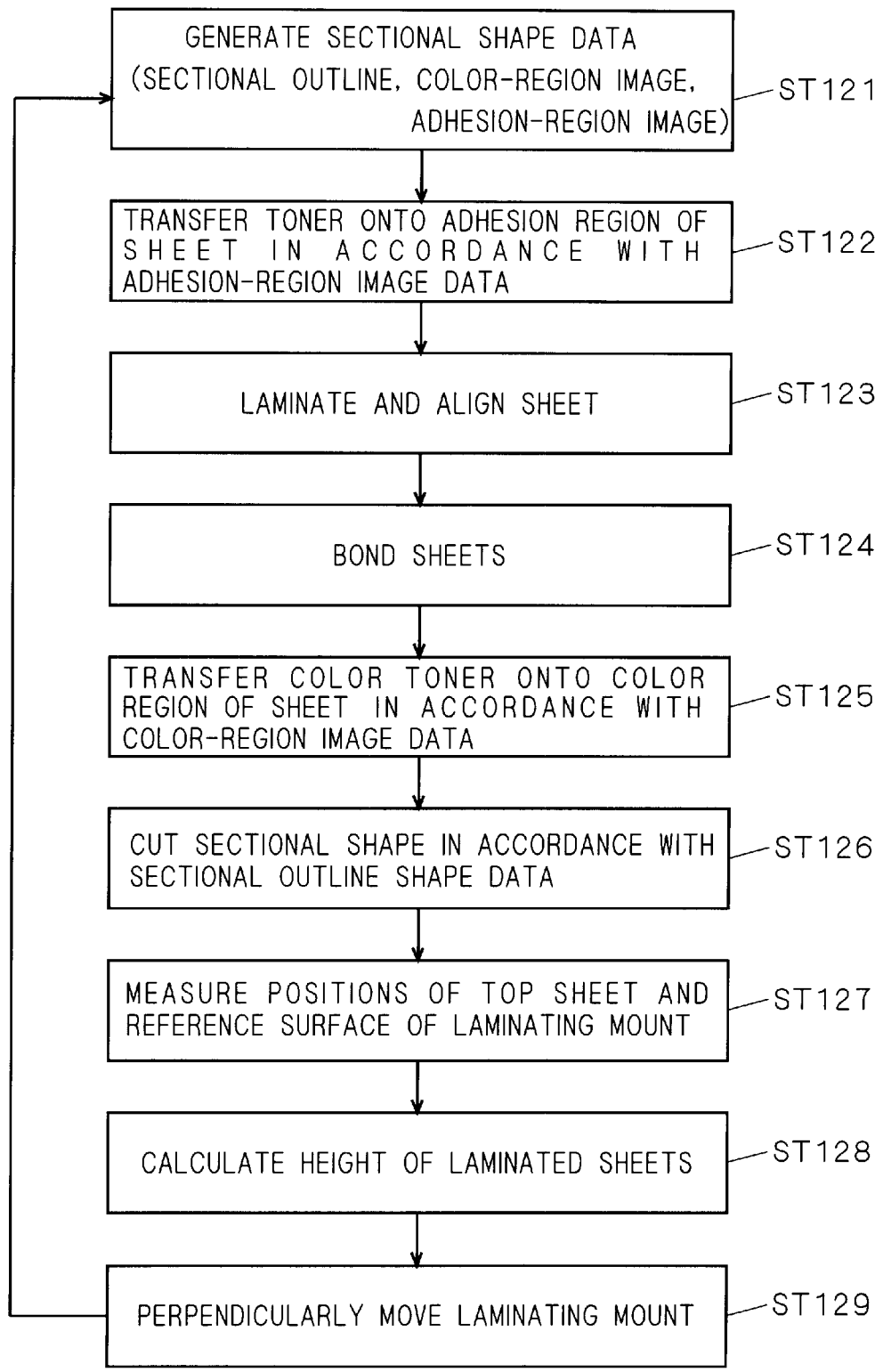
FIGS. 37 to 39 are flow charts showing operations in accordance with another variations of the third preferred embodiment.
Figure 38:
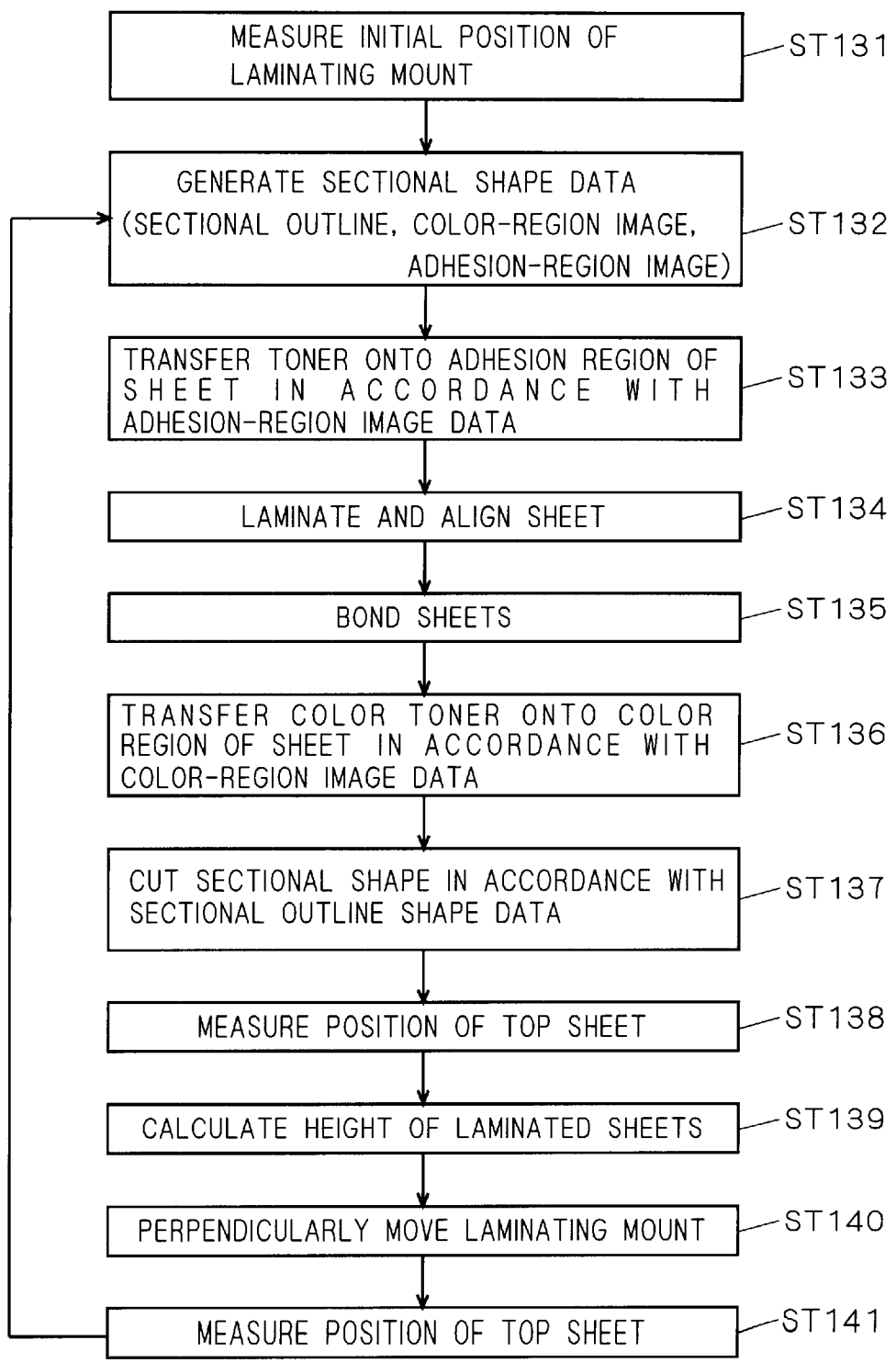

FIGS. 37 and 38 show exemplary methods for forming a three-dimensional object where the information on the height of laminated sheets is fed back to the step of generating the sectional shape data of the solid model.

First, an example of operation in the flow chart of FIG. 37 will be discussed. The operations of the steps ST121 to ST126 of FIG. 37 are the same as those of the steps ST101 to ST106 discussed with reference to FIG. 31, so no discussion will be made thereon. In FIG. 37, after the operation of the step ST126 is finished, the position of the top processed sheet 3 and the position of a reference surface of the laminating mount 40 are measured with the sensor which measures the height of laminated body of sheets in the step ST127, and the height of laminated processed sheets 3 is calculated in the step ST128. In the step ST129, the laminating mount 40 is moved perpendicularly below, for example, until the surface position of the top sheet reaches a predetermined position while the thickness of the sheet is calculated, for example, in the step ST121 on the basis of the information on the height of laminated processed sheets 3 and the calculated thickness is fed back to generation of the sectional shape data. This allows control of the number of slices of the solid model in accordance with the thickness of sheet and a three-dimensional object of high accuracy can be obtained.

Next, an example of operation in the flow chart of FIG. 38 will be discussed. The operations of the steps ST132 to ST137 of FIG. 38 are the same as those of the steps ST101 to ST106 discussed with reference to FIG. 31, so no discussion will be made thereon.

In FIG. 38, after the operation of the step ST137 is finished, the position of the top processed sheet 3 is measured with the sensor which measures the height of laminated body of sheets in the step ST138, and the height of laminated processed sheets 3 is calculated from an initial position of the laminating mount 40 measured in the step ST131 in advance in the step ST139. In the step ST140, the laminating mount 40 is moved perpendicularly below, for example, until the surface position of the top sheet reaches a predetermined position and in the step ST141, by measuring the position of the top processed sheet 3 again, the thickness of the sheet is obtained from the amount of movement of the laminating mount 40 and the calculated thickness is fed back to generation of the sectional shape data. This allows control of the number of slices of the solid model in accordance with the thickness of sheet and a three-dimensional object of high accuracy can be obtained.

<C-5. The Third Variation>

Figure 39:
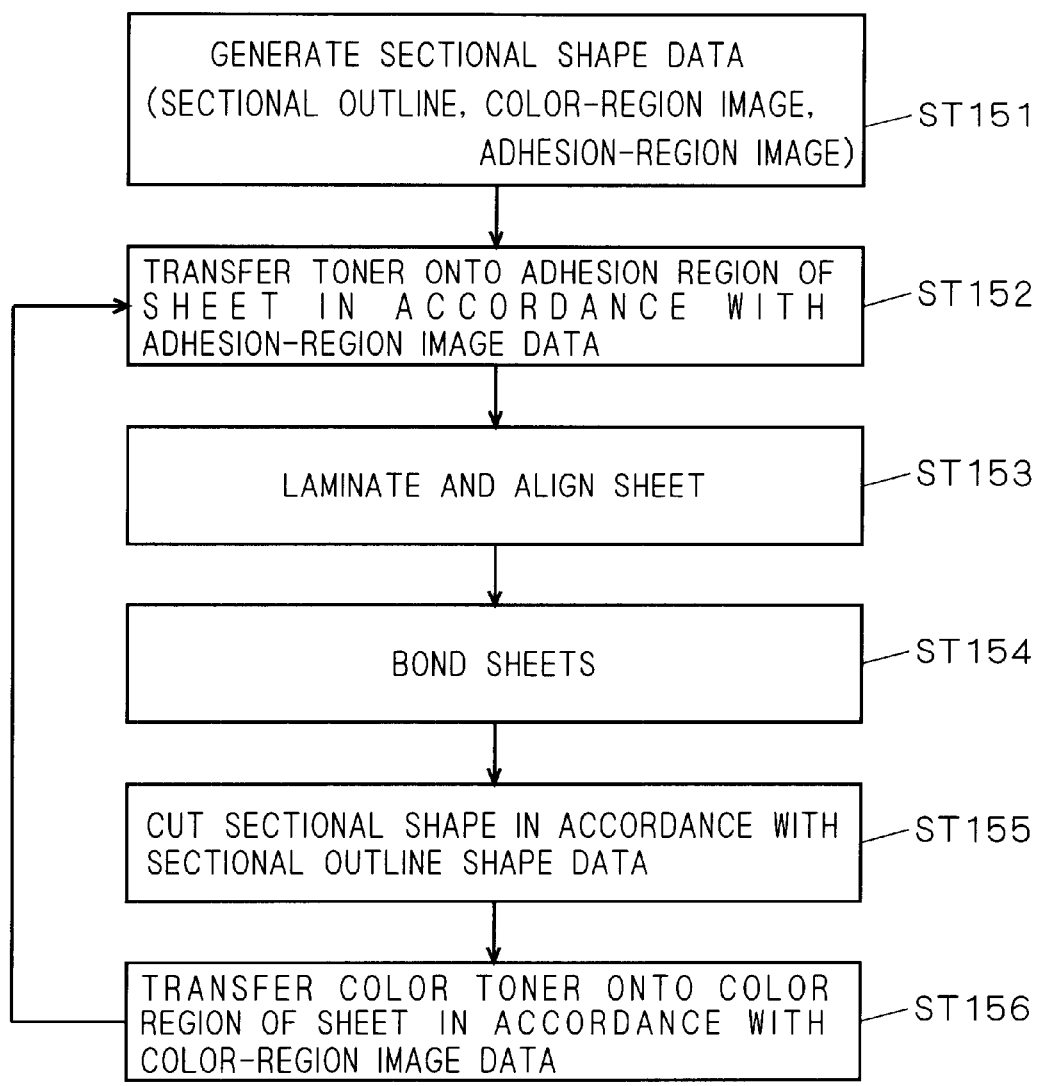

Though the sheet 1 is cut with the cutter 30 in accordance with the outline shape on the basis of the sectional outline shape data to remove an unnecessary portion on the sheet after the color toner is transferred onto the color region of the laminated and bonded sheet 1 in accordance with the color-region image data in the method for forming a three-dimensional object described with reference to FIG. 31, the color toner may be transferred in accordance with the color-region image data after the sheet 1 is cut with the cutter 30 in accordance with the outline shape as shown in FIG. 39.

Specifically, in the FIG. 39, after the sheet 1 laminated and bonded through the steps ST151 to ST154 is cut with the cutter 30 in accordance with the outline shape on the basis of the sectional outline shape data (in the step ST155), the color toner is transferred in accordance with the color-region image data (in the step ST156).

In this case, after the sheet 1 is cut in accordance with the sectional outline shape in the step ST155, since the color toner is transferred without removing an unnecessary portion on the sheet and then the next sheet is laminated, it is possible to prevent the color toner from being transferred on the side surface of the laminated body by mistake.

D. The Fourth Preferred Embodiment

Though the color toner is electrostatically transferred onto the color region of the sheet in the first to third preferred embodiments, a color ink, instead of the color toner, may be transferred by an ink jet system or electrostatic transfer.

Figure 40:
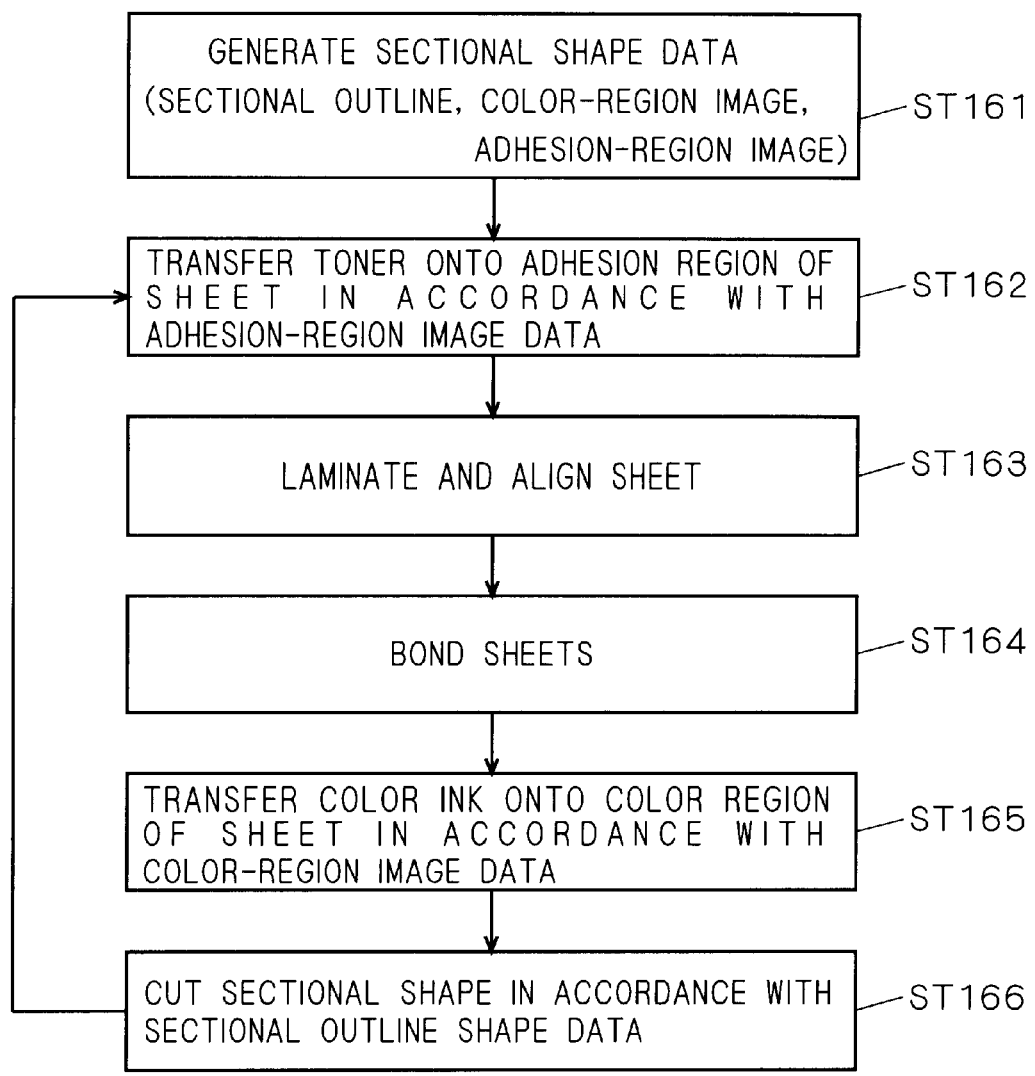
FIG. 40 is a flow chart showing a basic operation in accordance with a fourth preferred embodiment.
Figure 41:
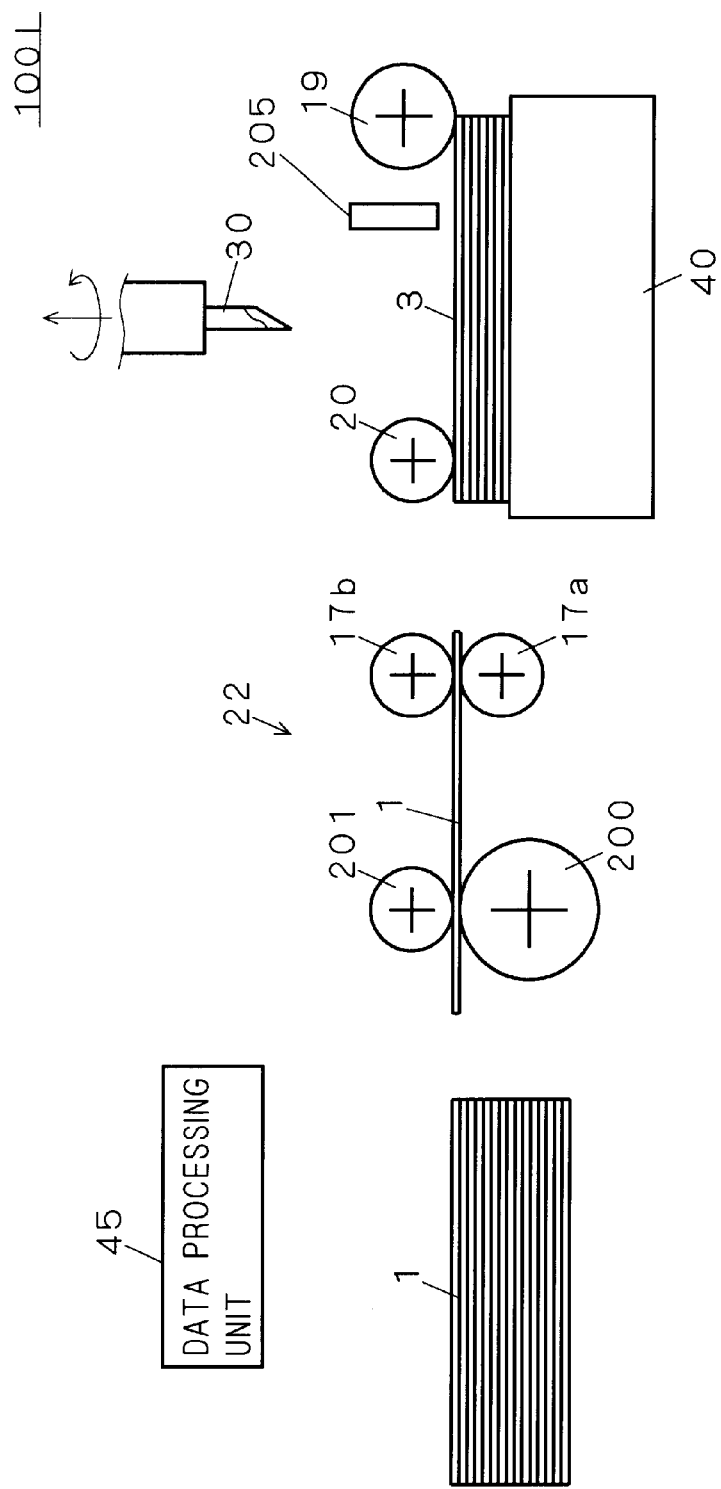
FIG. 41 illustrates an apparatus for forming a three-dimensional object in accordance with the fourth preferred embodiment.

FIG. 40 is a flow chart showing a basic operation in the fourth preferred embodiment of the method for forming a three-dimensional object in accordance with the present invention, and FIG. 41 illustrates a constitution of a three-dimensional object forming apparatus 100I. Constitution and operation will be discussed, referring to FIGS. 40 and 41.

<D-1. Constitution and Operation>

In the flow chart of FIG. 40, the operations of the steps ST161 to ST164 are the same as those of the steps ST101 to ST104 discussed with reference to FIG. 31, so no discussion will be made thereon. After the operation of the step ST164 is finished, color inks are transferred onto the color region of the sheet 1 in accordance with the color-region image data in the step ST165. The step ST165 is carried out by jetting color inks of at least C (cyan), M (magenta), Y (yellow) and Bk (black) from a nozzle of an ink jet head 205 of FIG. 41.

Next, in the step ST166, after laminating and bonding steps and the transfer of the color ink onto the color region, the sheet 1 is cut with the cutter 30 in accordance with the outline shape on the basis of the sectional outline shape data, removing an unnecessary portion, to be the processed sheet 3.

Further, there may be a case in the step ST166, where a sheet is cut along the sectional outline shape, then without removing an unnecessary portion thereof, the next sheet is laminated and after laminating all the sheets, unnecessary portions are removed by an operation like punching.

<D-2. Characteristic Function and Effect>

According to the fourth preferred embodiment of the present invention as discussed above, since the color ink is transferred onto the color region of the sheet, a large-sized device such as the coloring unit which is needed for coloring the color region of the sheet with the color toner is not needed and therefore the three-dimensional object forming apparatus can be size-reduced. The color ink infiltrates into the sheet more easily than the color toner, infusing to the side surface of the sheet, and therefore the color of the color region is clearly reflected on the side surface of the laminated body when the sheet is laminated.

E. The Fifth Preferred Embodiment

Figure 42:
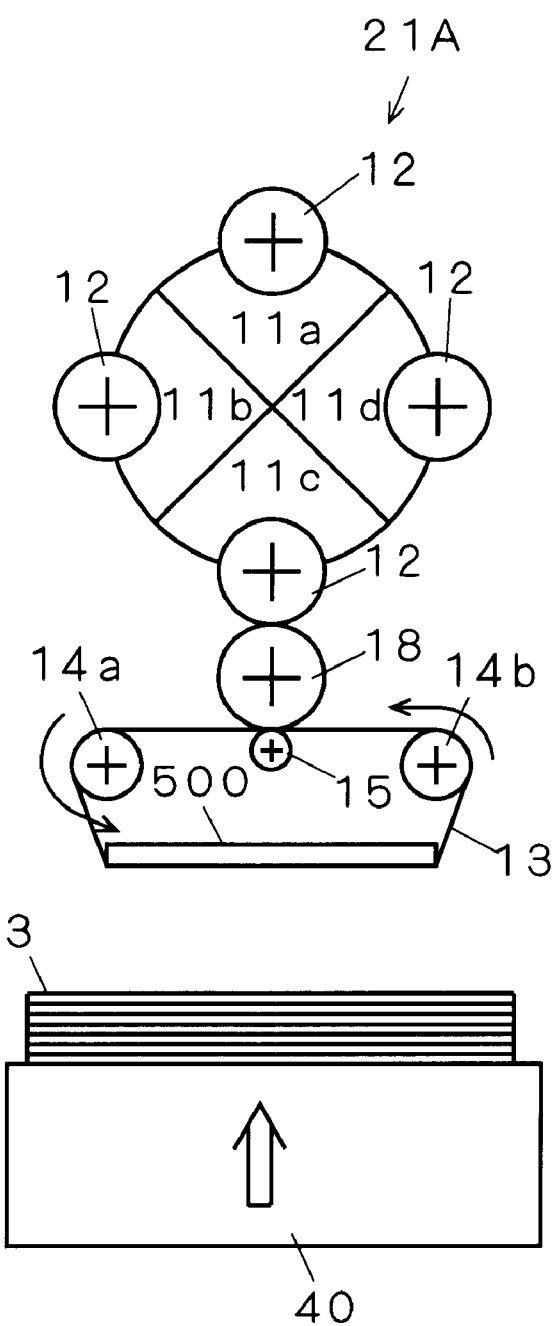
FIGS. 42 and 43 illustrate an apparatus for forming a three-dimensional object in accordance with a fifth fourth preferred embodiment.

Though the coloring unit 21 of FIG. 32 is used to transfer the color toner onto the color region of the sheet 1 in the third preferred embodiment of the present invention as discussed above, the transfer of the color toner is not limited to that using the coloring unit 21 of FIG. 32, but a coloring unit 21A shown in FIG. 42 may be used.

In the coloring unit 21 of FIG. 32, the toner is electrostatically transferred onto the sheet 1 by sandwiching the intermediate transfer belt 13 to which the toner is transferred between the support roller 16 and the sheet 1. On the other hand, in the coloring unit 21A of FIG. 42, the toner is electrostatically transferred onto the sheet 1 by sandwiching the intermediate transfer belt 13 between the a support plate 500 and the sheet 1. Elements in the coloring unit 21A identical to those of the coloring unit 21 are given the same reference signs and redundant discussion will be omitted.

Accordingly, an image of the color region is transferred onto the sheet 1 by a range of the size of the support plate 500 collectively as a unit. Naturally, the image can be divided into a plurality of regions within a range of the size of the support plate 500 for transfer.

Unlike the case of the coloring unit 21, instead of transfer while horizontally moving the laminating mount 40 or the whole unit 21, the laminating mount 40 or the coloring unit 21A moves vertically to bring the intermediate transfer belt 13 and the sheet 1 into contact with each other or adjacently to each other. In FIG. 42, the laminating mount 40 moves up vertically.

Further, like the third preferred embodiment, it goes without saying that before transferring the color toners, the electrifying roller 202 scans the sheet to provide the sheet with electric charges which adsorb the color toners.

Figure 43:
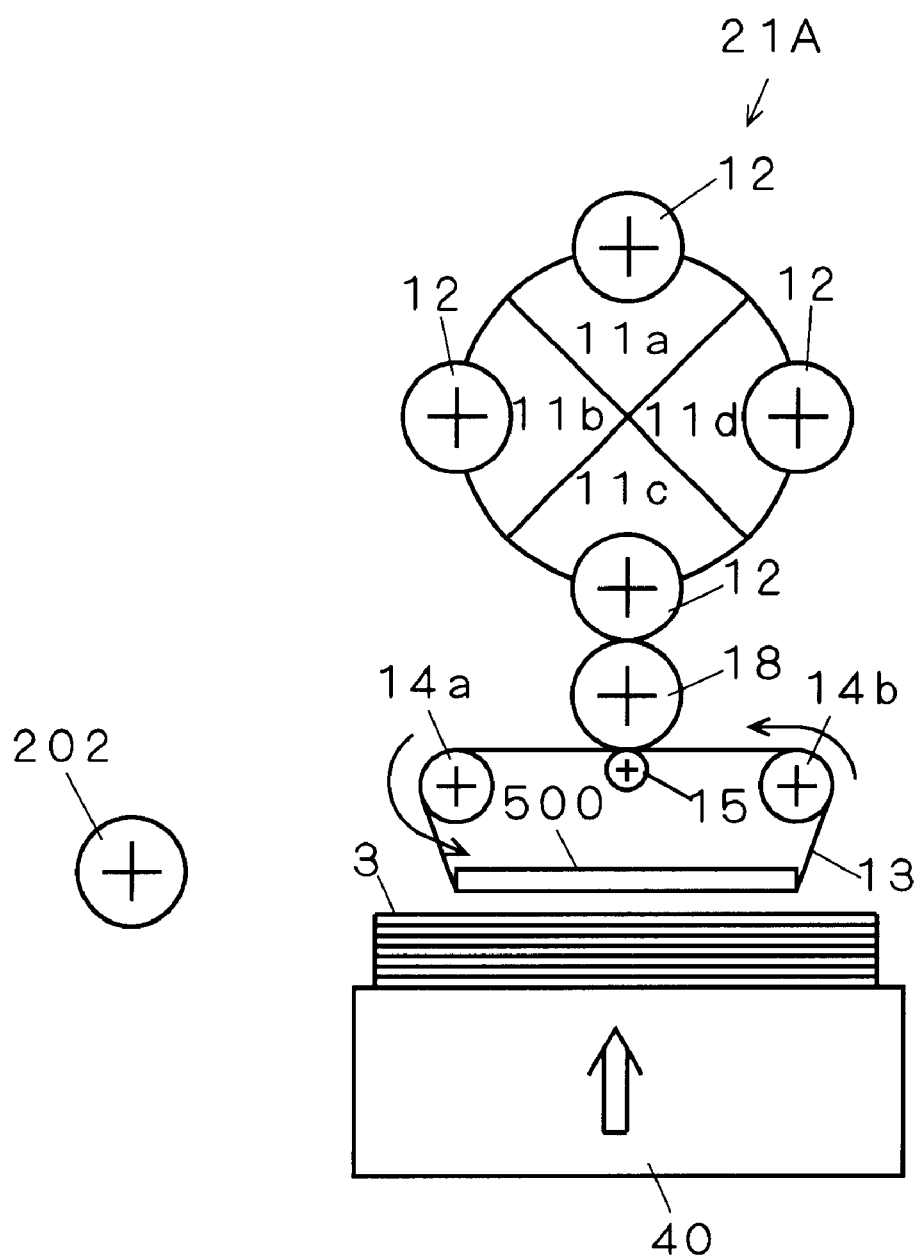

FIG. 43 shows a constitution comprising the electrifying roller 202. As to its operation, the electrifying roller 202 scans the sheet 1 before transferring the color toners, and then the laminating mount 40 moves vertically to bring the intermediate transfer belt 13 and the sheet 1 into contact with the each other or adjacently to each other.

F. The Sixth Preferred Embodiment

Though the transfer of the bonding toner is performed before laminating the sheet 1 in the preferred embodiments of the present invention as discussed above, the transfer may be performed after laminating only if the bonding toner is transferred to the upper surface of the sheet 1.

Figure 44:
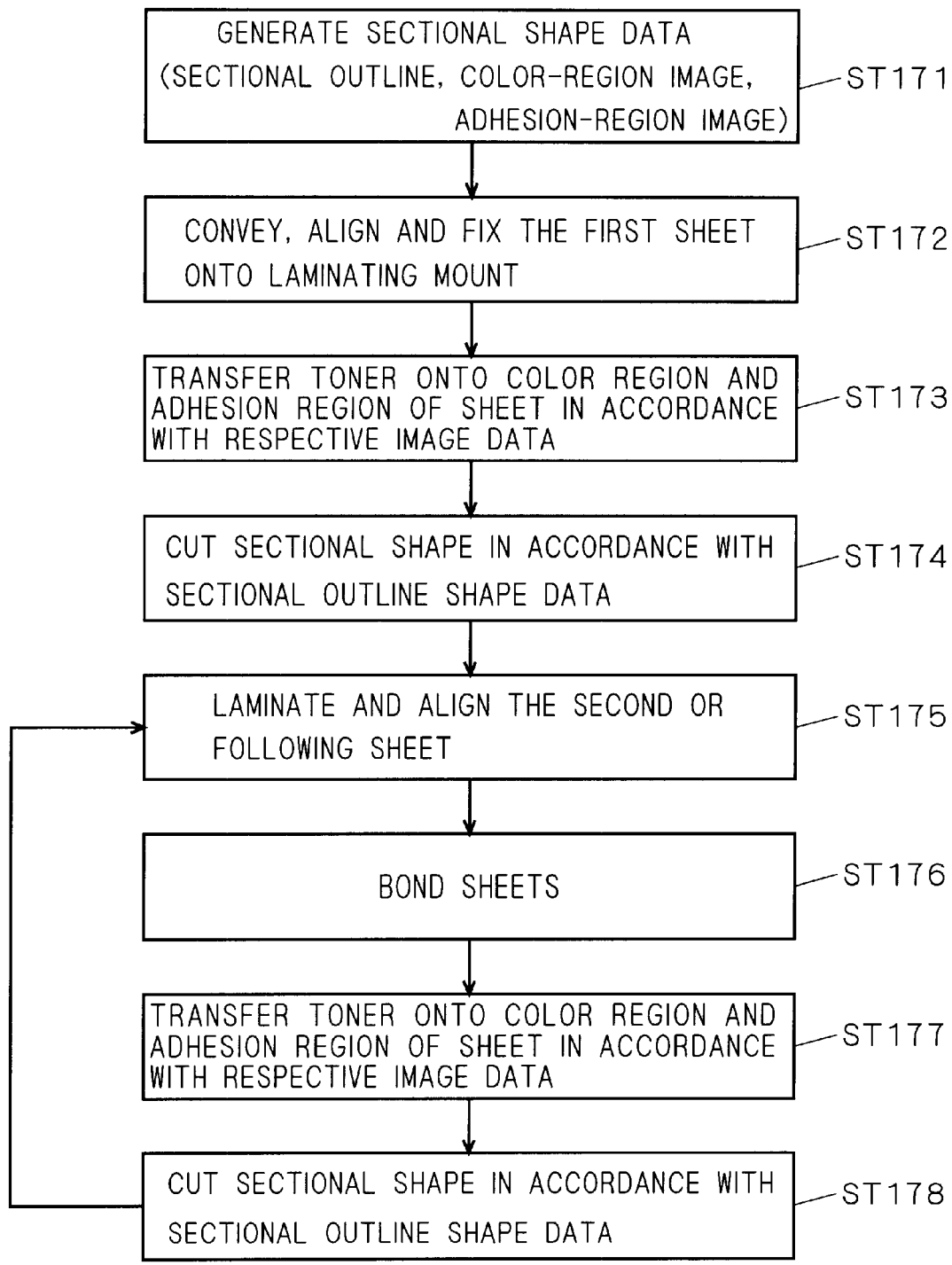
FIG. 44 is a flow chart showing a basic operation in accordance with a sixth preferred embodiment.
Figure 45:
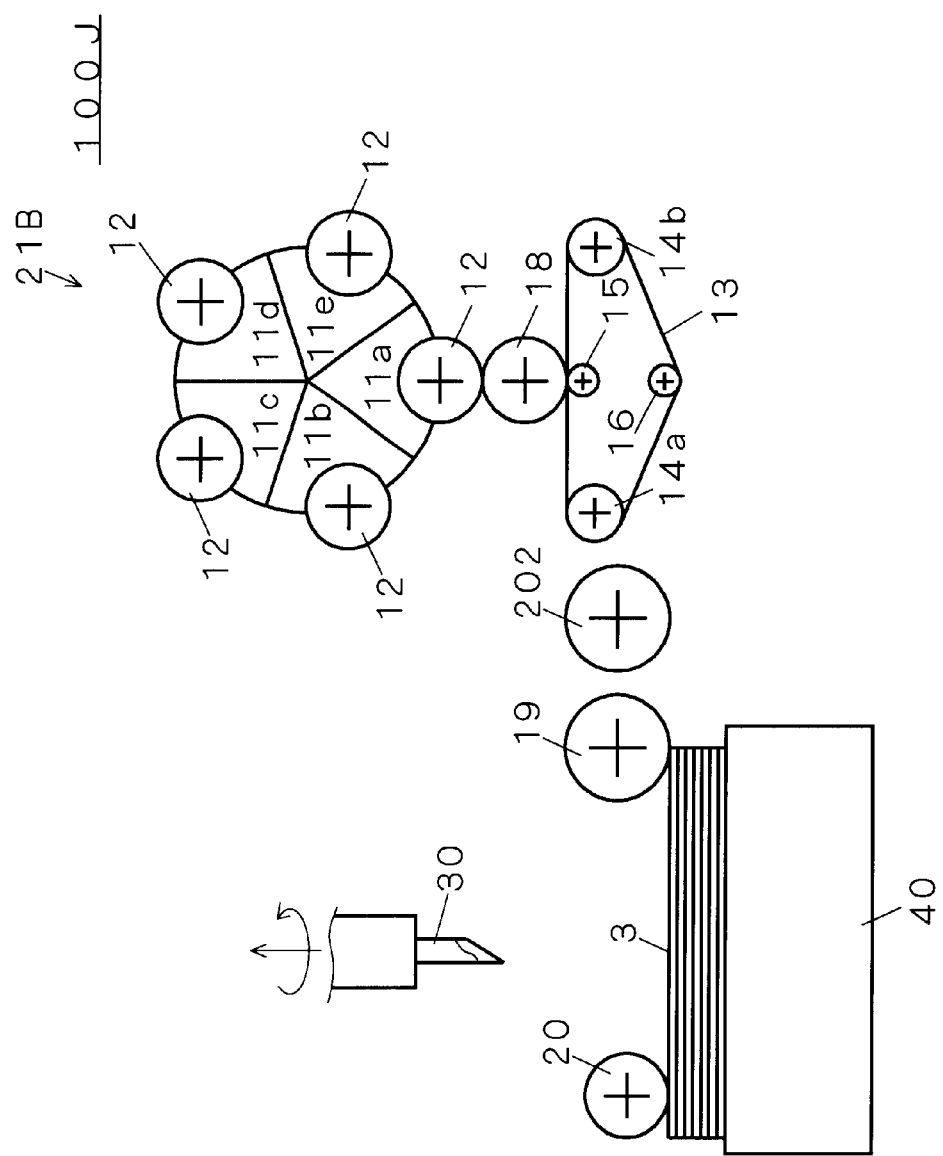
FIG. 45 illustrates an apparatus for forming a three-dimensional object in accordance with the sixth preferred embodiment.

FIG. 44 is a flow chart showing a basic operation in the sixth preferred embodiment in accordance with the present invention, and FIG. 45 illustrates a constitution of a three-dimensional object forming apparatus 100J. Constitution and operation will be discussed, referring to FIGS. 44 and 45. In FIG. 45, elements in this apparatus 100J identical to those of the three-dimensional object forming apparatus 100H of FIG. 32 are given the same reference signs and redundant discussion will be omitted.

<F-1. Constitution and Operation>

In the flow chart of FIG. 44, the operation of the step ST171 is the same as that of the step ST101 of FIG. 31, and no discussion will be made thereon.

In the step ST172, the first sheet is conveyed and aligned onto the laminating mount 40, and then fixed it by vacuum suction or with adhesive tape.

Next, in the step ST173, the color toner and the transparent toner as an adhesive are transferred onto the color region and the adhesion region of the sheet 1 in accordance with the color-region image data and the adhesion-region image data obtained in the step ST171, respectively. The step ST173 is executed by a coloring unit 21B of FIG. 45.

The coloring unit 21B mainly comprises a rotary developing device consisting of the developing devices 11*a*, 11*b*, 11*c*, 11*d* and lie having toners of e.g., C (cyan), M (magenta), Y (yellow), Bk (black) and Cl (clear), respectively, the developing sleeves 12 attached to the respective developing devices 11*a* to lie, the photoreceptor drum 18 coming into contact with the developing sleeves 12 and the intermediate transfer belt 13 onto which the toners of respective colors are transferred from the photoreceptor drum 18. On the basis of the color-region image data, the toners of respective colors are sequentially developed on the photoreceptor drum 18 and further transferred to the intermediate transfer belt 13, and then by sandwiching the sheet 1 and the intermediate transfer belt 13 onto which the toners are transferred between the secondary transfer roller 10 and the support roller 16, the toners are electrostatically transferred onto the sheet 1. Further, the bonding toner, e.g., a transparent toner, is transferred from the developing device lie onto the adhesion region on the sheet on the basis of the adhesion-region image data. When a transparent sheet is used, a white toner may be used as an adhesive.

The intermediate transfer belt 13 is driven in a loop by the driving roller 14*a*, the slave roller 14*b*, the primary roller 15 and the support roller 16.

After the transfers of the color toner and the transparent toner onto the color region and the adhesion region, respectively, the sheet 1, together with the laminating mount 40, moves to below the cutter 30 and is cut in accordance with the outline shape on the basis of the sectional outline shape data, removing an unnecessary portion, to be the processed sheet 3 in the step ST174. The operation of the step ST174 is the same as that of the step ST106 of FIG. 31, so no discussion will be made thereon.

Next, the second sheet or the following sheet is conveyed onto the laminating mount 40, aligned by the align roller 20 on the processed sheet 3 and laminated thereon (in the step ST175).

Next, a heat roller 19 heats and pressurizes the sheet 1 on the laminated body of the processed sheets 3, melting the transparent toner of the processed sheet 3, to bond the sheet 1 onto the processed sheets 3 (in the step ST176).

In the step ST177, the color toner and the transparent toner as an adhesive are transferred onto the color region and the adhesion region of the sheet 1 in accordance with the color-region image data and the adhesion-region image data, respectively, generated in the step ST171.

After the transfers of the color toner and the transparent toner onto the color region and the adhesion region, respectively, the sheet 1, together with the laminating mount 40, moves to below the cutter 30 and is cut in accordance with the outline shape on the basis of the sectional outline shape data, removing an unnecessary portion, to be the processed sheet 3 in the step ST178.

This operations of the step ST175 to ST178 as discussed above are repeated on all the sectional data of the solid model, to obtain an objective three-dimensional object.

The sequence of the steps ST177 and ST178 may be changed. Specifically, there may be a case, in FIG. 44, where the sheet 1 laminated and bonded through the step ST176 is cut with the cutter 30 in accordance with the outline shape on the basis of the sectional outline shape data, and then the color toner and the transparent toner as an adhesive are transferred onto the color region and the adhesion region, respectively.

In this case, after the sheet is cut in accordance with the sectional outline shape, since the color toner is transferred without removing an unnecessary portion on the sheet and then the next sheet is laminated it is possible to prevent the color toner from being transferred on the side surface of the laminated body by mistake.

Though the above discussion has been made on a case where transfer of the color toner starts from the first sheet, there may be a case where transfer of only the bonding toner onto the adhesion region and no color toner is performed from the first sheet until a predetermined number of sheets are processed.

G. Further Improvements

Now, discussion will be made on further improvements regarding the above preferred embodiments.

Figure 68:
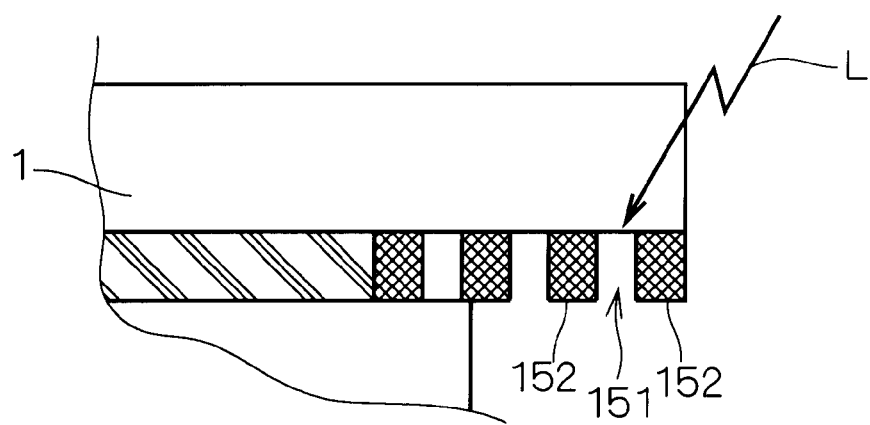
FIG. 68 is a conceptual diagram showing an influence of light when a transparent sheet is used.

For example, as shown in FIG. 68, when dots 152 of the color toners are spatially distributed to represent tone on the transparent sheet 1 for coloring, as a light L goes through from the opposite surface of the sheet 1 through gaps 151 in the arrangement of the dots 152 of the color toners, disadvantageously, color tone and gradation are visually changed. In a portion of light color, especially, the amount of transmission light L becomes relatively larger as the amount of deposited color toner is smaller and representation of color tone and gradation is apt to be inaccurate.

Therefore, it is required that such a change in color tone and gradation is prevented to achieve accurate color representation when the transparent sheet is used.

Further, even if an opaque sheet is used, when the sheet is a color sheet, as the color of the color sheet, i.e., a sheet color partially appears through the gaps in the arrangement of the dots of the color toners, it is also disadvantageously impossible to achieve accurate color representation. For example, when yellow dots are discretely distributed to represent a light yellow, if the sheet is blue, the appearance becomes green.

A method for forming a three-dimensional object in consideration of such an improvement will be discussed below.

Prior to discussion on specific constitution and operation of the preferred embodiments in consideration of the above improvement, an overview of a process for forming a three-dimensional object by using a laminated body will be discussed.

Figure 46A:
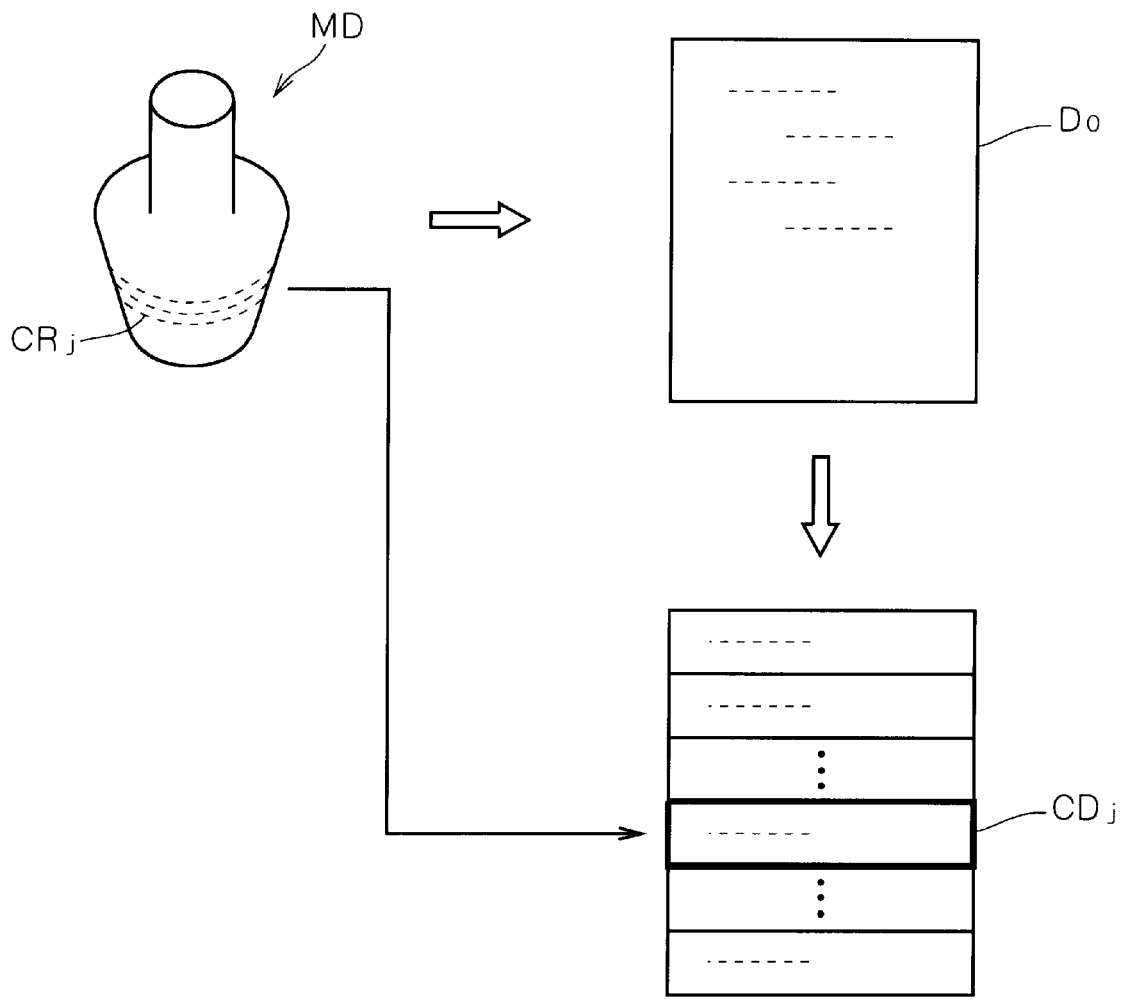

When a three-dimensional object representing a solid model MD shown in FIG. 46A is formed, first, original data D0 including information of shape and surface color of the solid model MD are obtained from three-dimensional CAD data or by a three-dimensional shape measuring instrument.

Next, from the original data D0, sectional data CDj (j=1, 2, ..., m, ..., n) are generated. The sectional data CDj represent respective shapes and colors of a plurality of sections CRj (j=1, 2, ..., m, ..., n) obtained by slicing the solid model MD at equal intervals in a predetermined direction (usually in a horizontal direction).

The sectional data CDj include the following information:
(1) outline shape data Da defining an outline shape of the section CRj;
(2) image data Db of a ring-shaped color region (a region CLR of FIGS. 47B and 47C) used for coloring the section CRj correspondingly to the colored position and color on a surface of the solid model MD; and
(3) image data Dc of an adhesion region (a region ADR of FIGS. 47B and 47C, usually surrounded by the color region CLR) used for bonding adjacent layers to form a laminated body.

The color region CLR is a region relating to an appearance color of the three-dimensional object and coloring is performed in the color region CLR.

On the other hand, a plurality of rectangular sheets shown in FIG. 47A are prepared and each color region CLR is colored on the basis of the above-discussed sectional data CDj. A bonding toner or the like is applied to each adhesion region ADR. Depending on arrangement of device elements, the coloring and application of the bonding toner may be made on a front surface of the sheet or a back surface.

Then, the colored sheet is sequentially laminated as shown in FIG. 47 and bonded to adjacent sheet by using the bonding toner in the adhesion region ADR. The sheets are cut along the outlines of the sections CRj by using cutting means CM.

After this process is performed on all the sections CRj, unnecessary portions of the sheets are removed with a cut line as a boundary, to obtain a three-dimensional object as a laminated body SK shown in FIG. 47D.

In this three-dimensional object, since the colors given to the color regions CLR of the sheets appear in the vicinity of the surface, the shape and color of the solid model MD of FIG. 46A can be reproduced on its appearance.

H. The Seventh Preferred Embodiment

<H-1. Constitution of Principal Part of Apparatus>

Figure 48:
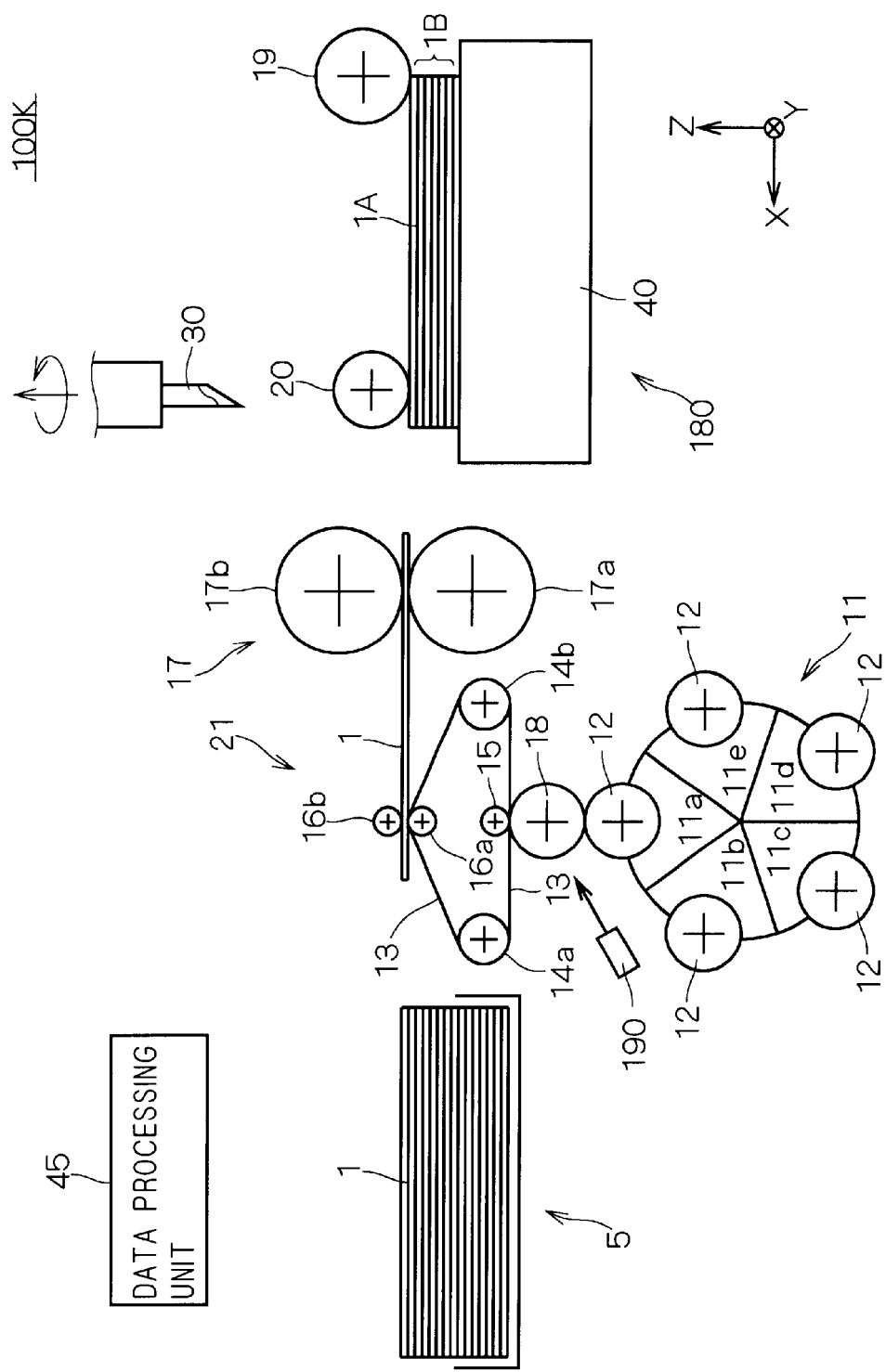
FIG. 48 is a schematic diagram showing a three-dimensional object forming apparatus 100 in accordance with a seventh preferred embodiment.

FIG. 48 is a schematic view showing a constitution of a three-dimensional object forming apparatus 100K in accordance with the seventh preferred embodiment.

The three-dimensional object forming apparatus 100K comprises a paper feed unit 5 for feeding transparent sheets piece by piece, the coloring unit 21 for coloring the transparent sheets 1 fed by the paper feed unit 5 with color toners and a forming unit 180 for laminating and cutting the transparent sheets 1 colored by the coloring unit 21. A data processing unit 45 generates information on the sections of the solid model from the data on a predetermined solid model and controls the above units on the basis of the information.

<H-1-1. Paper Feed Unit 5>

In the paper feed unit 5 provided are a plurality of transparent sheets 1 stacked in the paper tray or the paper cassette. Each of the transparent sheets 1 has a rectangular plane shape and, for example, of resin. The paper feed unit 5 conveys the transparent sheets 1 piece by piece to the coloring unit 21 by using a feeding mechanism, not shown, which is used for an electrophotographic copy machine or printer.

<H-1-2. Coloring Unit 21>

The coloring unit 21 comprises the photoreceptor drum 18 capable of forming an electrostatic latent image on its surface by exposure of light from an exposing device 190 electrified by an electrifying device. This exposure pattern is determined on the basis of the sectional data CDj of the solid model MD.

The rotary developing device 11 consists of the developing devices 11a, 11b, 11c and 11d having color toners of e.g., C (cyan), M (magenta) and Y (yellow) which are three primary colors and W (white), respectively, and the developing device 11e having a bonding toner to bond a plurality of sheets to one another. A transparent toner can be used as the bonding toner. Alternatively, when the white toner mixed with an adhesive is used for bonding, the developing device 11d for white toner can also serve as a developing device for the bonding toner. In this case, the developing device 11e may be omitted and the transfer time can be cut on the whole. Color toners for the three primary colors of light, i.e., R (red), G (green) and B (Blue), instead of the above primary colors, may be used.

The rotary developing device 11 also comprises the developing sleeves 12 for providing the respective toners to the photoreceptor drum 18 and one of the developing sleeves 12 which is selected at that time is allowed to come into contact with the photoreceptor drum 18.

The electrostatic latent image formed on the photoreceptor drum 18 is developed with the toner provided by the developing sleeve 12, the toner image is once transferred to the intermediate transfer belt 13 and then transferred to the transparent sheet 1. The intermediate transfer belt 13 is driven in a loop by the driving roller 14a, the slave roller 14b, the primary roller 15 and a support roller 16a.

In the coloring unit 21, the heat rollers 17 (17a and 17b) for fixing the toners are vertically disposed. As a method of fixing toners, besides the above heating by the heat roller, the flash fixing method, the oven fixing method and the laser-irradiation fixing method may be used.

<H-1-3. Forming Unit 180>

The forming unit 180 includes the laminating mount 40 on which colored sheets 1A obtained by providing the transparent sheets 1 with colored layers are laminated. FIG. 48 shows a state where the colored sheets 1A which have been cut are laminated as processed sheets 1B on the laminating mount 40.

Above the laminating mount 40 disposed are the roller 20 for horizontally aligning the colored sheets 1A and the heat roller 19 for heating and pressurizing the colored sheets 1A. The cutter 30 for cutting the colored sheets 1A on the basis of the sectional data CDj of the solid model MD is also disposed. The cutter 30 is movable at least in a plenary direction (X-Y direction) and rotatable about Z axis near a surface of the colored sheet 1A. Further, the cutter 30 and the laminating mount 40 are movable relatively in a vertical direction (Z direction) and can be positioned near the surface of the colored sheet 1A which is the uppermost one at that time.

<H-2. Overview of Operation of Apparatus>

Figure 49:
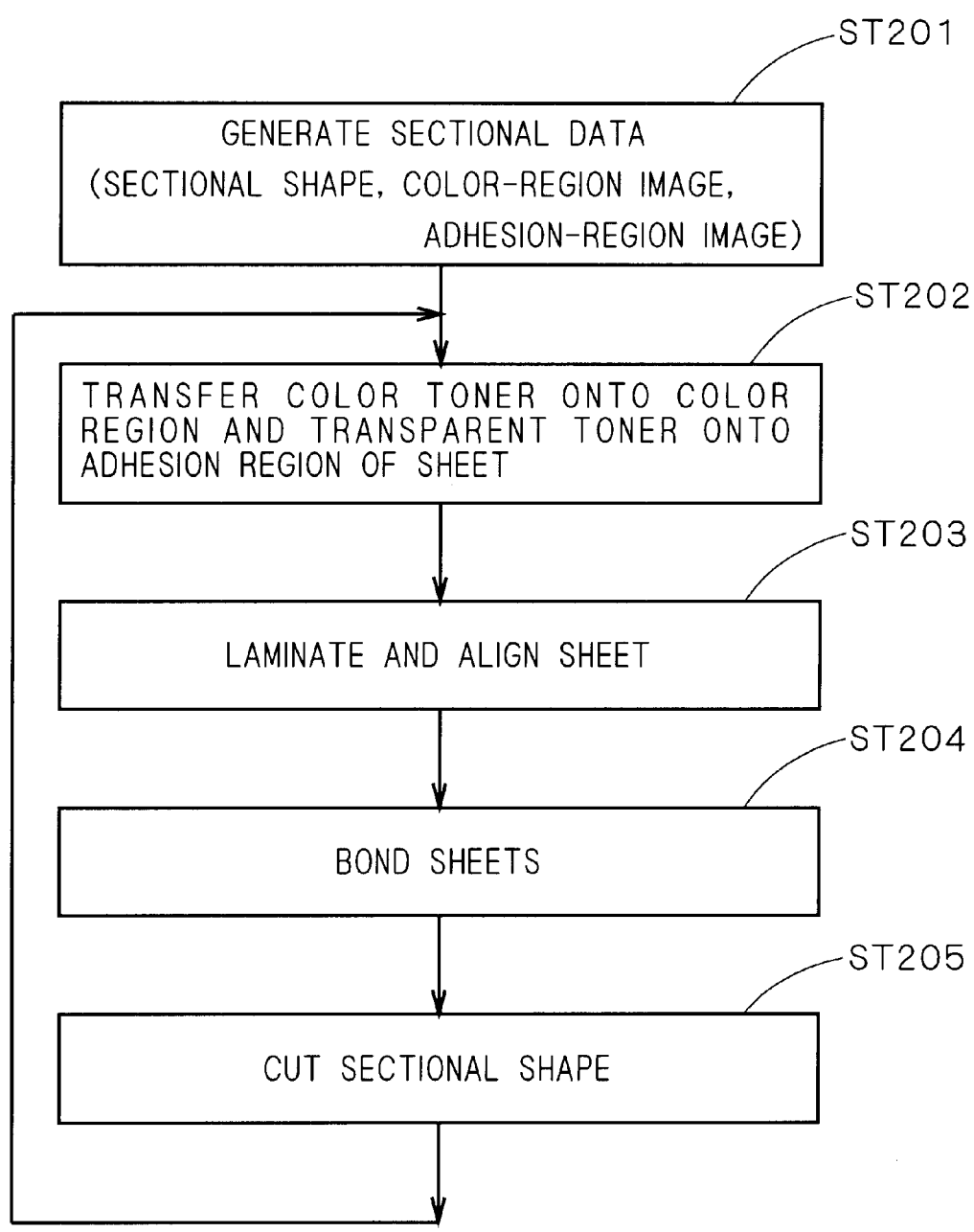
FIG. 49 is a flow chart showing a basic operation in accordance with the seventh preferred embodiment.
Figure 50:
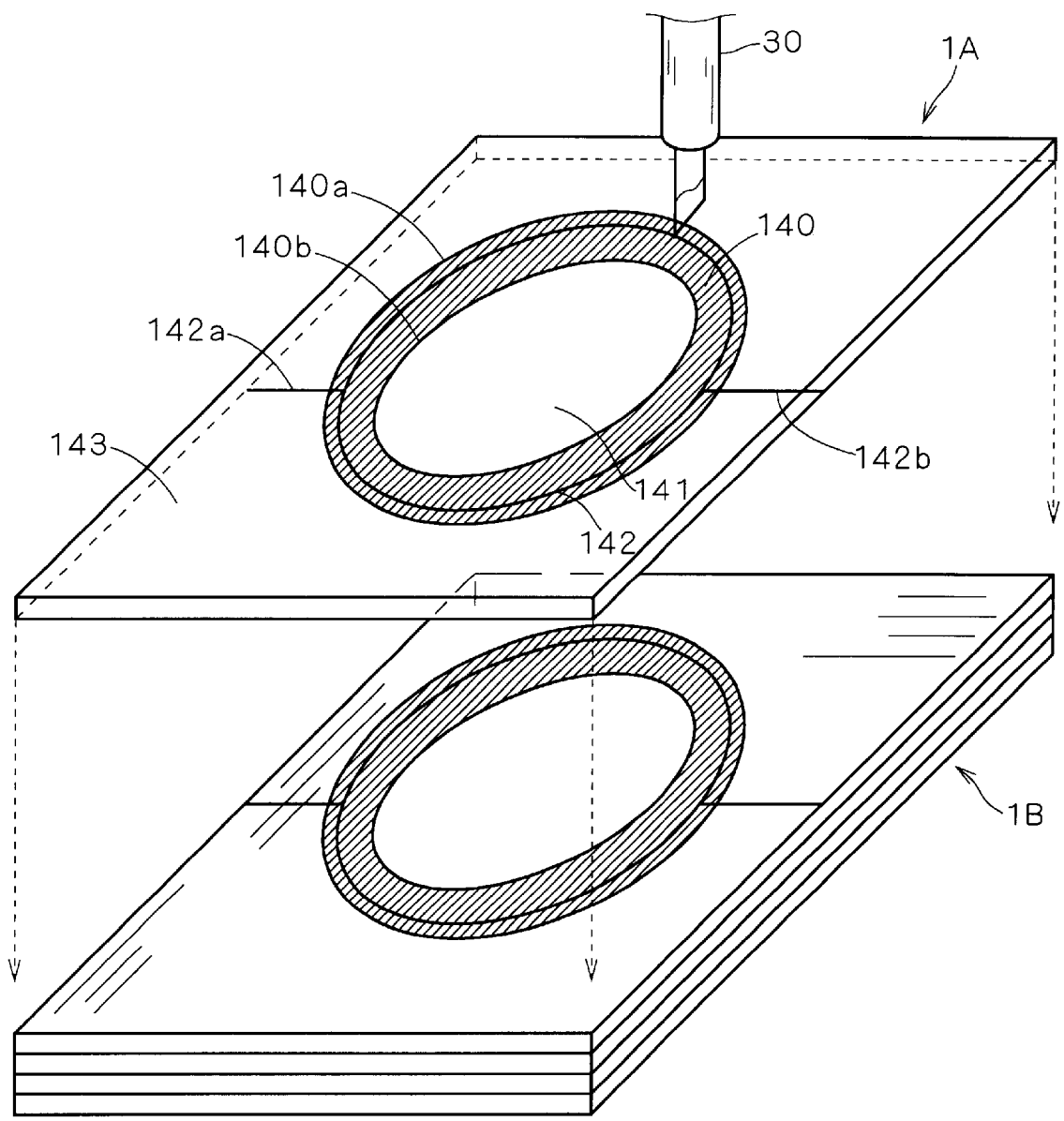
FIG. 50 illustrates a relation between a sectional shape and a color region of a solid model.
Figure 51:
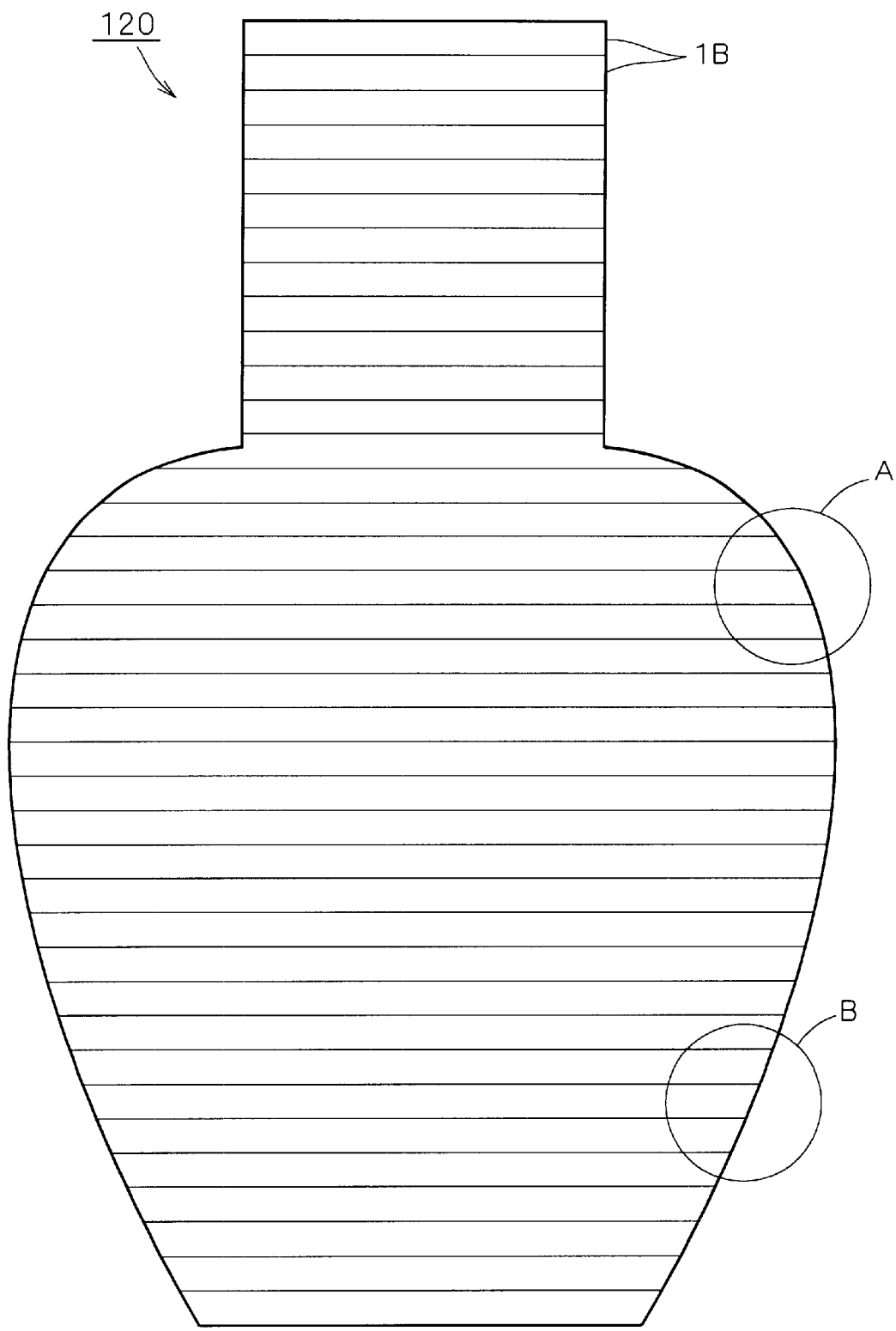
FIG. 51 illustrate an exemplary three-dimensional object.

FIG. 49 is a flow chart showing an overview of an operation of the three-dimensional object forming apparatus 100K. Data processing and control operation discussed below are executed by software with a microcomputer incorporated in the data processing unit 45 in FIG. 48. FIG. 49 shows an operation to define regions on the transparent sheet 1 from the information of the solid model MD, and FIG. 50 is a perspective view showing a state during an operation to form a three-dimensional object by cutting the colored sheet 1 laminated on the processed sheets 1B. FIG. 51 shows an exemplary three-dimensional object 120 obtained as the laminated body of the processed sheets 1B by the forming apparatus 100K.

Figure 46B:
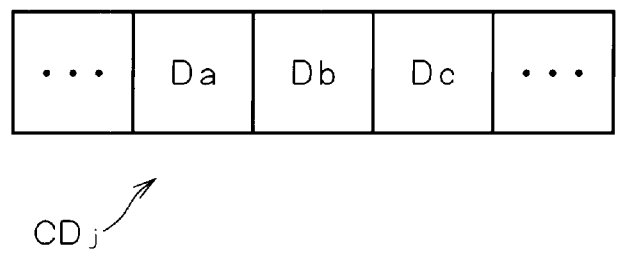

In the step ST201 of FIG. 49, the sectional data CDj are generated from the original data D0 of the solid model MD of FIG. 46. As shown in FIG. 50, the sectional data CDj include image data on a ring-shaped color region 140 corresponding to the color region CLR of FIGS. 47B and 47C and image data on an adhesion region 141 corresponding to the adhesion region ADR of FIGS. 47B and 47C.

The color region 140 is a region relating to an appearance color of the three-dimensional object 120 and is colored.

The color region 140 has only to be determined in the vicinity of the outline of the sectional region of the solid model MD. Specifically, by coloring the outline portion, the color is reflected on a side surface of the three-dimensional object 120 through transparent portions of the processed sheets 1B when the processed sheets 1B are laminated, and it looks as if the surface of the three-dimensional object 120 is colored.

Considering a misalignment by the roller 20 and the like, an outer boundary 140a of the color region 140 may be defined outside a contour line 142. Similarly, an inner boundary 140b may be defined inside the contour line 142.

The adhesion region 141 is a portion in which adjacent colored sheets 1A are overlapped to each other (logical product portion) when a plurality of colored sheets 1A are laminated. When the inner boundary 140b is defined inside the contour line 142, the adhesion region 141 is a portion surrounded by the inner boundary 140b.

In the subsequent step ST202, the exposing device 190 and the rotary developing device 11 are driven in accordance with the sectional data CDj on the transparent sheet 1 conveyed to the coloring unit 21, coloring the color region 140 with the respective color toners and applying the bonding toner to the adhesion region 141, to develop the transparent sheet 1 by electrostatic transfer like electrophotography. In this preferred embodiment using the transparent sheet 1, the toners are applied only to the lower surface of each transparent sheet 1.

In the step ST203, the colored sheets 1A are conveyed while being heated by the heat roller 17 piece by piece and the toners are fixed thereon. When a toner whose fixing temperature is different from (e.g., lower than) that of the coloring toner is used as the bonding toner, there may be a case where developing with the color toner and fixing by the heat roller 17 are first performed and then developing with the bonding toner and fixing by the heat roller 17 are performed.

The colored sheet 1A which has been developed with the toners and fixed is conveyed onto the laminating mount 40, aligned by the align roller 20 on the laminated body of the processed sheets 1B which have been colored and cut, and laminated on the laminated body. Further, after fixing by the heat roller 17, static electricity charged on the colored sheets 1A may be removed before laminating.

In the step ST204, the heat roller 19 heats and pressurizes the colored sheet 1A below, melting the bonding toner transferred onto the adhesion region 141 of the colored sheet 1A, to bond the colored sheet 1A onto the processed sheets 1B laminated immediately therebelow.

Further, the sheet 1A may be effectively bonded through heating and pressurization by hot press as well as with heat roller.

In the subsequent step ST205, the cutter 30 is activated to cut the colored sheet 1A which has been laminated and bonded, along the contour line 142 of the section CRj of the solid model MD (see FIG. 50) on the basis of the outline shape data on the section CRj of the solid model MD. Further, cutting lines 142a and 142b extending from the contour line 142 to the peripheral portion of the colored sheet 1A may be perforated. An external region outside the contour line 142 is an unnecessary portion for obtaining the three-dimensional object 120 of FIG. 51 in the end and the external region 143 is later removed manually to obtain the processed sheet 1B (of FIG. 51).

The end of the step ST205 completed a series of processing on one transparent sheet 1, and subsequently the steps ST202 to ST205 are executed on the next transparent sheet 1. These operations are sequentially repeated on a series of sections CRj (j=1, 2, ..., n) of the solid model MD, to obtain the objective three-dimensional object 120.

Further, there may be a case, in the step ST205, where the peripheral region 143 on the transparent sheet 1 is removed every time when one colored sheet 1A is cut along the shape of the contour line 142 on the sectional region, and another case where after laminating and cutting all the colored sheets 1A, the unnecessary portion (peripheral region 143) is removed by an operation like punching.

<H-2-1. Principle on Coloring>

Coloring of the color region 140 shown in FIG. 50 will be discussed in detail.

In this preferred embodiment, the color toners of C (cyan), M (magenta) and Y (yellow) which are three primary colors (hereinafter referred to as "three primary color toners") and further a white color toner (hereinafter referred to as "white toner") are transferred to the transparent sheet 1 by the rotary developing device 11, to form a colored layer on the transparent sheet 1.

There are two aspects in the method of transferring the white toner as below:

(1) The first method is, as discussed later with reference to FIG. 53A, to transfer a white toner W to gaps in the alignment of dots 152 which forms a spatial tone distribution of the three primary color toners and cover the color region 140 with complementary spatial distribution of the three primary color toners and the white toner (accordingly obtained is a colored layer of one-layer structure); and (2) The second method is, as discussed later with reference to FIG. 53B, to form a white toner layer 156 such as to entirely cover a transfer layer 157 of the three primary color toners and the color region 140 (accordingly obtained is a colored layer of double-layer structure).

In both methods, with a white toner layer, a light transmitting the transparent sheet 1 is cut to produce effects of enhancing the color tone and gradation and improving clarity of colors by the three primary color toners with the characteristics of neutral color (achromatic color) which white has.

Among these toners, the three primary color toners are materials for representing "inherent color" according to the surface color of the solid model MD and the white toner is a material of "base color" for providing ground color to a portion in which no material of inherent color exists.

These will be discussed below.

<H-2-2. Colored layer of One-Layered Structure>

Transfer pattern of the three primary color toners among the color toners is determined by using a region modulation method such as a dither method and a density pattern method which utilize integral function of human visual sense.

FIGS. 52A to 52D show a concept of the above region modulation method. In coloring using this region modulation method, first as shown in FIG. 52A, square toners of one of the three primary colors, C (cyan) are arranged as fine dots like a grid and transferred. Each dot may be of quadrate whose four corners are round.

Next, toners of one of the rest colors, M (magenta) are transferred as shown in FIG. 52B and toners of the other, Y (yellow) are transferred as shown in FIG. 52C. Though the dots of the three primary color toners C (cyan), M (magenta) and Y (yellow) are arranged at the same ratio and formed in all discrete arrangement positions allotted to the three colors in FIG. 52C, the arrangement depends on the color tone and gradation in a practical transfer. The color toners may be so transferred as to be mixed.

In the arrangement of FIG. 52C, a light transmits through the gaps 151 between the dots of the three primary color toners, not to obtain a predetermined tone. This was discussed, referring to FIG. 68. Then, as shown in FIGS. 52D and 53A, the gaps 151 are filled with the white toner W to cut the transmission light L, removing the influence of the transmission light L.

Further, when a colored layer 150 on the color region 140 is so formed as to be covered with a complementary pattern distribution of white which is a base color and the three primary colors representing the inherent color, a predetermined tone in various colors can be achieved. In this case, though the best manner to "cover" the color region 140 with combination of toners is to completely fill the color region 140 without gaps, very small part of the whole color region 140 may be left with no toner.

Thus, even if the transparent sheet 1 is used, it is possible to color the three-dimensional object 120 with accurate tone corresponding to the color data on the surface of the solid model MD.

Figure 54A:
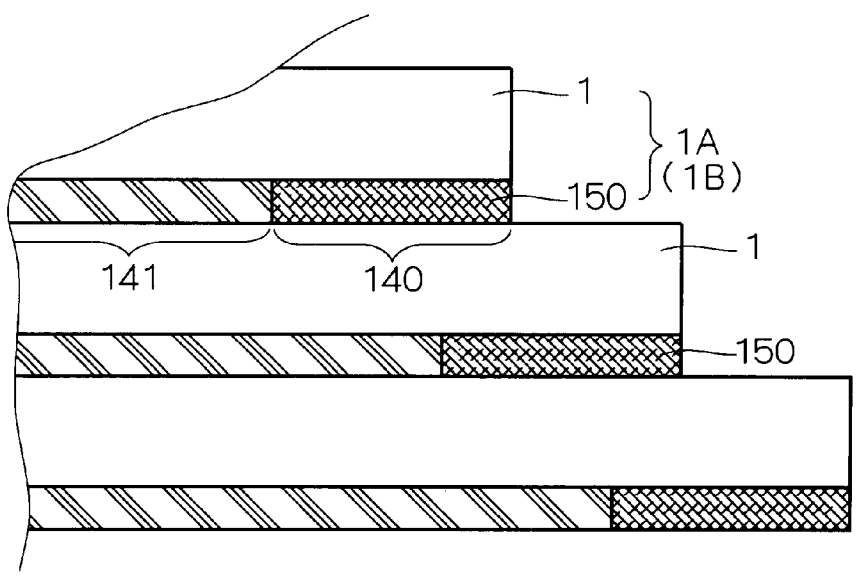
Figure 54B:
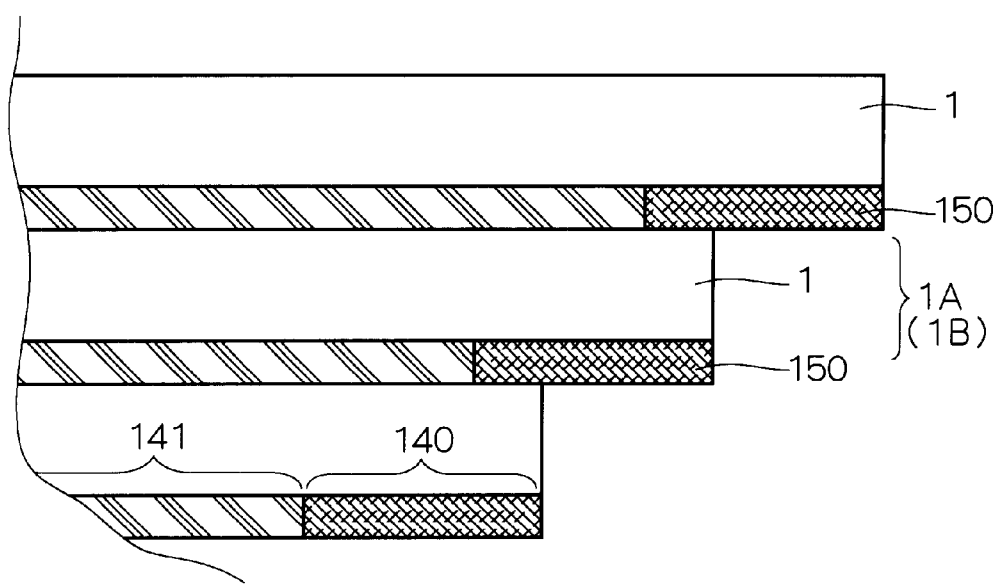

The state near the surface of the three-dimensional object 120 obtained by the coloring method is shown in FIGS. 54A and 54B. The colored layer 150 of FIGS. 54A and 54B is shown in FIG. 53A in detail.

FIG. 54A corresponds to a step-up portion of the three-dimensional object 120, i.e., the portion A of FIG. 51 which is of upward convex, and FIG. 54B corresponds to an overhang portion of the three-dimensional object 120, i.e., the portion B which is of downward convex. In both FIGS. 54A and 54B, the transparent sheet 1 is colored from one-side surface (lower surface in this case). In the case of FIG. 54A, if opaque sheets are used, the colored layer 150 would be sandwiched between the opaque sheets and not appear on the object 120 as appearance color. In this preferred embodiment, however, since the transparent sheets 1 are used, though the colored layer 150 is sandwiched between a plurality of sheets, the appearance color of the three-dimensional object 120 can be observed through the transparent sheets 1.

<H-2-3. Colored layer of Double-Layered Structure>

FIG. 53B shows an example using a double-layered structure consisting of a white toner layer 156 entirely covering the color region 140 and a three-primary-color toner layer 157 of spatial tone distribution. In this case, the gaps 151 may exist in the three-primary-colored layer. Specifically, since the white toner layer 156 cuts the light L and the white is entirely provided below the three-primary-color toner layer 157, like the opaque white sheet, a predetermined tone of various colors can be achieved. In this case, however, when a surface color of the three-dimensional object 120 with both the step-up portion and the overhang portion is observed, the white toner layer 156 and the three-primary-color toner layer 157 are vertically changed in the step-up portion and the overhang portion as discussed below.

FIGS. 55A and 55B show coloring with the above toners of two layers. The white toner layer 156 in FIGS. 55A and 55B is a solid layer entirely extending on the color region 140, and a toner layer 157a or 157b having a spatial tone distribution of respective color components of the three primary colors are superimposed thereon. FIG. 55A corresponds to the step-up portion in the three-dimensional object 120 and FIG. 55B corresponds to the overhang portion in the three-dimensional object 120. In comparison between FIGS. 55A and 55B, respective vertically-positional relations between the white toner layer 156 and the three-primary-color toner layers 157a and 157b are reversed.

Specifically, in the step-up portion, the three-primary-color toner layer 157a is formed above the white toner layer 156 in the colored sheet 1A. In the overhang portion, the three-primary-color toner layer 157b is formed below the white toner layer 156 in the colored sheet 1A. This vertical relation is defined assuming the laminating direction of the laminated body constituting the three-dimensional object 120 as a vertical direction.

This is because that the directions which contribute to forming the appearance color of the three-dimensional object 120 are different from each other. Specifically, the colored layer 150 appears, not being covered with the adjacent sheet in upward direction UP in FIG. 55A while in downward direction DN in FIG. 55B. Therefore, the three-primary-color toner layer 157a or 157b is disposed on a surface facing the appearance direction UP or DN among two main surfaces of the white toner layer 156.

As to the order of transfer of the toner layers 156 and 157a or 157b, the dots of the toners of three primary colors C (cyan), M (magenta) and Y (yellow) are spatially distributed like a grid and transferred onto the transparent sheet 1 as shown in FIG. 56A, and then the toner layer of white W is transferred as shown in FIG. 56B.

Further, in the case of FIG. 55B, the toner layer of white W is first transferred as shown in FIG. 57A, and then the dots of the toners of three primary colors C (cyan), M (magenta) and Y (yellow) are spatially distributed like a grid and transferred as shown in FIG. 57B. In FIG. 57B, though it seems as if the dots of the toners of three primary colors C (cyan), M (magenta) and Y (yellow) and the dots of the white toner W are on the same plane, in fact, the toner layer of three primary colors C (cyan), M (magenta) and Y (yellow) is superimposed on the white toner layer.

The toners may be directly transferred onto the transparent sheet 1, but in the forming apparatus 100K of this preferred embodiment, the two toner layers are transferred to the intermediate transfer belt 13 and the two toner layers on the intermediate transfer belt 13 are transferred onto the transparent sheet 1. This allows an effective transfer.

In this case where the white toner layer 156 and the three-primary-color toner layer 157a (157b) are formed on the intermediate transfer belt 13 and then the toners are transferred together onto the transparent sheet 1, it is noted that the order of transfer of the white toner layer 156 and the three-primary-color toner layer 157a (157b) is reverse to the above order. Specifically, as can be seen from FIG. 48, since the intermediate transfer belt 13 is of belt-shaped with no end, the vertical relation of the toners sequentially transferred from the photoreceptor drum 18 below the belt 13 and that of the toners to be transferred together onto the transparent sheet 1 above the belt 13 after rotating are reversed. Therefore, when the intermediate transfer belt 13 is used to transfer a plurality of toner layers together onto the transparent sheet 1 as shown in FIG. 48, as to the order of transfer from the photoreceptor drum 18 to the intermediate transfer belt 13, the three-primary-color toner layer is first transferred and then the white toner layer is transferred in the step-up portion as shown in FIG. 55A while the white toner layer is first transferred and then the three-primary-color toner layer is transferred in the overhang portion as shown in FIG. 55B.

<H-3. Specific Coloring Operation of Apparatus>

Figure 58:
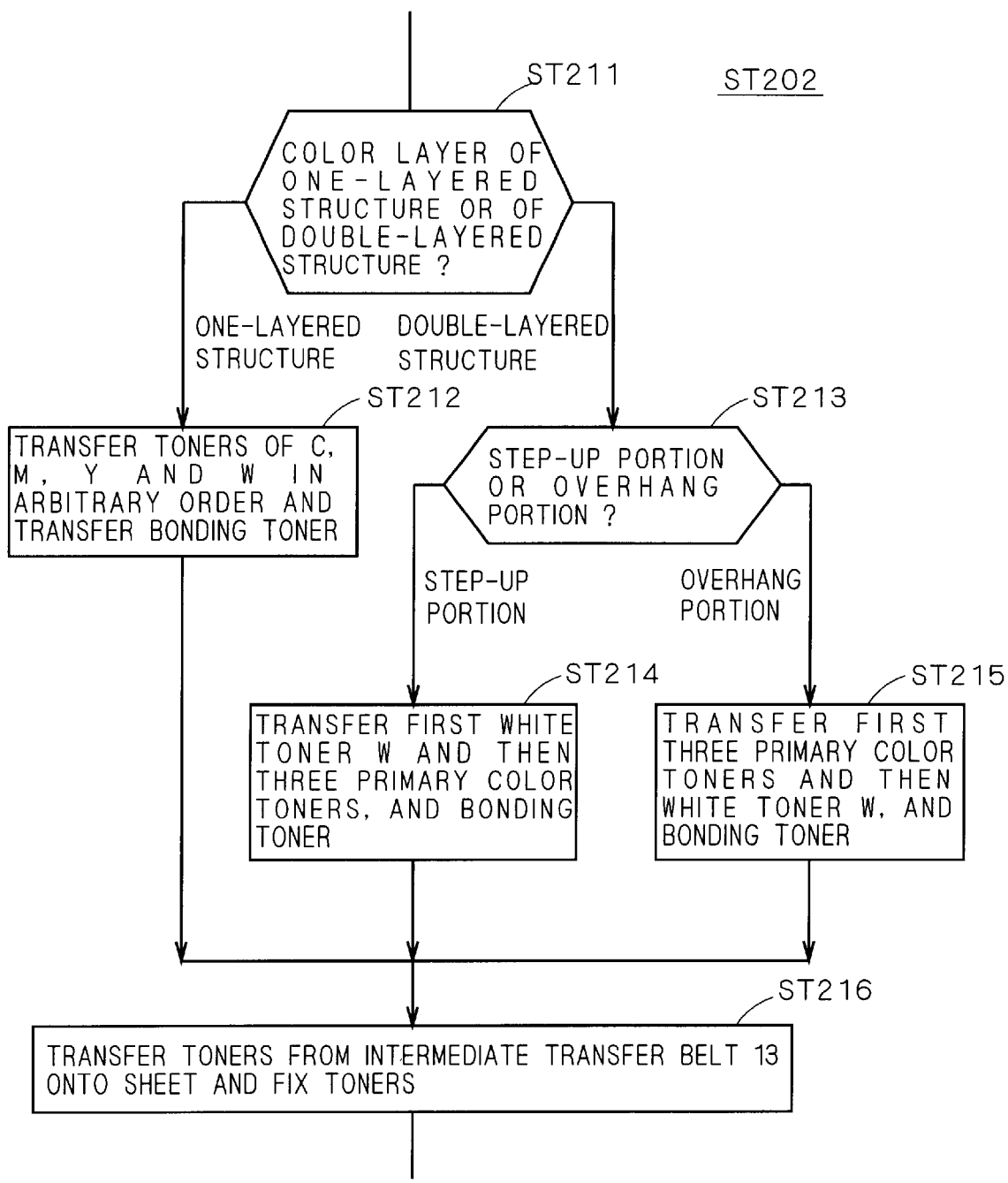
FIG. 58 is a flow chart showing a coloring operation of a forming apparatus in accordance with the seventh preferred embodiment.

FIG. 58 is a flow chart showing a coloring operation of the three-dimensional object forming apparatus 100K. The flow chart of FIG. 58 corresponds to the step ST202 in the flow chart of FIG. 49.

First, in the step ST211, a judgment is made on whether the colored layer is made of one-layered structure or double-layered structure. Though this judgment is not needed when the apparatus 100K is dedicated to one of these structures, in this discussion, the apparatus 100K is operable in both cases according to the selection of an operator. The operator makes this selection by switching operation.

<H-3-1. Colored layer of One-Layered Structure>

When the colored layer is of one-layered structure, there is no limitation on the order of application of the three-primary-color toner and the white toner. Therefore, in the step ST212, the first data of the sectional data CDj describing the sections of the solid model MD are referred to and the exposing device 190 provides a surface of the photoreceptor drum 18 with an exposure pattern of the first color component (one of C, M, Y and W) according to the sectional shape and appearance color of the sectional position of the solid model MD. For example, when the first color component is C (cyan) component, the developing device 11a corresponding to the C component is selected and driven, among the four developing devices 11, 11b, 11c and 11d of the rotary developing device 11 for the color toners. The rotary developing device 11 is rotated until the developing device 11a gets to an upper position to come into contact with the photoreceptor drum 18 and applies the toner of the C component to the surface of the photoreceptor drum 18 to be developed. This C toner image is transferred to the intermediate transfer belt 13.

After that, the second to fourth color components (e.g., M, Y and W) are sequentially exposed and developed, and transferred to the intermediate transfer belt 13, to obtain the state corresponding to FIG. 52D.

Further, the range of the adhesion region 141 is exposed and recorded on the photoreceptor drum 18 and the bonding toner is applied onto the photoreceptor drum 18 from the developing device lie to develop its electrostatic latent image. Then, the electrostatic latent image is transferred to the intermediate transfer belt 13.

At this time, use of the transparent toner or the white toner prevents the toner of the adhesion region 141 from reflecting on the color region 140 through the transparent sheet 1 when the bonding toner is applied to the adhesion region 141. This also applies to other methods using the transparent sheet 1.

In the later step ST216, the intermediate transfer belt 13 is operated to transfer a composite toner layer transferred on the intermediate transfer belt 13 onto the transparent sheet 1. By sandwiching the transparent sheet 1 and the intermediate transfer belt 13 on which the toners are transferred between a secondary transfer roller 16b and the support roller 16a, the toners can be electrostatically transferred onto the transparent sheet 1. Subsequently, the heat roller 17 heats the toners electrostatically transferred to the transparent sheet 1 and fixes them on the transparent sheet 1. The colored sheet 1A obtained through fixing the toners is conveyed to the forming unit 180.

<H-3-2. Colored layer of Double-Layered Structure>

On the other hand, when the colored layer of double-layered structure is formed, in the step ST213, the sectional data CDj are referred to and it is thereby found whether the section belongs to the step-up portion or the overhang portion of the laminated body. For this purpose, a flag indicating whether the section belongs to the step-up portion or the overhang portion of the laminated body is given to the sectional data CDj in advance. As to a vertically-extending portion of the laminated body, decision is made as if it belongs to either the step-up portion or the overhang portion.

When the section belongs to a step-up portion, as discussed with reference to FIG. 55A, it is necessary to dispose the three-primary-color toner layer 157a below the white layer 156 (on a side close to the transparent sheet 1 to be provided with the colored layer in this case). Considering that the vertical relation is reversed in the case of transfer through the intermediate transfer belt 13, to achieve this, the white toner image is first formed and transferred to the intermediate transfer belt 13, to obtain the state of FIG. 57A, and then the three primary color toner images are sequentially formed and transferred to the intermediate transfer belt 13, as shown in the step ST214. After that, the bonding toner is transferred. The three primary color toners C, M and Y may be transferred in an arbitrary order and the bonding toner may be transferred at any timing. When the white toner is used as the bonding toner, the white toner is transferred onto the adhesion region 141 at the same time when the white toner is transferred onto the color region 140. This also applies to transfer of the bonding toner in the following discussion. Thus, the colored sheet 1A corresponding to FIG. 55A can be obtained.

When the section belongs to an overhang portion, as discussed with reference to FIG. 55B, it is necessary to dispose the three-primary-color toner layer 157b above the white layer 156 (on a side away from the transparent sheet 1 to be provided with the colored layer in this case). Considering that the vertical relation is reversed in the case of transfer through the intermediate transfer belt 13, to achieve this, the three primary color toner images are first sequentially formed and transferred to the intermediate transfer belt 13 and then the white toner image is formed and transferred to the intermediate transfer belt 13, as shown in the step ST215. The three primary color toners C, M and Y may be transferred in an arbitrary order and the bonding toner may be transferred at any timing, like in the step-up portion. Through this, the colored sheet 1A corresponding to FIG. 55B can be obtained.

In both cases of step-up portion and overhang portion, the laminated body of sheets can be obtained through the step ST216.

By coloring the color region 140 as above, coloring of the three-dimensional object 120 can be achieved with accurate tone corresponding to the color data of the surface of the solid model.

I. The Eighth Preferred Embodiment

<I-1. Constitution and Operation>

FIG. 59 is a schematic view showing a constitution of a three-dimensional object forming apparatus 100L in accordance with the eighth preferred embodiment. The apparatus 100L is used in a case of using a color sheet 2 having opaque color, and comprises a sheet reversing device 35 addition to the apparatus 100K of the seventh preferred embodiment.

The sheet reversing device 35 reverses the front and back sides of the sheet 2 colored by the coloring unit 21 and conveys the reversed sheet to the forming unit 180. With a not-shown sheet conveying mechanism, the sheet 2 can select one of an access passage 36a of the sheet reversing device 35 and a main passage 36b.

<I-1-1. Principle on Coloring>

Next, an operation of the three-dimensional object forming apparatus 100L will be discussed. The basic operation of the forming apparatus 100L is the same as that of the forming apparatus 100K of the seventh preferred embodiment, and performs an operation shown in the flow chart of FIG. 49, to obtain a colored sheet 2A (see FIG. 59) whose base material is a color sheet, instead of the colored sheet 1A of the seventh preferred embodiment, and further laminates and cuts the colored sheet 2A to obtain a laminated body of processed sheets 2B. Then, an necessary portion of the laminated body is removed, to obtain a desired three-dimensional object.

Use of the color sheet 2 has a situation similar to use of the above transparent sheet 1. Specifically, when an opaque color sheet is used instead of the transparent sheet 1 in FIG. 68, the ground color of the color sheet appears through the gaps 151 with no color in a grid-like arrangement of the toners of three primary colors, i.e., C (cyan), M(magenta) and Y (yellow). Since the coloration of the solid model MD is determined assuming that the ground color of the sheet is a specific color (hereinafter, referred to as "reference color", typically white), when the color of the color sheet is different from the reference color, it is impossible to obtain a desired tone.

Like coloring on the transparent sheet 1, as shown in FIG. 52D, the gaps 151 are colored with white toner W and the color region are entirely covered with the white toner and the three primary color toners. It seems as if a white sheet is colored with the three primary colors and a desired tone with various colors can be achieved. A specific method of coloring will be discussed below.

Coloring of the three-dimensional object by the above method is performed as shown in FIGS. 60A and 60B. The colored layers 160a and 160b of FIGS. 60A and 60B are each of one-layered structure consisting of spatial combination distribution of the white toner and the three primary color toners, covering the color region 140. A portion shown in FIG. 60A corresponds to the step-up portion A of the three-dimensional object 120 shown in FIG. 51 while a portion shown in FIG. 60B corresponds to the overhang portion B of the three-dimensional object 120 shown in FIG. 51. In comparison between FIGS. 60A and 60B, vertically relations between the color sheet 2 and the colored layers 160a and 160b are reversed. This is because the color sheet 2 is opaque and the color of the color region 140 appears, not being covered with the adjacent sheet in upward direction UP in FIG. 60A while in downward direction DN in FIG. 60B. Therefore, according to whether the section belongs to the step-up portion or the overhang portion, the colored layer 160a or 160b is disposed on a surface facing the appearance direction UP or DN among two main surfaces of the color sheet 2.

Thus, though it is enough to color one-side surface of the sheet 1 in coloring the transparent sheet 1 in accordance with the seventh preferred embodiment because transmission of color in the transparent portion can be utilized, in coloring the color sheet 2, switching of surface to be colored is needed when the three-dimensional object 120 includes both the step-up portion and the overhang portion and their surface colors have to be observed. In this case, the color sheet 2 is conveyed to the sheet reversing device 35, being reversed on its front and back surfaces, and laminated in the forming unit 180.

Figure 61A:
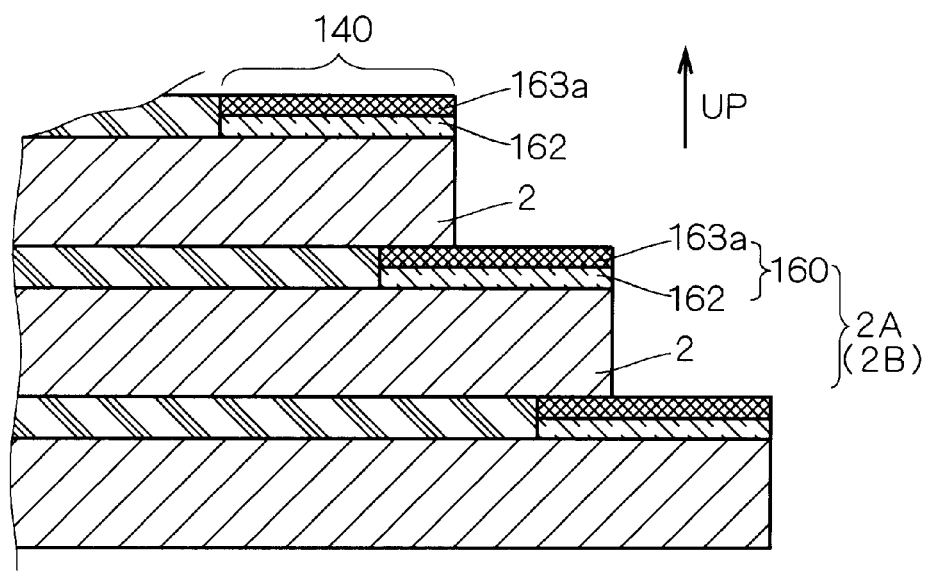
Figure 61B:
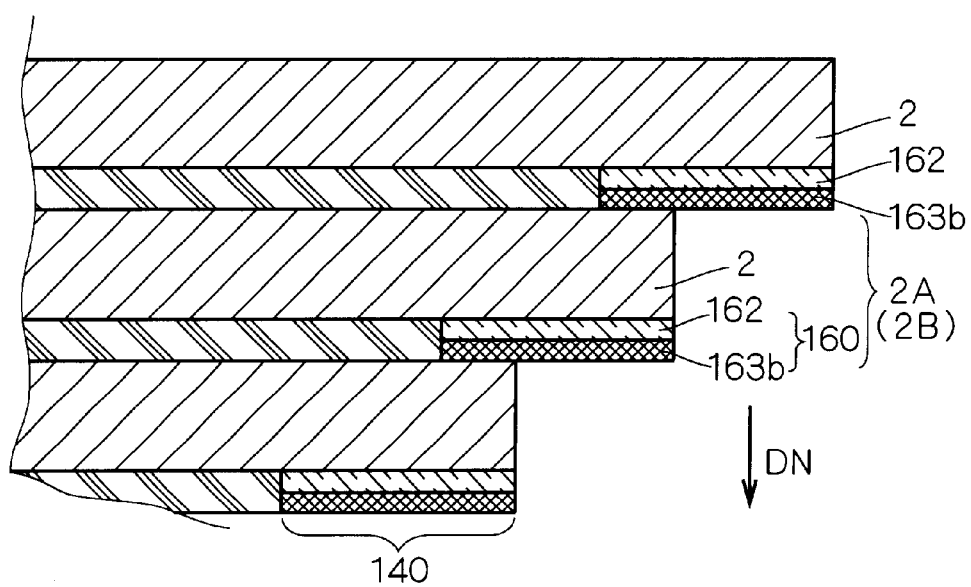

There may be another coloring method, like in the first preferred embodiment, as shown in FIGS. 61A and 61B, using a colored layer 160 of double-layered structure consisting of a white toner layer 162 entirely covering the color region and a three-primary-color toner layer 163a or 163b spatially tone-distributed. Also in this case, in order to cope with various shapes of the three-dimensional object 120, it is desirable that the color sheet 2 should be conveyed to the sheet reversing device 35, being reversed on its front and back surfaces, and laminated in the forming unit 180.

<I-2. Specific Operation of Apparatus>

Figure 62:
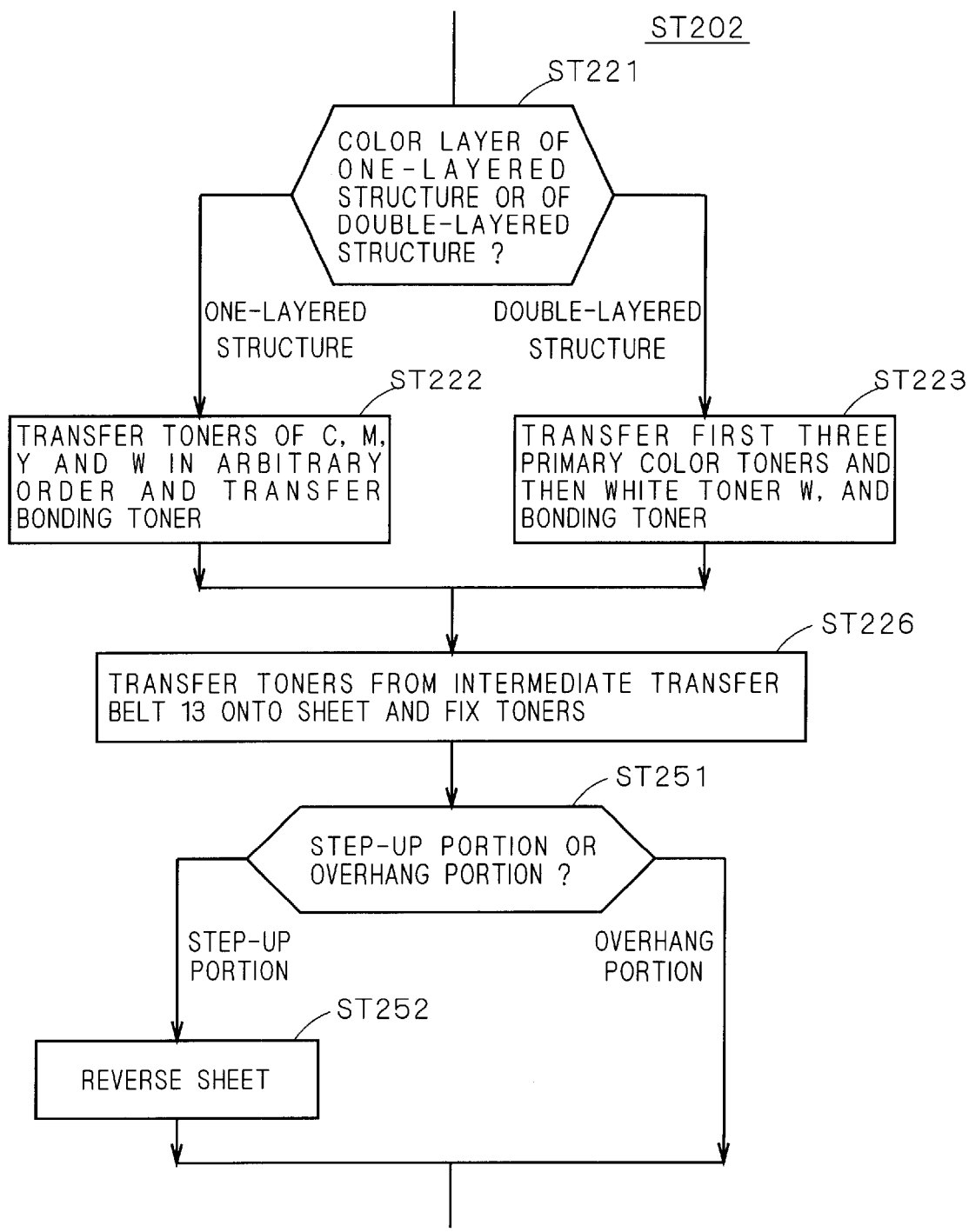
FIG. 62 is a flow chart showing a coloring operation of a forming apparatus in accordance with the eighth preferred embodiment.

Next, a coloring operation by the apparatus 100L will be discussed. FIG. 62 is a flow chart showing a coloring operation of the three-dimensional object forming apparatus 1001, corresponding to the step ST202 in the flow chart of FIG. 49.

As can be seen from comparison between the flow charts of FIGS. 62 and 58, the steps ST221, ST222 and ST226 of FIG. 62 correspond to the steps ST211, ST212 and ST216 of FIG. 58, respectively, and the two flow charts are different in which sheet is used, the transparent sheet 1 or the color sheet 2. So no discussion will be made on these steps ST221, ST222 and ST226.

When it is judged that the colored layer is of double-layered structure in the step ST221, after the three-primary-color toner layer which is spatially tone-distributed is transferred to the intermediate transfer belt 13 in the step ST223, a solid layer of white toner for the range corresponding to the color region 140 is transferred thereto. The transparent bonding toner layer can be transferred at any time.

In both cases of one-layered structure and double-layered structure, in the step ST251 after the step ST226, by referring to the sectional data CDj of the solid model MD, a judgment is made on whether the current section belongs to a step-up portion or an overhang portion.

When the section belongs to the overhang portion, as shown in FIG. 61B, since the colored layer may be kept facing below, the colored sheet 2A is conveyed to the laminating mount 40, without reversing, and laminated thereon.

When the section belongs to the step-up portion, the colored sheet 2A goes through the passage 36a of FIG. 59 and is reversed in the sheet reversing device 35 (in the step ST252), and then conveyed to the forming unit 180.

Through the above operation, even when the color sheet 2 is used, coloring of the three-dimensional object 120 can be achieved with accurate tone corresponding to the color data of the surface of the solid model.

J. The Ninth Preferred Embodiment

In the above apparatuses of the seventh and eighth preferred embodiments, the transparent sheet 1 or the color sheet 2 is used and the colored layer is formed thereon. In both apparatuses, combination of the white toner (generally, coloring material of base color) and the three primary color toners (generally, one or more coloring materials representing the inherent color of the solid model) entirely covers the color region 140. The whole adhesion region 141 are covered with the bonding toner. Therefore, the whole combination region of these regions 140 and 141 is covered with the toners densely in a plate-like manner, and a laminated body can be formed even without the sheet supporting the toner layers.

Then, in the ninth preferred embodiment, a three-dimensional object is formed without using any sheet.

<J-1. Constitution of Principal Part of Apparatus>

Figure 63:
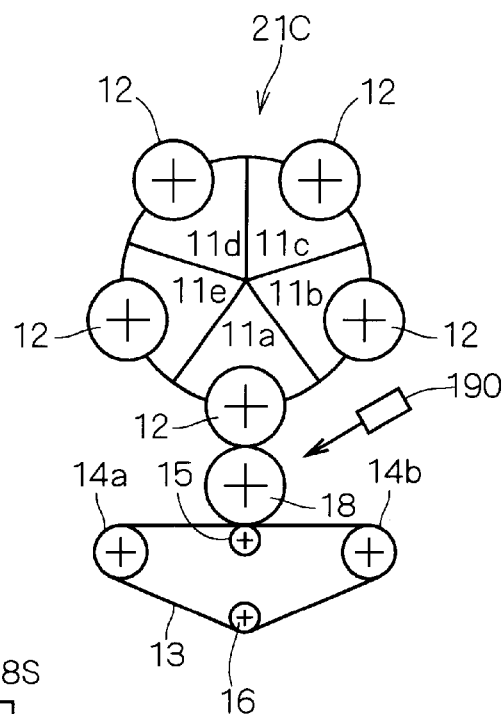
FIG. 63 is a schematic diagram showing an apparatus for forming a three-dimensional object in accordance with a ninth preferred embodiment.

FIG. 63 is a schematic view showing a constitution of a three-dimensional object forming apparatus 100M in accordance with the ninth preferred embodiment.

The forming apparatus 100M comprises a coloring unit 21C for performing a coloring operation with toners, the forming unit 180 for layering the toners and a data processing unit 45A for generating a recorded image on the basis of the sectional information of the solid model MD and controlling other units.

The coloring unit 21C has the same constitution as the coloring unit 21 in the forming apparatus 100K of the seventh preferred embodiment except the two heat rollers 17. Further, the coloring unit 21C is movable at least in the X-Y direction.

The forming unit 180 comprises the laminating mount 40 on which a colored toner layer 8 is layered and a laser irradiating device 170 for coagulating the toner layer 8 with a laser beam. The laser irradiating device 170 coagulates a predetermined region of the toner layer 8 on processed toner layers 8S by scanning the laser beam in the X-Y direction.

The forming apparatus 100M of the ninth preferred embodiment does not need the feeding mechanism, the cutter or the like and has a simpler constitution than the forming apparatus 100K of the seventh preferred embodiment.

<J-2. Operation of Apparatus>

Figure 64:
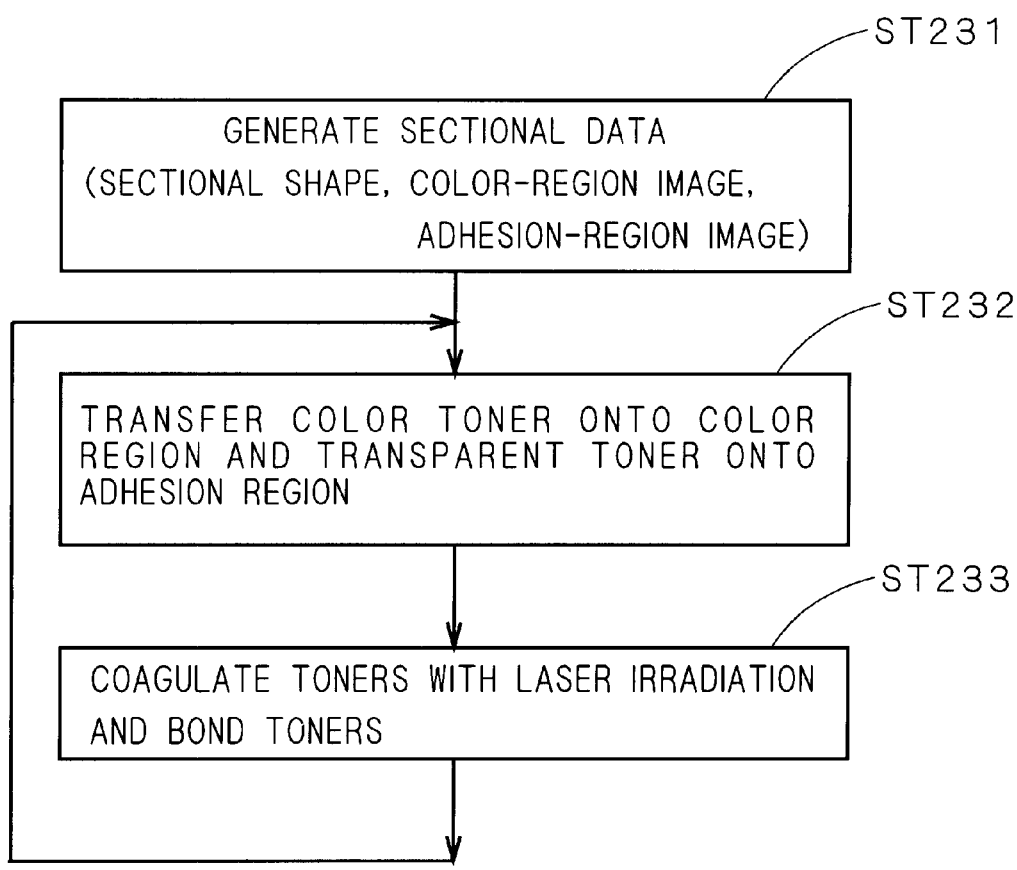
FIG. 64 is a flow chart showing a basic operation in accordance with the ninth preferred embodiment.
Figure 65A:
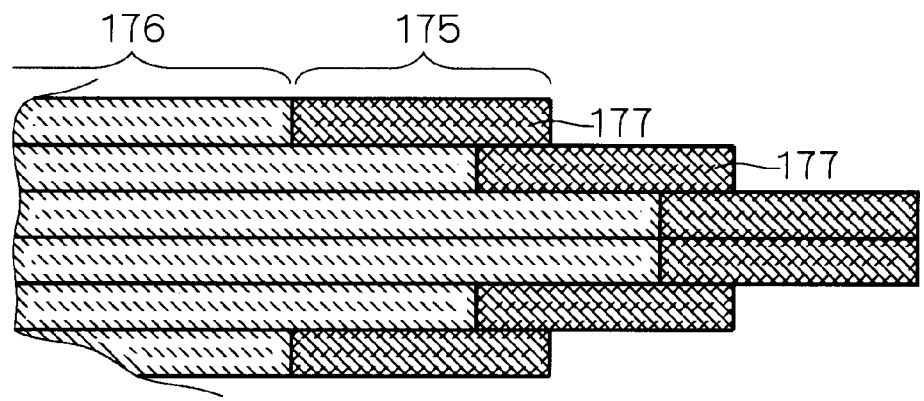
FIGS. 65A and 65B show coloring of a three-dimensional object.
Figure 65B:
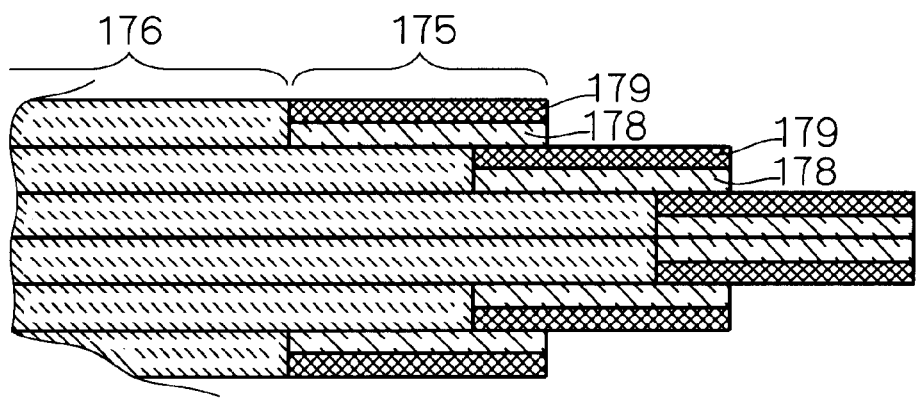

FIG. 64 is a flow chart showing a basic operation of the three-dimensional object forming apparatus 100M and FIGS. 65A and 65B show examples of coloring operation.

Like in the seventh preferred embodiment, the sectional data CDj including the shape data and the color data of the respective sections of the solid model are generated from the original data D0 including the three-dimensional shape data and the color data of the solid model MD obtained from the three-dimensional CAD data or by the three-dimensional shape measuring instrument, in the step ST231 of FIG. 64.

Next, in the step ST232, the coloring unit 21C moves to above the processed toner layers 8S on the laminating mount 40 and colors a color region 175 and an adhesion region 176 in an area on the processed toner layers 8S with color toners by electrostatic transfer on the basis of the above sectional data CDj.

When the three-dimensional object has the overhang portion, and in other words, the laminated color region 175 is smaller than the color region to be laminated thereon, a dummy toner is transferred outside the color region 175 in order to support the upper color region. The detail of the step ST232 is the same as the flow in the seventh preferred embodiment shown in FIG. 58. The detail of the coloring method will be discussed later.

In the step ST233, the color region 175 and the adhesion region 176 are scanned with the laser beam from the laser irradiating device 170, to be coagulated and bonded to the toner layer immediately therebelow. It is desirable that one of the toner layers transferred in the step ST232 should be processed.

The end of the step ST233 completes a series of processing on one of the toner layers, and subsequently the steps ST232 and ST233 are executed on the next toner layer. These operations are repeated on all the sectional data CDj of the solid model and the dummy toner in a power state is removed manually in the end to obtain an objective three-dimensional object.

<J-3. Detailed Discussion on Coloring>

Coloring conditions on the three-dimensional object in this preferred embodiment in which the three-dimensional object is formed by layering the color toners are shown in FIGS. 65A and 65B. In a colored layer 177 of FIG. 65A, like in the seventh preferred embodiment, the color region 175 is entirely covered with one-layered structure of combination of the white toner and the three primary color toners. Further, there may be a case, as shown in FIG. 65B, where the color region 175 is colored with double-layered structure consisting of a white toner 178 entirely covering the color region 175 and a three-primary-color toner layer 179 in which the three primary color toners are spatially tone distributed.

By coloring the color region 175 as above, coloring of the object can be achieved with accurate tone corresponding to the color data of the surface of the solid model.

In forming a three-dimensional object on the basis of the principle of this preferred embodiment, coloring materials in a powder state or a paste state to be coagulated by actions of heat and light may be used. The toner used as the coloring material in this preferred embodiment is typical for this material. When the coloring material in a paste state is used, it is preferable that a colored layer and an adhesion layer are formed by a printing-like operation on the laminated body.

K. Variations of The Seventh to Ninth Preferred Embodiments

In the forming apparatus 100K of the seventh preferred embodiment, the sheet is colored before laminating. Alternatively, the sheet may be colored after laminating. An apparatus to achieve this is shown in FIG. 66. In an apparatus 100N of FIG. 66, the coloring unit 21 is movable at least in the X-Y direction to perform coloring after laminating. Then, after the transparent sheet 1 is laminated on the laminating mount 40, the coloring unit 21 moves above the laminating mount 40 to color the sheet 1. In this case, the toner is transferred onto the upper surface of the sheet 1.

Figure 67:
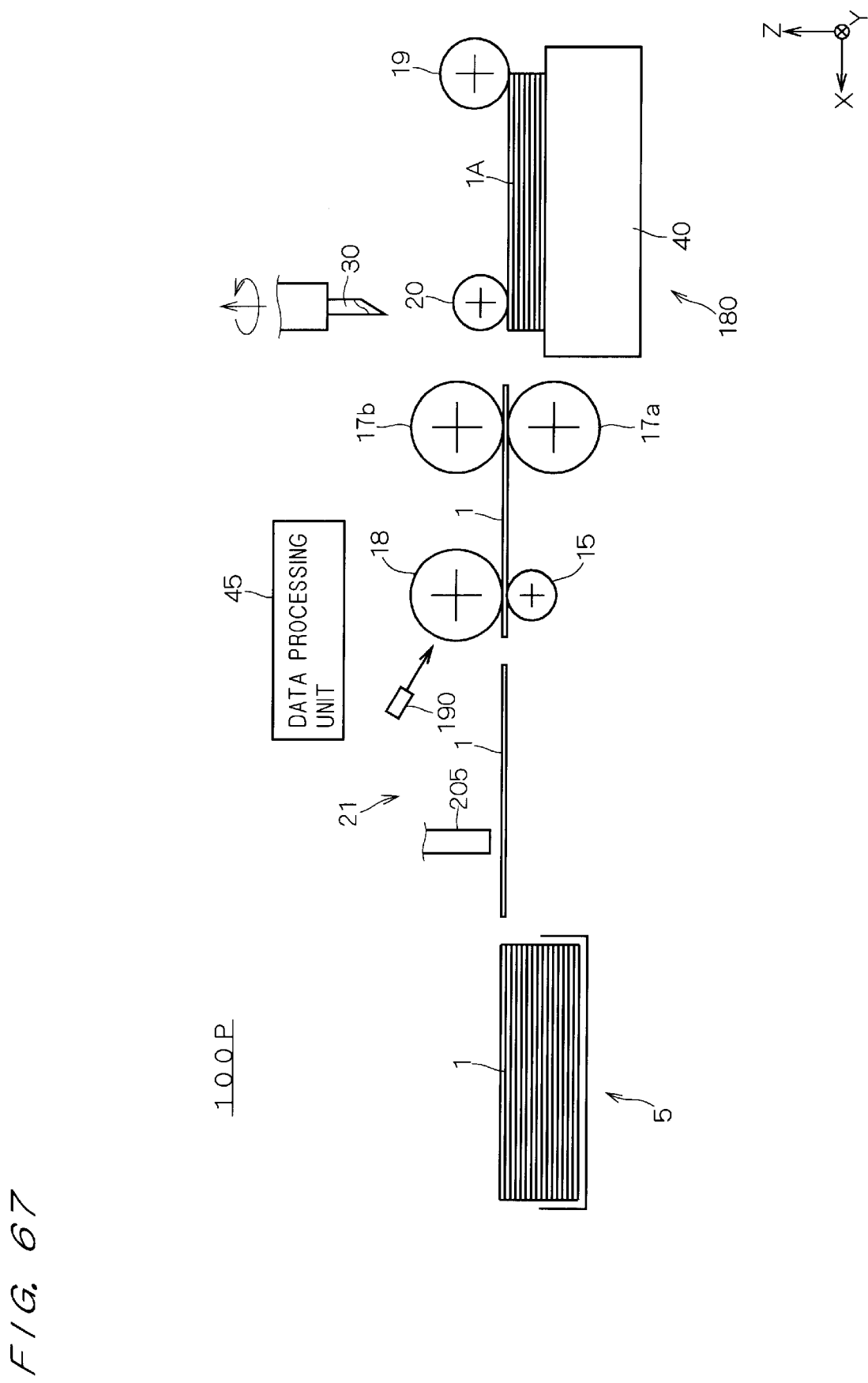

In the forming apparatuses 100K and 100L of the seventh and eighth preferred embodiments, the sheet is colored with a toner. Alternatively, the sheet may be colored with an ink as shown in FIG. 67. In a forming apparatus 100P of FIG. 67, an ink jet head 205 is provided instead of the rotary developing device 11 of the seventh preferred embodiment. The sheet is colored by depositing inks of colors (Y, M, C and W) on the sheet from the ink jet head 205. This forming apparatus 100P can be size-reduced as compared with the forming apparatus 100K of the seventh preferred embodiment.

In the seventh to ninth preferred embodiments, white is used as base color. Alternatively, other colors such as light colors may be used as base color. Further, achromatic colors other than white, such as gray and black, may be used as base color only if the surface color of the solid model is determined on the premise that the base color is gray or black.

When the color sheet is used, the base color has only to be any color other than the color of the color sheet. For example, when a blue sheet is used, the tone of the three-dimensional object is hard to represent if the surface color of the solid model is also blue, but tone gradation of blue can be observed relatively easily if any color other than blue is used as base color.

Use of the three primary colors to represent the inherent color corresponding to the surface color of the solid model allows full-color representation, and in this case, any number of colors other than the base color can be used. For example, when white is used as base color, if red material is used, colors from white to pure red can be expressed by the spatial tone distribution of red material, and gradation at halftone (pink) is accurately expressed. Further, gradation can be expressed by variable-density image of the toner.

Though the colored layer of one-layered structure or double-layered structure is used in the seventh to ninth preferred embodiments, the present invention is also applied to three- or more-layered structure only if the whole color region is substantially covered.

Though a cut sheet which can be processed piece by piece is used in the seventh preferred embodiment, a continuous sheet may be used.

In the three-dimensional object 120 (of FIG. 51) of the seventh and eighth preferred embodiments, though the sheets of the same thickness are used, the thickness of the sheet can be varied according to the sectional shape. In this case, sheets of different thicknesses are stored in the paper feed unit 5.

In laminating sheets to form an object in accordance with the seventh to ninth preferred embodiments, by providing a measuring instrument capable of measuring the height of laminated sheets to measure the height of laminated sheets at a proper timing during a laminating operation and feeding the measured height back to the step of generating the sectional data, an object can be formed more accurately.

In the seventh to ninth preferred embodiments, a toner of Bk (black) may be added. This case is effective to suppress consumption of toners for chromatic colors and express clear black with sharp edge of characters and the like.

In the seventh and eighth preferred embodiments, the sheets may be bonded temporarily by electrostatic suction and heated and pressurized by several pieces or collectively in the end of laminating. This allows faster forming of an object.

It is not necessary to transfer the bonding toner entirely onto the adhesion region 141, but the adhesion region 141 may be partially bonded only if a predetermined adhesion strength can be obtained.

In the forming apparatus 100L of the eight preferred embodiment, another set of the developing device 11, the intermediate transfer belt 13 and the like may be provided, instead of the sheet reversing device 35, to transfer the toners onto both surfaces of the color sheet 2. In this case, it is not necessary to reverse the sheet 2.

While the invention has been shown and described in detail, the foregoing description is in all aspects illustrative and not restrictive. It is therefore understood that numerous modifications and variations can be devised without departing from the scope of the invention.

What is claimed is:

1. An apparatus for forming a three-dimensional object by laminating sheet-like members, comprising:
   a processor for generating outline-shape data including a sectional outline shape of a solid and color-region data including a region to be colored on each of said sheet-like members on the basis of data representing a shape of said solid and data representing a color of a surface of said solid; and
   a unit for coloring each of said sheet-like members on the basis of said color-region data, cutting each of said sheet-like members on the basis of said outline-shape data and laminating each of said sheet-like members.

2. The apparatus according to claim 1, wherein
   said unit colors each of said sheet-like members before laminating.

3. The apparatus according to claim 1, wherein
   said unit colors each of said sheet-like members after laminating.

4. The apparatus according to claim 1, wherein
said region to be colored is a predetermined region including a sectional contour line of said solid on each of said sheet-like members.

5. The apparatus according to claim 1, wherein
said unit colors said sheet-like members with a toner.

6. The apparatus according to claim 1, wherein
said unit colors said sheet-like members with an ink.

7. The apparatus according to claim 1, wherein
said unit includes a mechanism for supplying a plurality of kinds of sheet-like members having different thicknesses.

8. The apparatus according to claim 7, wherein
said processor slices said solid at different intervals on the basis of said data representing said shape of said solid to generate said outline-shape data and makes a selection from said plurality of kinds of sheet-like members in accordance with said intervals.

9. The apparatus according to claim 1, wherein
said sheet-like members are obtained by cutting a continuous sheet, and
said unit colors said continuous sheet with a plurality of image forming units arranged in series correspondingly to a plurality of different colors.

10. The apparatus according to claim 1, wherein
said unit includes
a mounting pedestal on which said sheet-like members are laminated; and
a detector for detecting the height of said sheet-like members laminated on said mounting pedestal.

11. The apparatus according to claim 1, wherein
said processor further generates adhesion-region data including a region to be coated with an adhesive on each of said sheet-like members, and
said unit coats each of said sheet-like members with said adhesive on the basis of said adhesion-region data.

12. The apparatus according to claim 11, wherein
said adhesive is a toner.

13. The apparatus according to claim 12, wherein
said toner is transparent.

14. The apparatus according to claim 12, wherein
said toner is white.

15. The apparatus according to claim 1, wherein
said unit colors each of said sheet-like members with a predetermined base color as well as an inherent color corresponding to a color of a surface of said solid.

16. The apparatus according to claim 15, wherein
said base color is white.

17. The apparatus according to claim 15, wherein
said sheet-like members are transparent.

18. The apparatus according to claim 15, wherein
said unit colors each of said sheet-like members by layering a first layer entirely made of said base color and a second layer in which color components corresponding to said inherent color are distributed, and
said first layer is formed below said second layer when each of said sheet-like members to be colored corresponds to an overhung portion of said three-dimensional object and formed above said second layer when each of said sheet-like members to be colored corresponds to a step-up portion of said three-dimensional object.

19. The apparatus according to claim 15, wherein
said unit colors each of said sheet-like members by distributing said color components corresponding to said inherent color and said base color with substantially no clearance.

20. The apparatus according to claim 1, wherein
said unit includes a mechanism for reversing each of said sheet-like members before laminating.

21. A method for forming a three-dimensional object by laminating foundation members, comprising the steps of:
   (a) generating outline-shape data including a sectional outline shape of a solid and color-region data including a region to be colored on each of said foundation members on the basis of data representing a shape of said solid and data representing a color of a surface of said solid; and
   (b) coloring each of said foundation members on the basis of said color-region data, molding the sectional outline shape on each of said foundation members on the basis of said outline-shape data and laminating each of said foundation members.

22. The method according to claim 21, wherein
each of said foundation members is colored before laminating in said step (b).

23. The method according to claim 21, wherein
each of said foundation members is colored after laminating in said step (b).

24. The method according to claim 21, wherein
said region to be colored is a predetermined region including a sectional contour line of said solid on each of said foundation members.

25. The method according to claim 21, wherein
said foundation members are colored with a toner in said step (b).

26. The method according to claim 21, wherein
said foundation members are colored with an ink in said step (b).

27. The method according to claim 21, further comprising the step of:
supplying a plurality of kinds of foundation members having different thicknesses.

28. The method according to claim 27, wherein
said step (a) includes the step of:
   slicing said solid at different intervals on the basis of said data representing said shape of said solid to generate said outline-shape data,
said method further comprising the step of:
   making a selection from said plurality of kinds of foundation members in accordance with said intervals.

29. The method according to claim 21, wherein
said foundation members are obtained by cutting a continuous sheet, and
said continuous sheet is colored with a plurality of image forming units arranged in series correspondingly to a plurality of different colors in said step (b).

30. The method according to claim 21, wherein
said step (b) includes the step of:
   laminating each of said foundation members on a mounting pedestal,
said method further comprising the step of:
   detecting the height of said foundation members laminated on said mounting pedestal.

31. The method according to claim 21, further comprising the steps of:

generating adhesion-region data including a region to be coated with an adhesive on each of said foundation members; and coating each of said foundation members with said adhesive on the basis of said adhesion-region data.

32. The method according to claim 31, wherein said adhesive is a toner.

33. The method according to claim 32, wherein said toner is transparent.

34. The method according to claim 32, wherein said toner is white.

35. The method according to claim 21, wherein each of said foundation members is colored with a predetermined base color as well as an inherent color corresponding to a color of a surface of said solid in said step (b).

36. The method according to claim 35, wherein said base color is white.

37. The method according to claim 35, wherein said foundation members are transparent.

38. The method according to claim 35, wherein said step (b) includes the step of:

layering a first layer entirely made of said base color and a second layer in which color components corresponding to said inherent color are distributed, to color each of said foundation members, and wherein said first layer is formed below said second layer when each of said foundation members to be colored corresponds to an overhung portion of said three-dimensional object and formed above said second layer when each of said foundation members to be colored corresponds to a step-up portion of said three-dimensional object.

39. The method according to claim 35, wherein each of said foundation members is colored by distributing said color components corresponding to said inherent color and said base color with substantially no clearance in said step (b).

40. The method according to claim 21, wherein said step (b) includes the step of:

reversing each of said foundation members before laminating.

41. A method for forming a three-dimensional object by forming a layered body consisting of a plurality df colored layers representing each of sections of a solid model on the basis of data on said solid model, comprising the steps of:

(a) sequentially layering a plurality of powder-type or paste-type formed layers including inherent colors corresponding to appearance colors on each of sectional positions of said three-dimensional object; and (b) coagulating a portion of each of said formed layers corresponding to a sectional shape of said solid model every time when a new formed layer is layered, said step (a) comprises the steps of:

(a-1) defining a portion contributing to an appearance of said three-dimensional object as a color region in a region where each of said formed layers is to be formed on the basis of a shape of said solid model; and (a-2) providing a colored layer on said color region, said colored layer including a first layer entirely made of a predetermined base color and a second layer which is layered below or above said first layer, in which color components corresponding to said inherent colors are distributed.

42. An apparatus for forming a three-dimensional object by forming a layered body consisting of a plurality of colored layers representing each of sections of a solid model on the basis of data on said solid model, comprising:

a plurality of coloring material supply sources each consisting of a first material supply source for supplying a white coloring material and a second material supply source for supplying coloring materials other than white;

a formed-layer forming device for selectively driving said plurality of coloring material supply sources in accordance with appearance colors on each of sectional positions of said solid model to sequentially layer a plurality of powder-type or paste-type formed layers in which a predetermined color region is provided with a spatial distribution of a plurality of coloring materials; and a device for providing a colored layer on said color region, said colored layer including a first layer entirely made of a predetermined base color and a second layer which is layered below or above said first layer, in which color components corresponding to said appearance colors are distributed.

43. A three-dimensional object, comprising:

laminated sheet-like members; and a colored layer formed in a region including a peripheral portion of each of said sheet-like members.

44. The three-dimensional object according to claim 43, wherein said sheet-like members are transparent.

45. A three-dimensional object formed as a layered body, wherein said layered body made of a plurality of coloring-material coagulated layers which are obtained by coagulating powder-type or paste-type formed layers including coloring materials, and a colored layer including a first layer entirely made of a predetermined base color and a second layer which is layered below or above said first layer, in which color components corresponding to appearance colors of said three-dimensional object are distributed is formed in a portion which appears on an appearance of said three-dimensional object in each of coloring material coagulated layers.

46. A method for forming a three-dimensional object by laminating foundation members, comprising:

(a) receiving outline-shape data including a sectional outline shape of a solid and color-region data including a region to be colored on each of said foundation members on the basis of data representing a shape of said solid and data representing a color of a surface of said solid; and (b) coloring each of said foundation members on the basis of said color region data, molding the sectional outline shape on each of said foundation members on the basis of said outline-shape data and laminating each of said foundation members.

47. A method of forming a three-dimensional object having a colored surface by laminating a layer corresponding to a sectional shape in a position upon another, comprising the steps of:

(a) preparing a layer of a basic shape;

(b) upon preparation of said layer of said basic shape, coloring an outline of said sectional shape and the outside and the inside of said outline of said sectional shape with a color corresponding to that of said layer of said basic shape on said surface of said three-dimensional object; and (c) upon preparation of said layer of said basic shape, molding said sectional shape in said layer of said basic shape.

48. The method according to claim 47, wherein said basic shape is rectangle.

49. The method according to claim 47, wherein said layer is a sheet-like member, and said sectional shape is molded by cutting said sheet-like member in a form of said sectional shape in said step (c).

50. A method of generating data necessary for and to be used in an apparatus for forming a three-dimensional object having a colored surface by laminating a layer corresponding to a sectional shape in a position upon another, comprising the steps of:

(a) generating data, on each layer of said three-dimensional object, for coloring an outline of said sectional shape in each layer and the outside and the inside of said outline of said sectional shape with a color corresponding to that of each layer on said surface of said three-dimensional object; and (b) generating data, on each layer of said three-dimensional object, for molding said sectional shape in each layer.

51. A computer-readable medium containing a program that executes the following steps:

(a) generating outline-shape data including a sectional outline shape of a solid and color-region data including a region to be colored on each of a plurality of foundation members on the basis of data representing a shape of said solid and data representing a color of a surface of said solid; and (b) controlling the coloring of each of said foundation members on the basis of said color-region data, cutting each of said foundation members on the basis of said outline-shape data and laminating each of said foundation members.

52. The computer-readable medium of claim 51, wherein said step (b) includes the step of:

layering a first layer entirely made of a predetermined base color and a second layer in which color components corresponding to an inherent color corresponding to a color of a surface of said solid are distributed, to color each of said foundation members, wherein said first layer is formed below said second layer when each of said foundation members to be colored corresponds to an overhung portion of said three-dimensional object and formed above said second layer when each of said foundation members to be colored corresponds to a step-up portion of said three-dimensional object.

53. A computer-readable medium containing a program for controlling a process for forming a layered body consisting of a plurality of colored layers representing each of the sections of a solid model on the basis of data on said solid model, comprising the steps of:

(a) sequentially layering a plurality of powder-type or paste-type formed layers including inherent colors corresponding to appearance colors on each sectional position of said three-dimensional object; and (b) coagulating a portion of each of said formed layers corresponding to a sectional shape of said solid model every time a new formed layer is layered, said step (a) comprising the steps of:

(a-1) defining a portion contributing to an appearance of said three-dimensional object as a color region in a region where each of said formed layers is to be formed on the basis of a shape of said solid model; and (a-2) providing a colored layer on said color region, said colored layer including a first layer entirely made of a predetermined base color and a second layer which is layered below or above said first layer, in which color components corresponding to said inherent colors are distributed.

* * * * *